US005694530A

United States Patent [19]
Goto

[11] Patent Number: 5,694,530
[45] Date of Patent: Dec. 2, 1997

[54] METHOD OF CONSTRUCTING THREE-DIMENSIONAL IMAGE ACCORDING TO CENTRAL PROJECTION METHOD AND APPARATUS FOR SAME

[75] Inventor: Yoshihiro Goto, Tokyo, Japan

[73] Assignee: Hitachi Medical Corporation, Tokyo, Japan

[21] Appl. No.: 374,088

[22] Filed: Jan. 18, 1995

[30] Foreign Application Priority Data

Jan. 18, 1994 [JP] Japan ................................. 6-003492
Apr. 27, 1994 [JP] Japan ................................. 6-089770
Jun. 24, 1994 [JP] Japan ................................. 6-143496

[51] Int. Cl.⁶ ................................................. G06T 17/00
[52] U.S. Cl. ..................................... 395/119; 395/121
[58] Field of Search ............................... 395/119, 120, 395/122, 124, 125, 126, 127

[56] References Cited

U.S. PATENT DOCUMENTS

| | | | |
|---|---|---|---|
| 4,947,347 | 8/1990 | Sato | 395/119 |
| 5,293,467 | 3/1994 | Buchner et al. | 395/119 X |
| 5,325,472 | 6/1994 | Horiuchi et al. | 395/119 X |
| 5,412,764 | 5/1995 | Tanaka | 395/119 X |

OTHER PUBLICATIONS

IEEE Computer Graphics & Applications, May 1988, pp. 29–37.

Primary Examiner—Joseph H. Feild
Assistant Examiner—Cliff N. Vo
Attorney, Agent, or Firm—Antonelli, Terry, Stout & Kraus, LLP

[57] ABSTRACT

A method of constructing a three-dimensional image according to a central projection method, in which after a view point, tomographic images and a projection plane are set so that the tomographic images are put between the view point and the projection plane, a projection image is obtained by a central projection method, so that the pixel value of a projection point is determined in accordance with the distance between the view point and each of the tomographic images. Further, the view point is moved in combination with the projection plane successively in the direction of the depth of the tomographic images, so that a three-dimensional image is constructed and displayed whenever the position of the view point is changed. Further, after a tomographic image is projected onto a curved surface which touches the projection plane at the center of the projection plane at which a perpendicular drawn from the view point to the projection plane intersects the projection plane, the image projected onto the curved surface is re-projected onto the projection plane with a length along the curved surface to obtain a projection image.

63 Claims, 28 Drawing Sheets

[ VIEW POINT 1 ]

BRONCHI

[ VIEW POINT 2 ]

BRONCHI

METHOD OF CONSTRUCTING THREE-DIMENSIONAL IMAGE ACCORDING TO CENTRAL PROJECTION METHOD AND APPARATUS FOR SAME

CROSS-REFERENCE TO RELATED APPLICATION

The present application relates to subject matter described in application Ser. No. 08/322,553 filed on Oct. 13, 1994, now U.S. Pat. No. 5,581,671, by Yoshihiro GOTO and Kazuhiro SATO and entitled METHOD AND APPARATUS FOR MOVING-PICTURE DISPLAY OF THREE-DIMENSIONAL IMAGES, which is assigned to the same assignee as the present application.

The disclosure of application Ser. No. 08/322,553 is hereby incorporated by reference in the present application.

BACKGROUND OF THE INVENTION

The present invention relates to a method in which a plurality of tomographic images, for example, obtained by an X-ray computerized tomography (CT) apparatus or obtained by decomposing a volume image measured three-dimensionally by an MRI apparatus are stacked up to thereby obtain a stacked three-dimensional image (three-dimensional original image) and then two-dimensional images obtained by seeing the stacked three-dimensional image from arbitrary directions are shaded to construct a three-dimensional image (which means an image constituted by two-dimensionally arranged pixels but made to look like a three-dimensional image by shading).

Particularly, the present invention relates to a method and an apparatus, in which distortion created at the time of the projecting of the stacked three-dimensional image onto a two-dimensional plane is corrected and, further, the resulting image is displayed as if the inner wall of a tube-like tissue was observed under an endoscope.

Hereinafter, the "three-dimensional image" means an image projected onto a two-dimensional plane and shaded so as to look like a three-dimensional image. That is, the "three-dimensional image" is hereinafter distinguished from the stacked three-dimensional image (or three-dimensional original image).

In a conventional method of constructing a three-dimensional image, coordinate transformation according to parallel projection is used for transformation of coordinates of pixels into a coordinate system of a projection plane equivalent to a display screen.

In the parallel projection method used conventionally, a view point plane is not only a plane but also a projection plane. Accordingly, the parallel projection method is effective for constructing a three-dimensional image obtained by seeing a subject such as for example an internal organ, or the like, from the outside but is unsuitable for constructing a three-dimensional image obtained by seeing the subject from the inside, that is, unsuitable for constructing a three-dimensional image obtained by projecting a stacked three-dimensional image between a view point placed in the inside of the subject and a projection plane onto the projection plane.

There arises a problem that the parallel projection method cannot satisfy the recent demand that three-dimensional images should be obtained as if the inside of the subject was observed under an endoscope.

On the other hand, central projection method is one of projection methods used in the field of computer graphics. In the conventional central projection method, a point of view, a plane of projection and a subject of projection are arranged in order, so that the subject of projection is projected onto the projection plane while reduced in size. There arises a problem that resolving power is limited by a display matrix so as to be lowered compared with the case of 1: 1 display.

The prior art concerned with projection methods has been described in the following literature.

"Fundamentals of Interactive Computer Graphics" by J. D. FOLEY & A. VAN DAM, translated by Atsumi IMAMIYA, pp. 277, 278, 297–302, issued on Jul. 15, 1984 by Japan Computer Association.

SUMMARY OF THE INVENTION

An object of the present invention is to provide a method of constructing a three-dimensional image so that the three-dimensional image can be obtained as if the inside of a subject was observed under an endoscope, and an apparatus for the same.

Another object of the present invention is to provide a central projection method in which distortion of a projection image dependent on the direction of projection can be eliminated.

A further object of the present invention is to provide a method of constructing a three-dimensional image in which the position of a view point can be moved faithfully along the inside of a subject such as an intestine, or the like, by using the central projection method.

The present invention provides a method in which: a plurality of tomographic images including volume images are stacked to thereby obtain a stacked three-dimensional image; the stacked three-dimensional image is put between a view point and a projection plane and projected onto the projection plane from the view point to thereby obtain a two-dimensional image; and the two-dimensional image is shaded to thereby construct a three-dimensional image. For the projection of each of the tomographic images onto the projection plane, coordinates of pixels on the tomographic image are transformed into coordinates on the projection plane by using central projection (in which projection is performed by emitting projection lines radially from one point) and then a shading process in which shading is performed by giving pixel values to the coordinates of the respective pixels on the projection plane in accordance with shading algorithm is carried out to construct a three-dimensional image.

As one of such shading processes, shading in accordance with the distance between the subject of projection and the projection plane is used conventionally. On the contrary, in the present invention, shading is performed in accordance with the distance between the view point and the subject of projection. The pixel values are set so that the displayed image becomes darker as the distance from the position of the view point becomes larger.

By using coordinate transformation according to central projection for projection of each of the tomographic images onto the projection plane, an image obtained by seeing the subject from the inside of the subject (that is, an image obtained by placing the view point in the inside of the subject) is constructed. As a result, a three-dimensional image is obtained as if the inside of the subject was observed under an endoscope.

In the aforementioned central projection method, however, the following problem arises.

In FIG. 1, when subjects 40a and 40b of projection are projected onto a projection plane 21, projection images 40A and 40B are obtained respectively. Assuming now that the length (lateral size in FIG. 1) of the subject 40a is equal to the length of the subject 40b, then the subject 40b ought to look smaller than the subject 40a because the subject 40b is seen from farther away.

As is obvious from FIG. 1, after projection, the length of the image 40B becomes, reversely, larger than the length of the image 40A. There arises a problem that such distortion dependent on the direction of projection increases as the distance between the view point e and the projection plane 21 decreases.

In the present invention, therefore, unique coordinate transformation called "eye-ball transformation" is performed to correct such distortion.

The correction of distortion of a projection image is achieved by applying a theory shown in FIGS. 2A and 2B.

FIG. 2A shows an eye ball and substances 40a and 40b. In FIG. 2A, light rays 2 pass through a crystalline lens (lens) 3 and form images 40A' and 40B' on a retina 4 as a spherical surface. In this manner, the retina 4 is provided as a spherical surface in the natural world to reduce distortion dependent on the direction of projection.

In the present invention, as shown in FIG. 2B, after subjects of projection are once projected onto a spherical virtual projection plane 5, respective points expressing images on the spherical surface are reprojected onto a plane projection plane 21 located in the rear of the spherical surface in accordance with the length along the spherical surface between each point and the origin when the point of contact between the spherical surface and the projection plane is made the origin.

That is, the position of the point obtained by re-projection becomes nearer to the origin than the position of the point obtained by direct projection onto the projection plane. As a result, distortion of projection images dependent on the direction of projection is corrected so that difference between projection data (length, size) is reduced regardless of the difference in the direction of projection.

The movement of the view point is achieved by updating the view point, the view line direction from the view point and the projection plane in combination successively to move the view point, the view line direction and the projection plane in the direction of the depth of the three-dimensional original image and by projecting a part of the three-dimensional original image (hereinafter referred to as "unit three-dimensional image") interposed between the view point and the projection plane onto the projection plane by central projection to obtain a central projection image whenever updating is performed.

The "central projection image" means an image obtained by central projection and means an image before shading and hidden-surface processing.

The "hidden-surface processing" means a process in which when there are a plurality of pixel values overlapping each other in one and the same pixel position, the pixel value of the nearest position to the view point is set as the pixel value of the pixel position.

In this occasion, the three-dimensional image is displayed as an image obtained by applying shading and hidden-surface processing to the central projection image according to the present invention.

Further, in this occasion, a display range is extracted from the central projection image obtained by central projection onto the projection plane so that the display range has as its center the position of a perpendicular drawn from the view point to the projection plane, and then shading and hidden-surface processing are applied to the extracted center projection image, so that a three-dimensional image obtained whenever updating is performed is displayed.

Further, in this occasion, the projection plane is updated so as to be perpendicular to the view line direction from the view point.

Further, in this occasion, whenever updating is performed, the farthest pixel position from the view point is found out by referring to the distance from the view point, reflected in each pixel value in an image obtained by applying hidden-surface processing to a unit three-dimensional image before updating. The position of the view point and the view line direction after updating are determined so as to approach the farthest pixel position.

Further, in this occasion, a unit three-dimensional image obtained by two-valuing a concerned place which is a subject of projection is projected by central projection and then shading and hidden-surface processing are applied to respective pixels of central projection images corresponding to the value "1", so that a three-dimensional image is obtained and displayed.

According to the present invention, the view point, the view line direction from the view point and the projection plane are updated so that they are moved in combination in the direction of the depth of the three-dimensional original image. Further, a unit three-dimensional image interposed between the view point and the projection plane is projected onto the projection plane from the position of the view point and the view line direction by central projection. As a result, the view point can be moved in the direction of the depth of the three-dimensional original image, so that the inner wall of the subject such as an intestine, or the like, can be seen as if it was observed under a moving endoscope.

DESCRIPTION OF THE PREFERRED EMBODIMENTS

Embodiments of the present invention will be described below with reference to the drawings.

Figure 1:
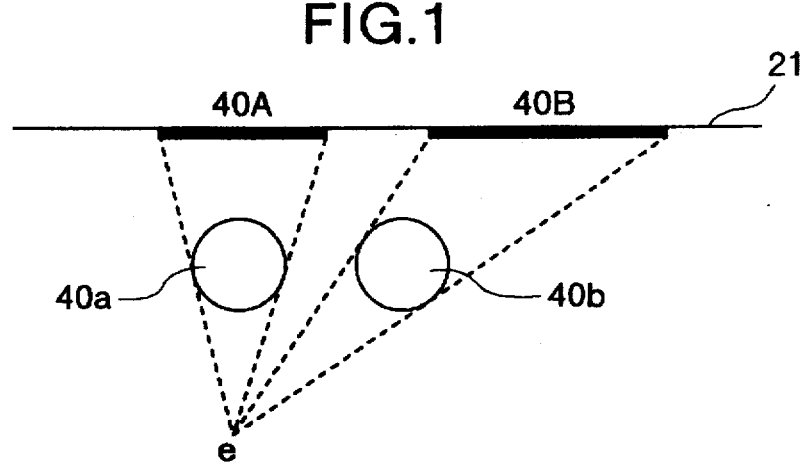
FIG. 1 a view for explaining the problem in the central projection method.
Figure 2A:
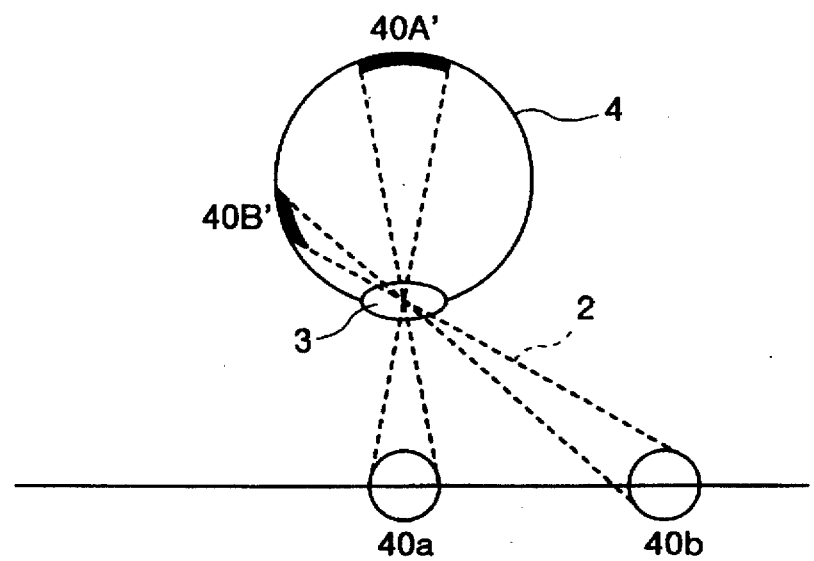
FIGS. 2A and 2B are views for explaining eye-ball transformation in the present invention.
Figure 2B:
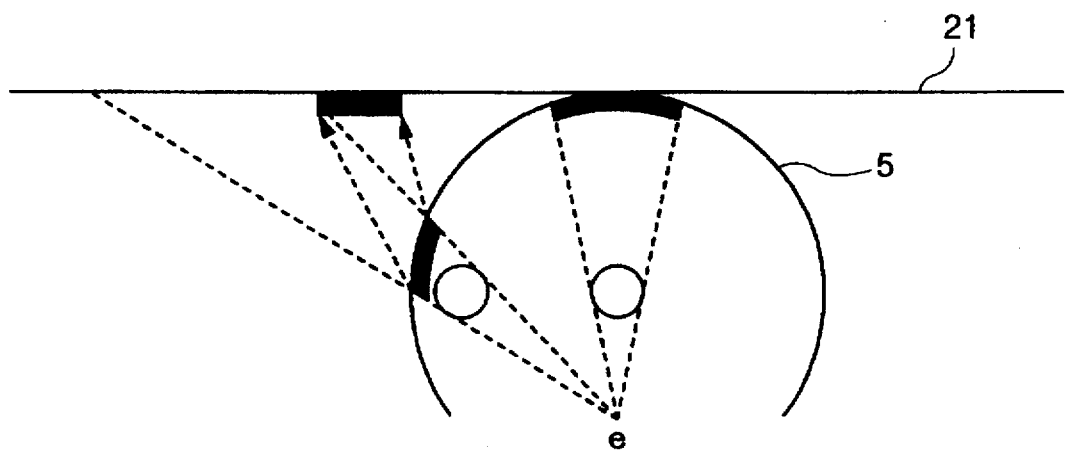
Figure 3:
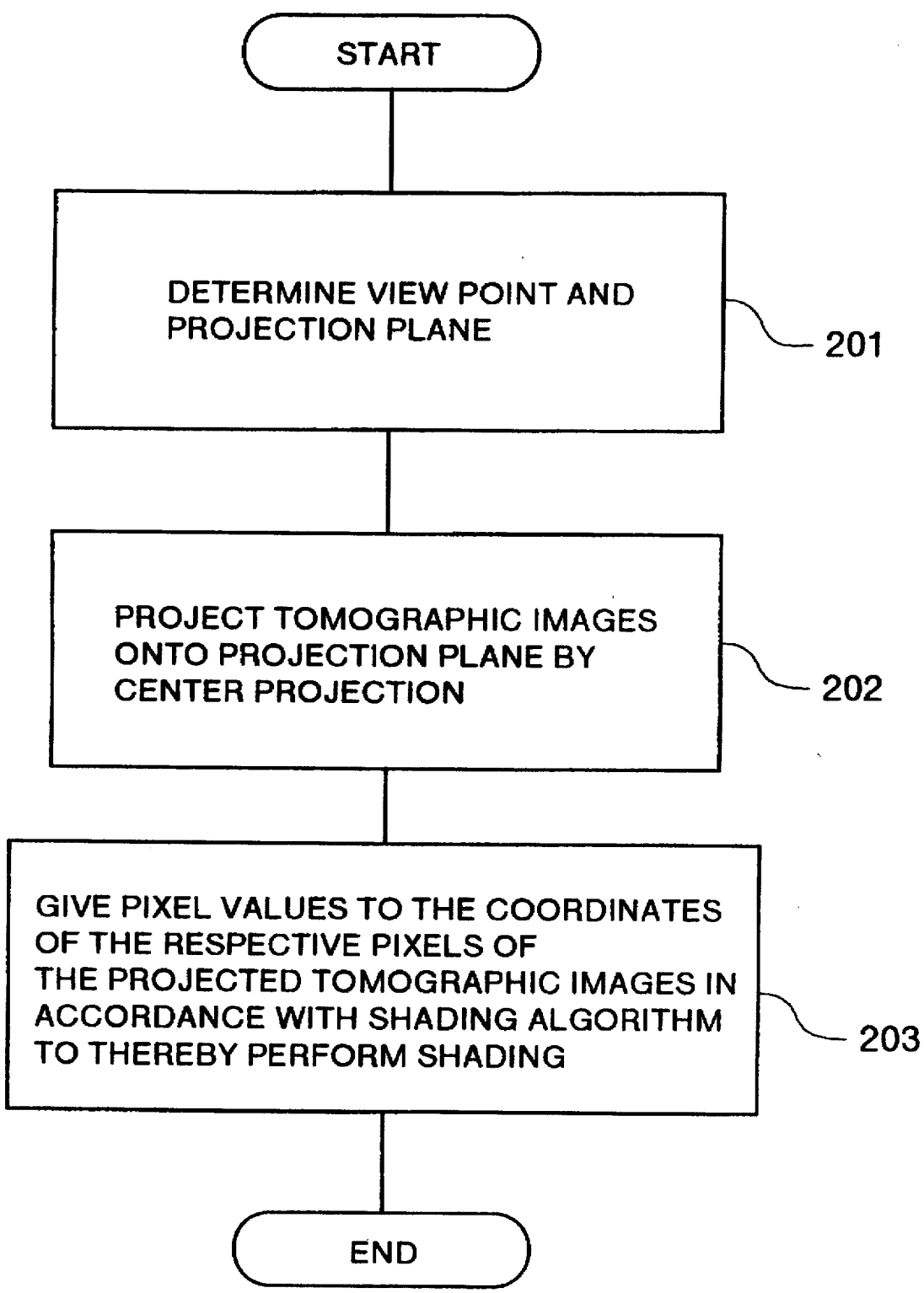
FIG. 3 is a flow chart showing the routine of obtaining a three-dimensional image by central projection and shading according to the present invention.

FIG. 3 is a flow chart showing an embodiment of a method of constructing three-dimensional image according to the present invention, As shown in FIG. 3, the method of constructing three-dimensional image according to the present invention is a method in which a plurality of tomographic images including volume images are stacked up to thereby obtain a stacked three-dimensional image and then two-dimensional images obtained by seeing the stacked three-dimensional image from arbitrary directions are shaded to construct a three-dimensional image, the method comprising the steps of: determining a point of view and a plane of projection (step 201); transforming coordinates of pixels of respective tomographic images into coordinates on the plane of projection by using central projection to thereby project the respective tomographic images onto the plane of projection (step 202); and giving pixel values to the coordinates of the respective pixels on the plane of projection according to shading algorithm to perform shading to thereby construct a three-dimensional image (step 203).

An MRI apparatus or the like does not measure images slice by slice two-dimensionally like an X-ray CT apparatus but it can measure a plurality of sliced images three-dimensionally. Accordingly, an image constructed by two-dimensional images arranged three-dimensionally can be obtained by the MRI apparatus. This image is called "volume image". This volume image (three-dimensionally arranged image) can be decomposed into two-dimensionally arranged images (slice arrangement). In the method according to the present invention, "the plurality of tomographic images" include such volume images.

The aforementioned coordinate transformation according to central projection will be described below in detail. To project the respective tomographic images onto the plane of projection according to central projection, coordinates of pixels of the respective tomographic images are transformed into coordinates on the plane of projection as follows.

Figure 4:
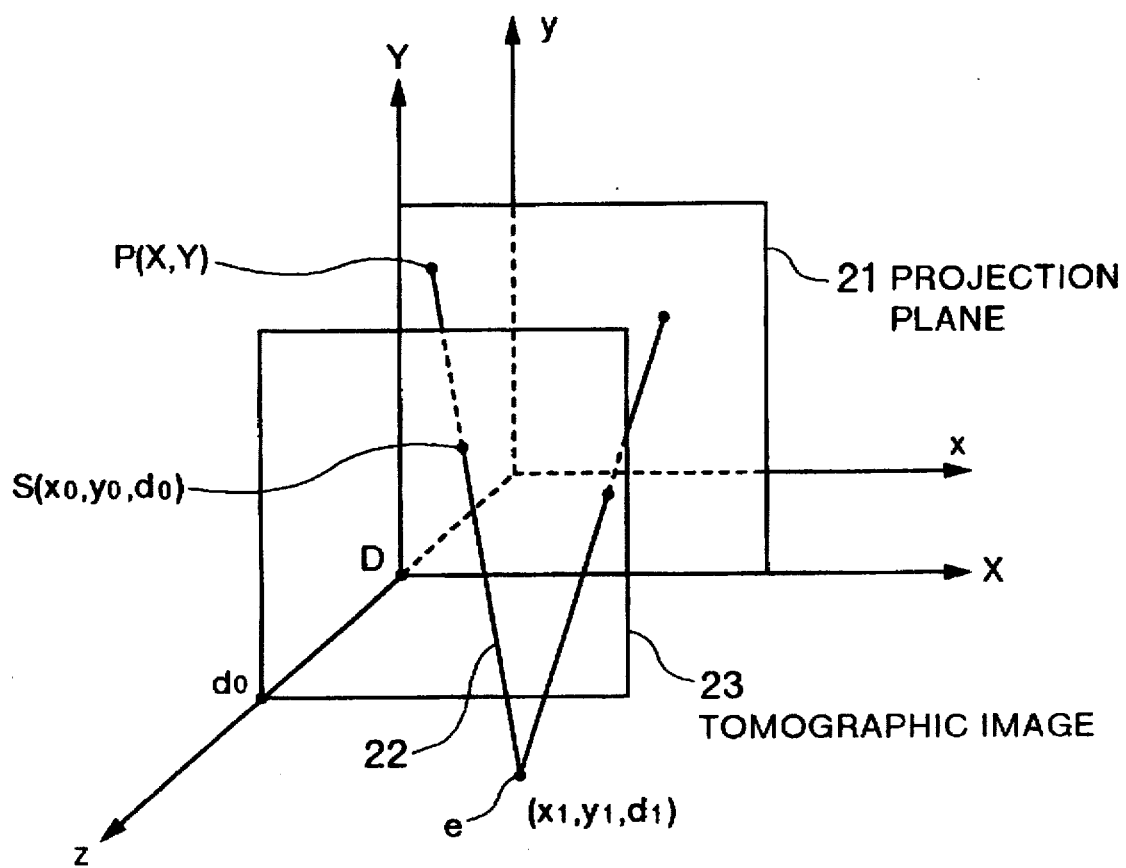
FIG. 4 is a graph showing the relation between each tomographic image and a projection plane in the central projection method.

In an example shown in FIG. 4, a coordinate system is taken so that the plane of projection is parallel with the surface of tomographic image and parallel with the x-y plane for simplification of description.

In FIG. 4, $\underline{x}$, $\underline{y}$ and $\underline{z}$ represent coordinate axes in a three-dimensional coordinate system (x, y, z), point $\underline{e}$ ($x_1$, $y_1$, $d_1$) represents the position of a point of view $\underline{e}$, point P (X, Y) represents a point (projection point) on the surface 21 of projection (equivalent to a display screen), and point S ($x_0$, $y_0$, $d_0$) represents a point (projection subject point) of intersection of the tomographic image 23 and a line 22 connecting the point $\underline{e}$ ($x_1$, $y_1$, $d_1$) and the point P (X, Y).

Further, D represents the position (on the $\underline{z}$ axis) of the surface 21 of projection which can be set freely.

Further, $d_0$ represents the position (on the $\underline{z}$ axis) of the tomographic image 23 which is determined at the time of measurement.

Further, $d_1$ represents the $\underline{z}$ coordinate of the view point $\underline{e}$.

According to the above definition, the following equations hold.

$$X=\{(D-d_1)/(d_0-d_1)\}\times(x_0-x_1)+x_1 \quad (1)$$

$$Y=\{(D-d_1)/(d_0-d_1)\}\times(y_0-y_1)+y_1 \quad (2)$$

$$x_0=\{(d_0-D)/(d_1-D)\}\times(x_1-x)+X \quad (3)$$

$$y_0=\{(d_0-D)/(d_1-D)\}\times(y_1-y)+Y \quad (4)$$

When the projected image is expressed in 512 pixels by 512 pixels on a display screen (not shown) corresponding to the projection plane 21, each of X and Y takes values of −256 to +256. On a tomographic image 23 at $d_0$, $x_0$ and $y_0$ are determined correspondingly to X and Y in accordance with the above equations (3) and (4), so that points to be projected are determined. Because there are a plurality of tomographic images and accordingly $d_0$ takes a plurality of values, a plurality of points $x_0$ and $y_0$ to be projected are determined correspondingly to one combination of X and Y.

Figure 5A:
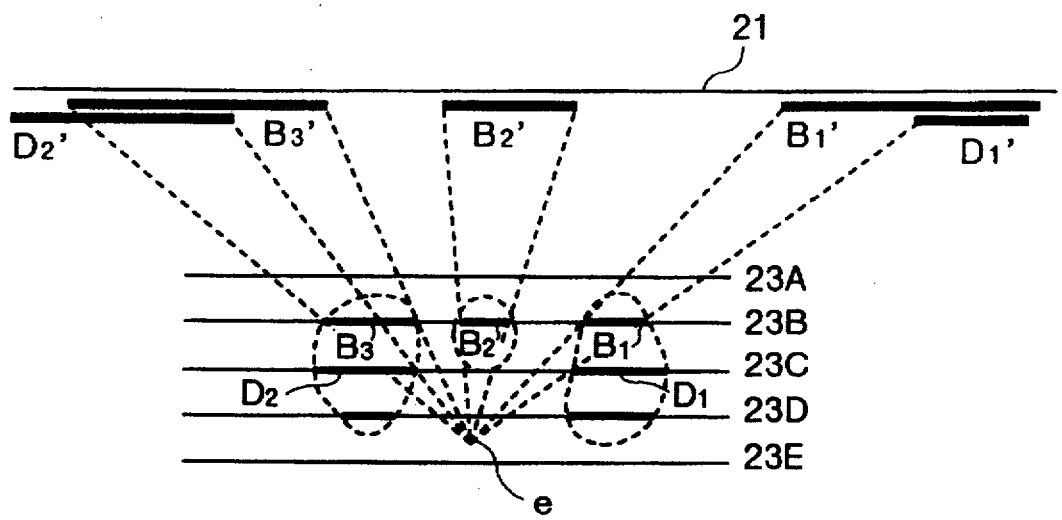
FIG. 5A is a view for explaining the case where the tomographic images are parallel with the projection plane.

FIG. 5A is a view from the direction of the $\underline{y}$ axis in the case where other tomographic images than the tomographic image 23 illustrated are provided in the same coordinate system. In FIG. 5A, the tomographic images 23A to 23E are tomographic images obtained at equal distances in the same and one direction by measuring the same and one subject (though illustrated example shows the case where the tomographic images are obtained at equal distances, it is not necessarily so). In the tomographic image 23B, regions $B_1$, $B_2$ and $B_3$ of internal organs are written emphatically. If the regions $B_1$, $B_2$ and $B_3$ of internal organs are projected onto the projection plane 21, then regions $B'$, $B_2'$ and $B_3'$ are formed. Similarly, if regions $D_1$ and $D_2$ of internal organs of the tomographic image 23C are projected onto the projection plane 21, then regions $D_1'$ and $D_2'$ are formed.

To obtain a three-dimensional effect, projection data (here $B_1'$, $B_2'$, $B_3'$; $D_1'$, $D_2'$) are written in a display memory (not shown) so that projection data farther from the view point $e$ are first written and then nearer projection data are overwritten. Accordingly, here, projection data $B_1'$, $B_2'$ and $B_3'$ are first written and then projection data $D_1'$ and $D_2'$ are overwritten, because projection data $B_1$, $B_2$ and $B_3$ are farther from the view point $e$ than projection data $D_1$ and $D_2$. Although projection data $B_1'$, $B_2'$, $B_3'$, $D_1'$ and $D_2'$ are shown in FIG. 5A as if they were separated from the projection plane 21, this is only for simplification of the sequence of projection data $B_1'$, $B_2'$, $B_3'$, $D_1'$ and $D_2'$ to be written in the display memory. That is, in practice, projection data $B_1'$, $B_2'$ and $B_3'$ written first and projection data $D_1'$ and $D_2'$ overwritten are projected onto the projection plane 21.

Figure 5B:
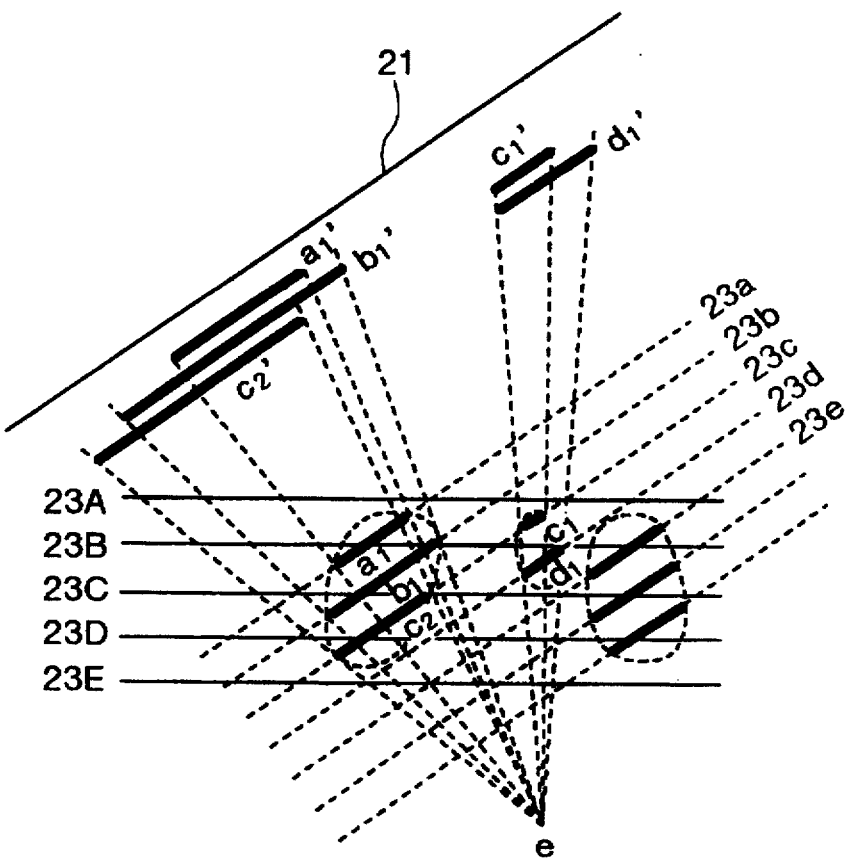
FIG. 5B is a view for explaining the case where the tomographic images are not parallel with the projection plane.

FIG. 5B shows a more generalized example than FIG. 5A, that is, FIG. 5B shows the case where the projection plane is not parallel with tomographic image surfaces. In this case, it is necessary that tomographic images $23a$, $23b$, $23c$ ... parallel with the projection plane 21 are generated by interpolation on the basis of the tomographic images 23A, 23B, 23C ... Other conditions are the same as those in FIG. 5A. In FIG. 5B, $a_1'$, $b_1'$, $c_1'$, $c_2'$ and $d_1'$ represent projection data of regions $a_1$, $b_1$, $c_1'$, $c_2$ and $d_1$ of internal organs on the tomographic images $23a$, $23b$, $23c$ and $23d$ generated by interpolation.

Figure 6:
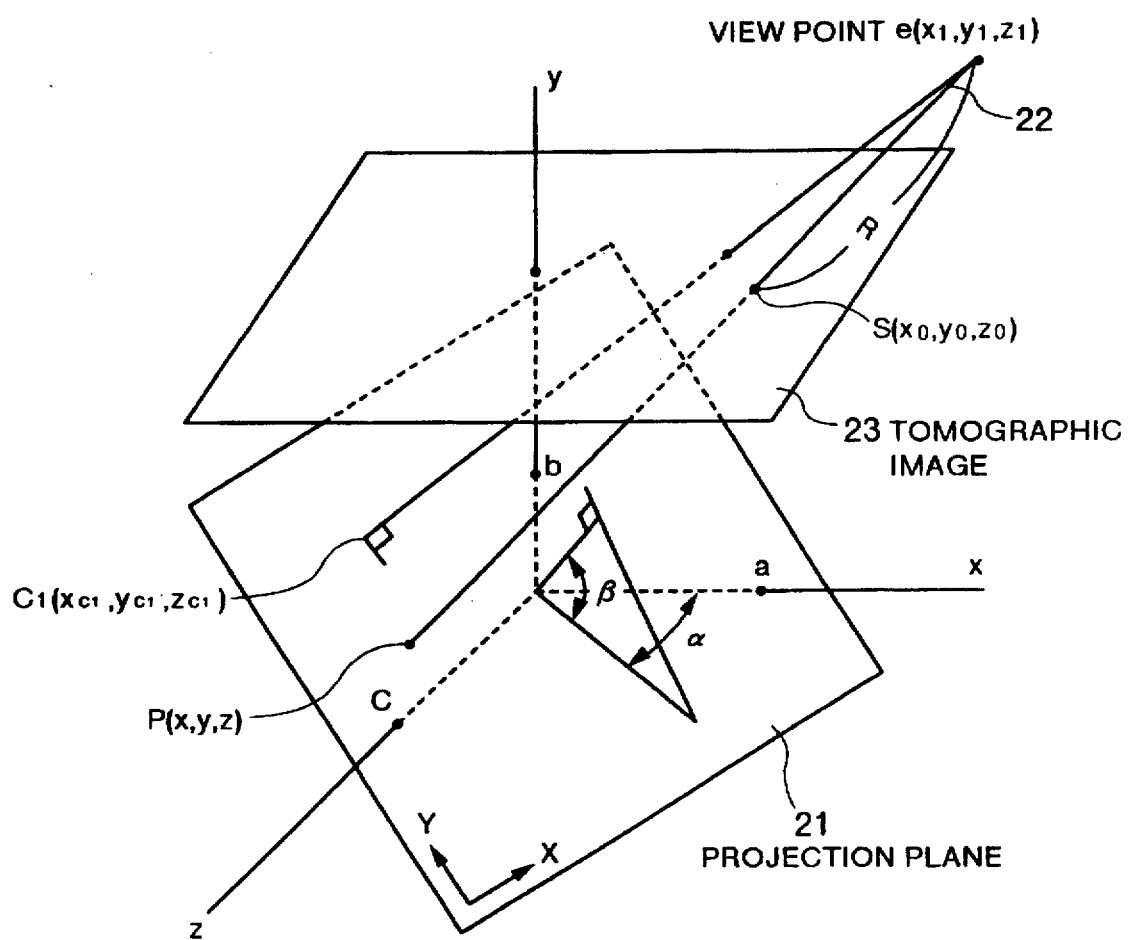
FIG. 6 is a graph for obtaining equations of the relation between a point on a tomographic image and a point on the projection plane in the case where the tomographic image is not parallel with the projection plane.

FIG. 6 is a view for explaining coordinate transformation based on central projection in the case where a view point, tomographic images and a projection plane have more complex positional relations. FIG. 6 shows that projection of point S ($x_0$, $z_0$, $y_0$) on a tomographic image 23 onto a projection plane 21 results in point P (x, y, z) on the projection plane.

In FIG. 6, for projection of the tomographic image 23 onto the projection plane 21 according to central projection, coordinates of pixels of the tomographic image 23 are transformed into coordinates on the projection plane 21 as follows.

Here, $a$ represents a point of intersection of the $x$ axis and the projection plane 21, $b$ represents a point of intersection of the $y$ axis and the projection plane 21, and $c$ represents a point of intersection of the $z$ axis and the projection plane 21.

Further, $\alpha$ represents an angle between a line obtained by projecting a perpendicular from the origin to the projection plane 21 onto the z-x plane and the z axis, $\beta$ represents an angle between the perpendicular and the x-z plane, point $e$ ($x_1$, $y_1$, $z_1$) represents the position of the view point $e$, point P (x, y, z) represents a point (projection point) on the projection plane (equivalent to the display screen), point S ($x_0$, $z_0$, $y_0$) represents a point (projection subject point) of intersection of a line 22 connecting the point $e$ ($x_1$, $y_1$, $z_1$) and the point P (x, y, z) and the tomographic image 23, and point $C_1$ ($x_{c1}$, $y_{c1}$, $z_{c1}$) represents a point of intersection of a perpendicular from the view point $e$ ($x_1$, $y_1$, $z_1$) to the projection plane 21 and the projection plane 21.

In the aforementioned definition, the following equations hold.

First, the projection plane 21 is given by the equation:

$$(x/a)+(y/b)+(z/c)=1 \qquad (5)$$

Further, the line 22 connecting the point $e$ ($x_1$, $y_1$, $z_1$) and the point P (x, y, z) is given by the equation:

$$(x_0-x)/(x_1-x)=(y_0-y)/(y_1-y)=(z-z)/(z_1-z) \qquad (6)$$

When the projection plane 21 is drawn through the point $C_1$ ($x_{c1}$, $y_{c1}$, $z_{c1}$), the equation of a plane drawn through the point ($x_{c1}$, $y_{c1}$, $z_{c1}$) and perpendicular to a unit vector $\vec{n}$ ($a_1$, $b_1$, $c_1$) (or a vector obtained by multiplying the unit vector by a constant) is generally given by the equation:

$$a_1(x-x_{c1})+b_1(y-y_{c1})+c_1(z-z_{c1})=0$$

in which $$a_1=1/a, \; b_1=1/b \text{ and } c_1=1/c.$$

Coordinates of a point on the projection plane in one coordinate system is transformed into coordinates in the other coordinate system as follows.

$$z = X \cdot \sin\alpha - Y \cdot \frac{\cos\alpha}{\sin\beta} - y \cdot \frac{\cos\alpha}{\sin\beta} \cdot \cos\beta$$

$$x = \frac{X - z \cdot \sin\alpha}{\cos\alpha}$$

From these equations, the point (x, y, z) on the projection plane 23 is given by the following equations:

$$z = [X \cdot k_1 - Y \cdot k_2 - y_{c1} \cdot k_3 - \{(c_1 \cdot k_3 \cdot z_{c1})/b_1\} + \qquad (7)$$
$$\{(a_1 \cdot k_3 \cdot X)/(b_1 \cdot \cos\alpha)\} - \{(a_1 \cdot k_3 \cdot x_{c1})/b_1\}]/[1 - \{(c_1 \cdot k_3)/b_1\} + \{(a_1 \cdot k_3 \cdot \sin\alpha)/(b_1 \cdot \cos\alpha)\}]$$

$$x = (X - z \cdot \sin\alpha)/\cos\alpha \qquad (8)$$

$$y = [y_{c1} + \{-c_1 \cdot (z - z_{c1}) - a_1 \cdot (x - x_{c1})\}]/b_1 \qquad (9)$$

in which $$k_1=\sin\alpha, \; k_2=\cos\alpha/\sin\beta \text{ and } k_3=\cos\alpha\cdot\cos\beta/\sin\beta.$$

Here, the aforementioned point $C_1$ ($x_{c1}$, $y_{c1}$, $z_{c1}$) may be given by the following equations:

$$z_{c1}=z_1\pm\{h/\text{sqrt}\{1+(c^2/a^2)+(c^2/b^2)\}\} \; (\text{``$-$''} \text{ in ``$z_1\pm$''} \text{ is valid in the case of } z_0<z_{c1}) \qquad (10)$$

$$x_{c1}=x_1+\{c\cdot(z_1-z_{c1})/a\} \qquad (11)$$

$$y_{c1}=y_1+\{c\cdot(z_1-z_{c1})/b\} \qquad (12)$$

in which $h$ represents the length of the perpendicular from the view point $e$ ($x_1$, $y_1$, $z_1$) to the projection plane 21.

When the projected image is expressed in 512 pixels by 512 pixels on the display screen (not shown) equivalent to the projection plane 21, each of X and Y takes values of $-256$ to $+256$. Values of $x$ and $y$ are determined correspondingly to the respective values of X and Y in accordance with the aforementioned equations (7), (8) and (9). Because $x_1$, $y_1$ and $z_1$ of the point $e$ are given freely, coordinates $x_0$ and $z_0$ of the pixel point S on the tomographic image $y_0=d_0$ are determined in accordance with the following equations (13) and (14).

$$x_0=\{(d_0-y)/(y_1-y)\}\times(x_1-x)+x \qquad (13)$$

$$z_0 = \{(d_0-y)/(y_1-y)\} \times (z_1-x) + z \quad (14)$$

Because $d_O$ takes a plurality of values correspondingly to the plurality of tomographic images, a plurality of points $x_0$ and $z_0$ to be projected are determined correspondingly to a combination of X and Y.

Although the equations (13) and (14) show the case where $(x_0, z_0)$ are obtained by designating (X, Y), the invention can be applied to the case where (X, Y) are obtained by designating $(x_0, z_0)$ conversely.

In FIG. 6, R represents the distance from the view point e to the point S. In the case where a depth image (which will be described later) is to be obtained, R becomes a parameter for obtaining the pixel value (luminance) of the point P. The pixel value I of the point P is proportional to a value obtained by subtracting R from the maximum pixel value (luminance) $I_{max}$ which is set in advance. That is, the pixel value I of the point P is given by the equation:

$$I = I_{max} - C \cdot R \quad (15)$$

in which C represents a constant generally having the value of 1.

The aforementioned coordinate transformation is performed with respect to all points on the projection plane 21 equivalent to the display screen. Further, the aforementioned coordinate transformation is performed with respect to all tomographic images 23.

In the present invention, shading is performed so that a perspective feeling is given to construct a three-dimensional image when the tomographic images are displayed on a two-dimensional display screen. Predetermined shading algorithm is used for shading, so that pixel values are given to coordinates of respective pixels on the projection plane 21 in accordance with the shading algorithm.

First, a procedure of constructing a three-dimensional image by using a depth method as the shading algorithm will be described with reference to FIGS. 4 and 7.

The "depth method" used herein means a method in which shading is performed in accordance with the distance between each pixel on a tomographic image 23 and a point onto which the pixel is projected. That is, shading is performed in accordance with the distance R between a point of intersection of a perpendicular drawn from each pixel on the tomographic image 23 to the projection plane (view point plane) and the pixel. In the conventional case, the view point is not given as a point but given as a plane (view point plane) because a parallel projection method is used. Accordingly, in the conventional case, the view point plane also serves as a projection plane.

In the present invention using a central projection method, shading is performed in accordance with the distance R between each pixel on the tomographic image 23 and the view point e.

In either case, it is general that shading increases (shades become darker) as the distance R increases. Incidentally, this relation may be reversed.

Figure 7:
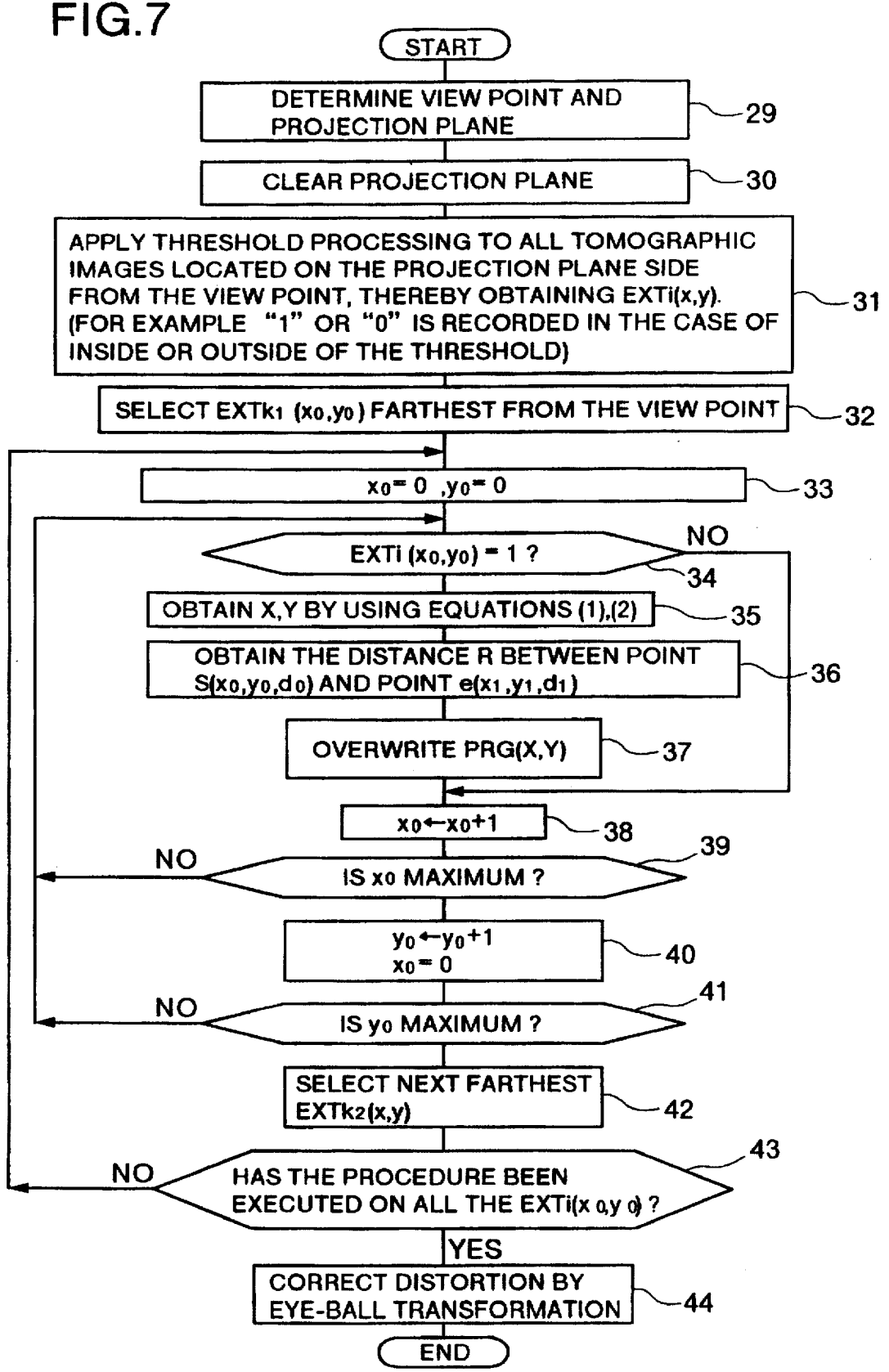
FIG. 7 is a flow chart in the case where shading is performed by the depth method.

FIG. 7 is a flow chart of the routine for projecting a projection subject image having known coordinates.

In step 29 in FIG. 7, a view point e and a projection plane 21 are determined.

In step 30, the projection plane 21 equivalent to a display screen is cleared. Here, an array PRG(x, y) is taken on a display memory (not shown) provided correspondingly to the projection plane 21, so that the array PRG(x, y) becomes zero.

In step 31, threshold processing is applied to all tomographic images 23 which are located on the projection plane 21 side from the view point e. If the value (CT value) of a pixel corresponding to an array EXTi(x, y) of a tomographic image 23 is not larger than a threshold value, "1" is recorded on a buffer memory (RAM). If the value (CT value) of a pixel corresponding to an array EXTi(x, y) is larger than the threshold value, "0" is recorded on the buffer memory (RAM). In the array EXTi(x, y), i represents tomographic image number.

Here, the threshold processing is performed, for example, in the case where an image of a specific internal organ or subject such as a skeleton, or the like, is to be extracted, constructed and displayed. Accordingly, the threshold value is determined in accordance with the subject of extraction.

In step 32, the farthest tomographic image $EXTk_1(x_0, y_0)$ from the view point e is selected from the all tomographic images subjected to the threshold processing (in this occasion, $i=k_1$). In the case where a Z buffer method is applied, however, the first tomographic image (nearest to the view point e) may be selected from the all tomographic images subjected to the threshold processing.

The "Z buffer method" used herein is one of hidden-surface erasing methods in the case of parallel projection, in which the distance R, which is between a point of intersection of a perpendicular drawn from each pixel on a tomographic image to a projection plane (view point plane) and the pixel, is calculated (accordingly, the value of the pixel is determined) so that pixels nearer to the view point plane are overwritten on the memory.

In step 33, coordinates of a pixel on the tomographic image are determined to satisfy the relations $x_0=0$ and $y_0=0$.

In step 34, a judgment is made as to whether the value of the pixel $(x_0, y_0)$ in the array EXTi of the two-valued tomographic image 23 is "1" or "0". If the value is "0", the CT value is out of range of the threshold value and the situation of the routine skips to step 38 without anything to do. If the value is "1", the situation of the routine goes to step 35.

In the step 35, X and Y are obtained by using $x_0, y_0, d_0$, the coordinates of the view point e and the aforementioned equations (1) and (2).

In step 36, the distance R between the point S $(x_0, y_0, z_0)$ and the position $(x_1, y_1, d_1)$ of the view point e is obtained.

In step 37, the relation PRG(X, Y)=(maximum brightness)−(constant)×R is formed so that the nearer to the view point e, the brighter. In the case where the Z buffer method is applied, values are compared with the values already stored in the display memory, so that brighter ones, that is, nearer ones to the view point plane are left.

In step 38, the position of the pixel is put forward by one pixel in the x direction (the value of $x_0$ is updated).

In step 39, the situation of the routine goes back to the step 34 and the aforementioned procedure is repeated unless the value of $x_0$ reaches the maximum. If the value of $x_0$ reaches the maximum, the situation of the routine goes to the next step 40.

In the step 40, the position of the pixel is put forward by one line in the y direction (the value of $y_0$ is updated). In this occasion, the value of $x_0$ is made zero.

In step 41, the situation of the routine goes back to the step 34 and the aforementioned procedure is repeated unless the value of $y_0$ reaches the maximum. If the value of $y_0$ reaches the maximum, the situation of the routine goes to the next step 42.

In the step 42, the next farthest tomographic image, that is, the second farthest tomographic image $EXTk_2$ from the view point e is selected. Further, i is set in the relation $i=k_2$. In the case where the Z buffer method is used, a tomographic image ranking next to the tomographic image selected in the step 32 is selected.

In step 43, a judgment is made as to whether the aforementioned procedure with respect to all tomographic images EXTi($x_0$, $y_0$) is completed or not. If the procedure is not completed, the situation of the routine goes back to the step 33. If the procedure is completed, the situation of the routine goes to step 44.

In the step 44, distortion is corrected by eye-ball transformation which will be described later, whereafter the routine is terminated. Alternatively, this eye-ball transformation may be put between the steps 35 and 36.

As described above, a three-dimensional image is constructed as if the inside of the subject was observed under an endoscope.

Although the above description has been made upon the case where two-valuing process is performed in the threshold processing in the step 31, the present invention can be applied to the case where the pixel values (CT values) of the tomographic image are used directly without two-valuing process. In the latter case, the pixel values are directly overwritten on the memory in the step 37 and the pixel values are directly subjected to threshold processing with use of the pixel values of the subject to be extracted as threshold values in the step 34 without judgment as to whether "1" or "0".

Further, the two-valuing process need not be performed in the step 31 and may be performed after the step 31, for example, in the step 34. In this occasion, the pixel values are directly subjected to threshold processing with use of the pixel values of the subject to be extracted as threshold values in the step 34 without judgment as to whether "1" or "0".

In this occasion, wasteful arithmetic operation can be eliminated to thereby shorten the processing time on the whole if tomographic images are subjected to threshold processing successively so that the threshold processing starts at the nearest tomographic image to the view point $e$ toward the point P. This is because construction is made so that the nearest subject to the view point $e$ is left last. That is, this is because no process is required after the subject to be extracted is found with the start of the threshold processing if tomographic images are processed successively so that the threshold processing starts at the nearest tomographic image to the view point $e$.

In the following, a procedure of constructing a three-dimensional image by using a volume rendering method (for example, Maec Levoy "Display of Surfaces from Volume Data"; IEEE Computer Graphics & Applications, May 1988, pp. 29–37) as shading algorithm will be described with reference to FIGS. 4 and 8. Assume now that a view point and a projection plane have been already determined.

Figure 8:
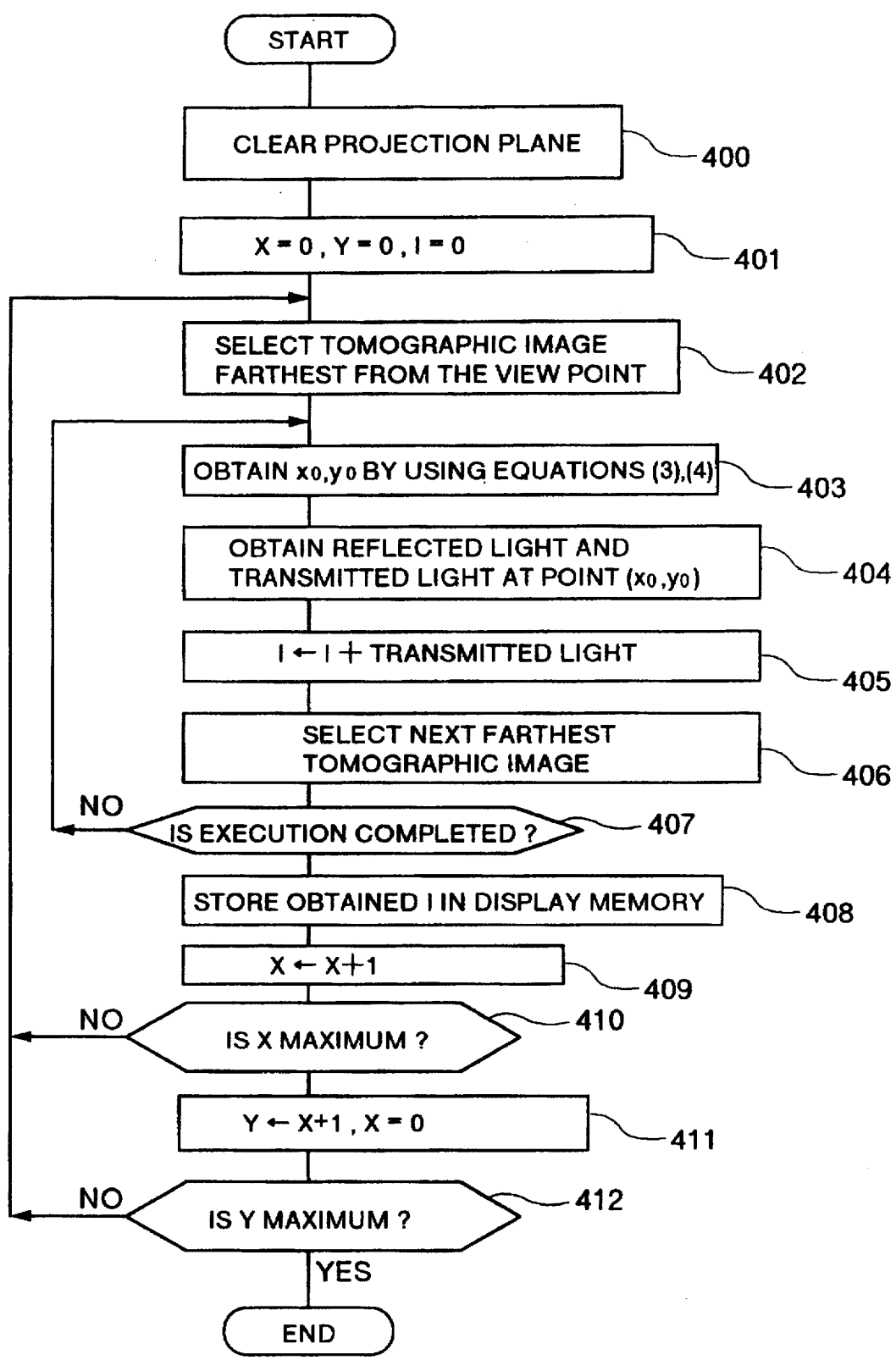
FIG. 8 is a flow chart in the case where shading is performed by the volume rendering method.

In FIG. 8, coordinates of a projection subject point are obtained after coordinates of a projection point on the projection plane are determined.

In step 400 in FIG. 8, the projection plane 21 equivalent to the display is cleared.

In step 401, the coordinates X and Y of a point on the projection plane 21 are put as X=0 and Y=0 and the density I of the three-dimensional image to be constructed is set as an initial value I=0.

By this setting, one projection line is determined.

In step 402, the farthest tomographic image 23A from the view point $e$ is selected. Assume now that light rays strike upon the tomographic image from the back and reach the view point while attenuating.

In step 403, the coordinates $x_0$ and $y_0$ of a point on the tomographic image are obtained by using the aforementioned equations (3) and (4).

In step 404, (the values of light intensity of) reflected light and transmitted light at the point ($x_0$, $y_0$, $d_0$) are obtained by a general volume rendering method such as the aforementioned method. Incidentally, ($x_0$, $y_0$) are obtained in the step 403 and $d_0$, $d_1$ and D are given freely in advance, that is, $d_0$, $d_1$ and D are known.

In step 405, the value of I is updated in the form of I←(I+transmitted light). Other light than simple transmitted light is neglected.

In step 406, the second farthest tomographic image from the view point $e$ is selected.

In step 407, a judgment is made as to whether execution with respect to all tomographic images on the projection plane 21 side from the view point $e$ is completed or not. If execution is not completed, the situation of the routine goes back to the step 403. If execution is completed, the situation of the routine goes to the next step 408.

In the step 408, the finally obtained density I at the point (X, Y) is stored in the display memory.

In step 409, the value of X is increased by one (the value of X is updated).

In step 410, the situation of the routine goes back to the step 402 and the aforementioned procedure is repeated unless the value of X reaches the maximum. If the value of X reaches the maximum, the situation of the routine goes to the next step 411.

In the step 411, the position of the pixel is put forward by one in the Y direction (the value of Y is updated). In this occasion, the vale of X is set as X=0.

In step 412, the situation of the routine goes back to the step 402 and the aforementioned procedure is repeated unless the value of Y reaches the maximum. If the value of Y reaches the maximum, the routine is terminated.

As described above, a three-dimensional image is constructed as if the inside of the subject was observed under an endoscope.

In the aforementioned shading process (either depth method or volume rendering method), a three-dimensional image is obtained as if the inside of the subject was observed while an endoscope was moved, when the position of the view point $e$ is moved interlockedly by the position input operation of a position input device (not shown) such as a mouse, a track ball, or the like. If the projection plane 21 is moved in the same direction as the position of the view point $e$ is moved close to or far from the projection plane in this case, sudden enlargement of the three-dimensional image and deterioration of the image quality can be avoided. In this occasion, the speed of the movement of the projection plane 21 may be equal to the speed of the movement of the view point $e$ or may be adjusted freely.

Figure 9:
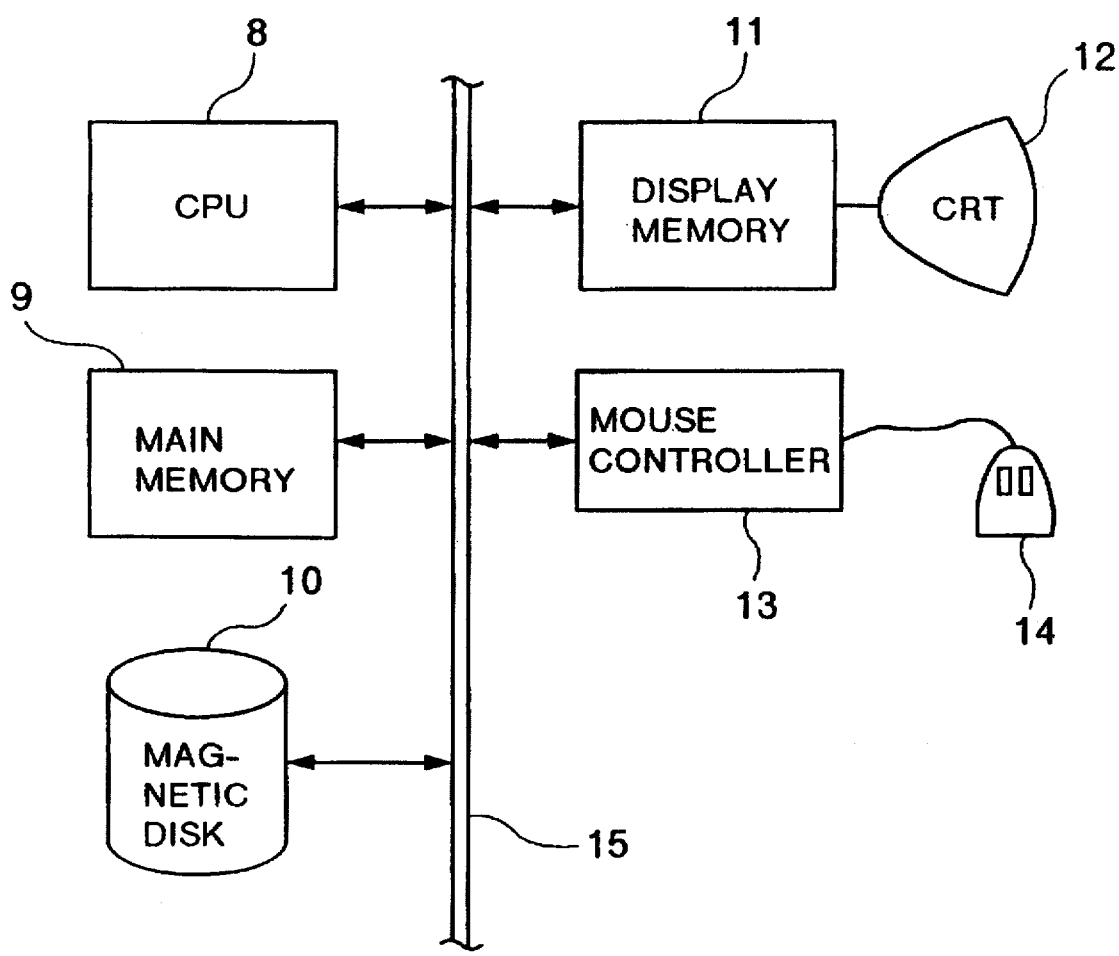
FIG. 9 is a block diagram of a hardware structure for realizing the present invention.

FIG. 9 is a block diagram showing an example of hardware structure to which the present invention can be applied.

In FIG. 9, the reference numeral 8 designates a central processing unit (CPU); 9, a main memory; 10, a magnetic disk; 11, a display memory; and 13, a mouse controller. These are connected to a common bus 15. A plurality of tomographic images and programs such as a program for coordinate transformation, a program for shading, and so on, are stored in the magnetic disk 10.

The CPU 8 reads the plurality of tomographic images and the programs for coordinate transformation and shading, constructs a three-dimensional image by using the main memory 9 as if the inside of the subject was observed under an endoscope, and feeds the resulting three-dimensional image to the display memory 11 to display the three-dimensional image on a CRT monitor 12. A mouse 14 connected to the mouse controller 13 is used to set the position of the view point, or the like, for constructing the three-dimensional image. The three-dimensional image thus obtained is stored in the magnetic disk 10 as occasion demands.

Figure 10:
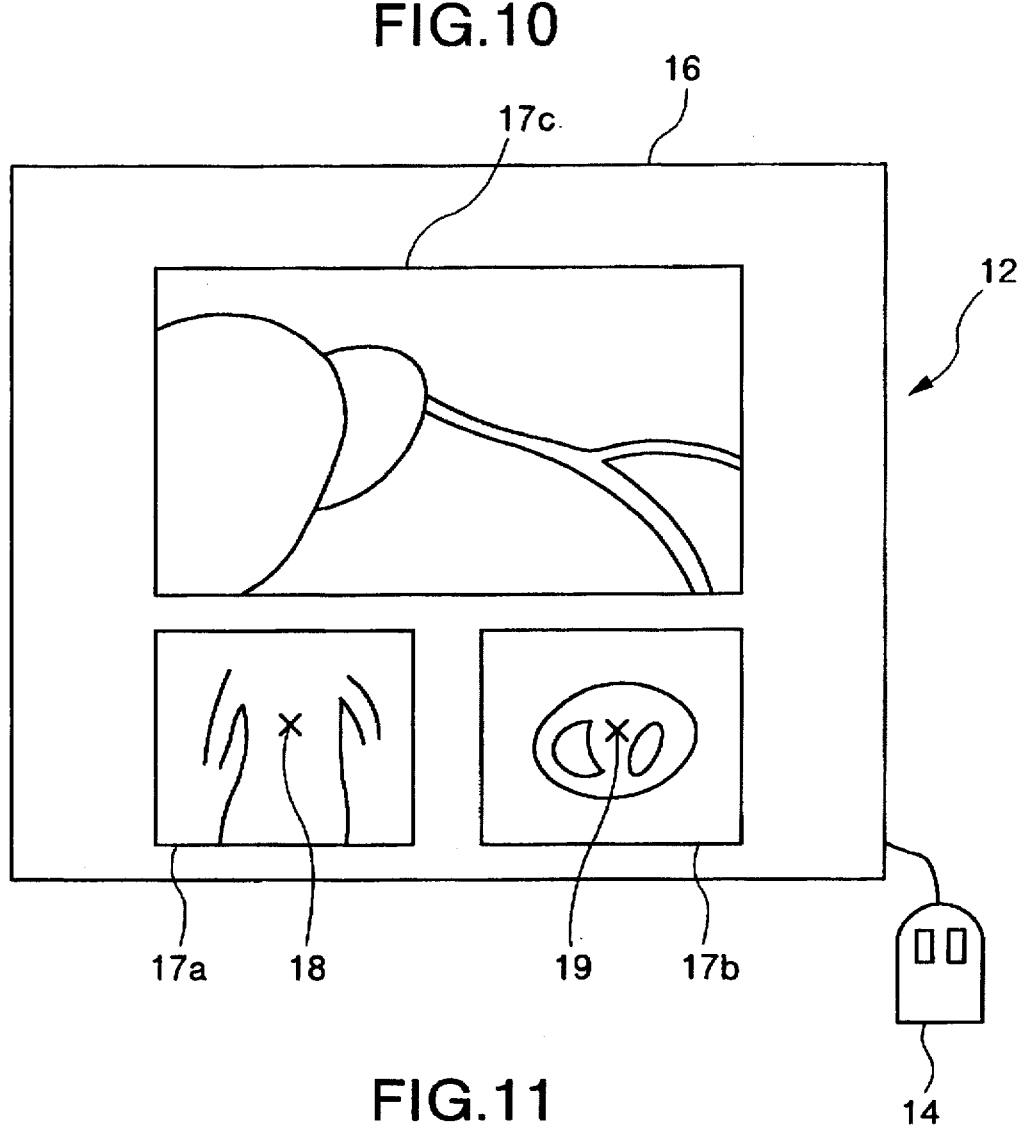
FIG. 10 is a view for explaining an embodiment of the invention in which the view point is set by using a scanogram image.

The setting of the position of the view point by the mouse 14 is performed as shown in FIG. 10, for example, by using a scanogram image and a CT image (tomographic image). In FIG. 10, the reference numeral 16 designates a screen of the CRT monitor 12; 17a, a scanogram image; and 17b, a CT image. The tomographic position 18 and the position 19 on tomographic image as required for specifying the view point are set to desired positions of the scanogram image 17a and the CT image 17b by the mouse 14 to thereby set the three-dimensional position of the view point e in the inside of the subject. The reference numeral 17c designates a three-dimensional image thus constructed and displayed by a central projection method. In the three-dimensional image, there is shown a state in which the kidney is located in the front of the liver and blood vessels run from the nearly center to the right front side.

Further, if two view points (left eye's view point and right eye's view point) shifting slightly left and right are set in advance to construct two-in-a-set projection images (three-dimensional images) individually in the same direction of turning of eyes so that the first image obtained from the left eye's view point and the second image obtained from the right eye's view point are seen by the left and right eyes individually, the three-dimensional images after construction can be observed stereoscopically.

The respective embodiments of the present invention can be applied to construction of the respective three-dimensional images. In the case where it is necessary to move the view points, the two view points are moved so as to be interlocked with each other so that the projection plane is updated on the assumption that one view point is located in the middle between the two view points.

Figure 11:
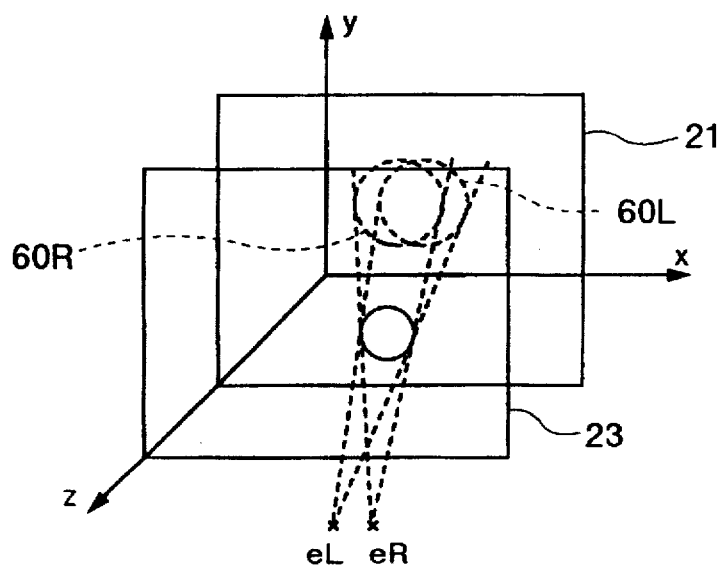
FIG. 11 is a graph showing an example of construction of a three-dimensional image which can be observed stereoscopically.
Figure 12:
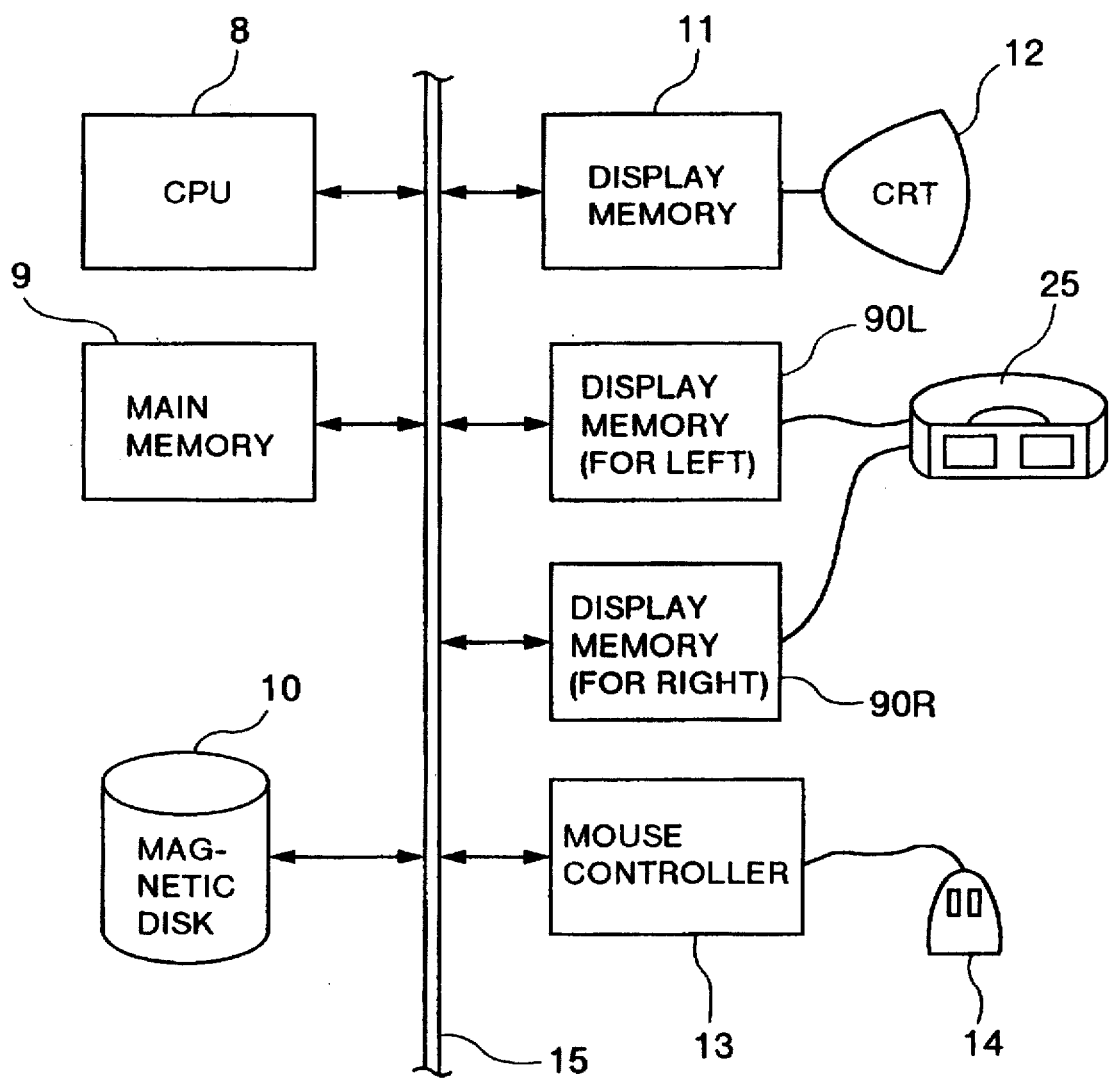
FIG. 12 is a block diagram of a hardware structure for observing a three-dimensional image stereoscopically.

FIG. 11 shows an example of construction of three-dimensional images capable of being observed stereoscopically as described above. FIG. 12 shows an example of hardware structure for making stereoscopic observation possible as described above. In FIG. 11, $e_L$ designates a left eye's view point; eR, a right eye's view point; 60L, a three-dimensional image from the left eye's view point $e_L$ (left eye's three-dimensional image); and 60R, a three-dimensional image from the right eye's view point eR (right eye's three-dimensional image). Other structure is the same as that in FIG. 4.

In FIG. 12, the reference numeral 90L designates a display memory for the left eye's three-dimensional image 60L; 90R, a display memory for the right eye's three-dimensional image 60R; and 25, a display (for example, head-mounted display) which is formed so that the left eye's three-dimensional image 60L and the right eye's three-dimensional image 60R are observed only by the left eye and the right eye, respectively.

When the left eye's three-dimensional image 60L and the right eye's three-dimensional image 60R on the display 25 are observed by the left eye and the right eye individually, the three-dimensional images after construction are observed stereoscopically.

Figure 13:
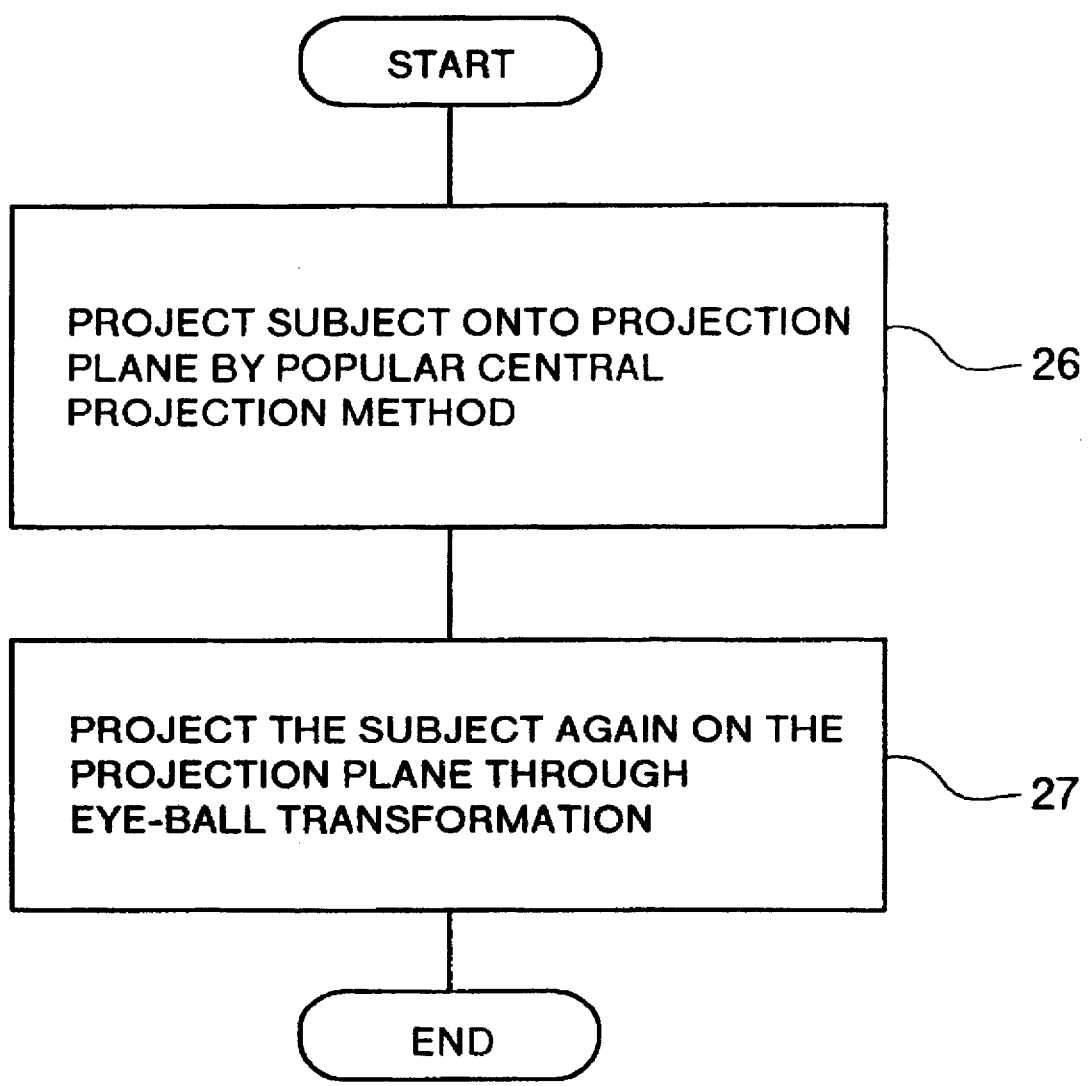
FIG. 13 is a flow chart showing the routine of obtaining a three-dimensional image by carrying out eye-ball transformation in the present invention.

FIG. 13 is a flow chart showing another embodiment of the present invention.

As shown in FIG. 13, first, an image of a subject of projection is projected onto a projection plane constructed by a plane, by a popular central projection method or the aforementioned central projection method according to the present invention (step 26).

Figure 14:
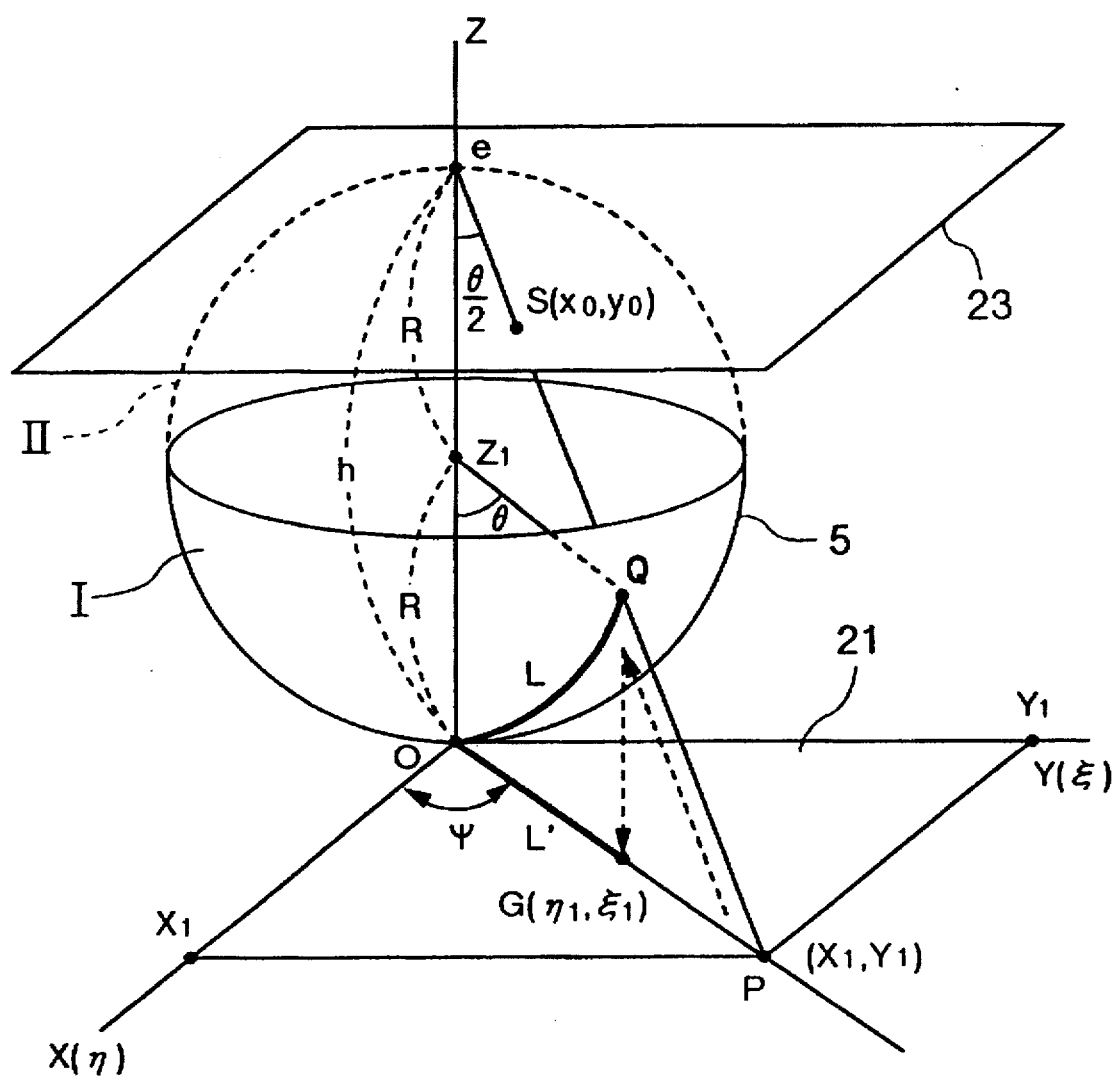
FIG. 14 is a graph for explaining the theory of eye-ball transformation in the present invention in the case where the distance between the origin and the view point is twice as large as the radius of the spherical surface.

Further, distortion in the image of the subject is corrected by eye-ball transformation (which will be described later) after the projection of the image or at the time of the projection of the image and then the image of the subject is re-projected onto the projection plane to obtain the corrected image of the subject (step 27). The "eye-ball transformation" used herein is as follows. As shown in FIG. 14, a spherical surface 5 which touches the projection plane at the origin O and which has its center $Z_1$ on the view line (Z axis) is defined. This spherical surface is divided into two semi-spherical surfaces in a direction perpendicular to the view line at the center position. A semispherical surface I (this I is not "1" in the equation (15)) farther from the view point is made an intermediate projection plane.

The position Q (on the intermediate projection plane) of the point S on the tomographic image 23 is obtained, so that the point S is re-projected onto the plane projection plane by the distance (on the spherical surface) between the point S and the origin O.

That is, in the present invention, the spherical surface is used as a projection plane for central projection. In this case, respective points (addresses) along the semispherical surface which is an intermediate projection plane correspond to CRT display pixels (addresses). Further, distortion is corrected by eye-ball transformation so that the same effect as that obtained by projection onto the projection spherical surface is obtained on the plane (CRT screen).

The theory of distortion correction by eye-ball transformation in the method according to the present invention will be described below with reference to FIGS. 14, 15A and 15B. Central projection is performed by the method shown in FIGS. 4 and 6.

Referring now to FIG. 14, there is shown the case where the view point e is set to satisfy the relation h=2R. In FIG. 14, the reference numeral 5 designates a projection plane (hereinafter referred to as "projection spherical surface") constructed by farther one I (from the view point) of two semispherical surfaces I and II obtained by dividing a spherical surface having its center $Z_1$ on the view line (Z axis) into two in a direction perpendicular to the view line at the center position. The reference numeral 21 designates a projection plane constructed by a plane. This projection plane 21 is not only a primary projection plane which serves as a projection plane before distortion correction by eye-ball transformation, that is, as a projection plane in the conventional method, but a secondary projection plane which serves as a projection plane after distortion correction by eye-ball transformation. This projection plane 21 is equivalent to a screen which is a CRT display surface.

In this embodiment, when the view point e and the projection plane 21 are set in order to re-project a projection image on the spherical surface I onto the projection plane, the final position of a projection point on the projection plane is determined on the basis of the length of a circular arc (on the spherical surface) to the projection image (that is, the length of a circular arc from a point of contact between the spherical surface and the projection plane to the projection point on the spherical surface). In FIG. 14, X, Y and Z represent respective axes in a three-dimensional coordinate system. The Z axis coincides with a perpendicular drawn from the view point to the projection plane. In FIG. 14, O represents the origin in the three-dimensional coordinate system. The projection spherical surface 5 touches the projection plane 21 at the origin O. This origin O comes to the center of the display surface when displayed. In FIG. 14, e represents the view point, h, represents the distance between the view point e and the projection plane 21, $Z_1$ represents the center of the projection spherical surface 5, R represents the radius of the projection spherical surface 5, S represents a projection subject point, P represents a point ($X_1$, $Y_1$) on the projection plane 21, $\phi$ represents an angle between a line OP and the X axis, Q represents a point (on the projection spherical surface 5) corresponding to the point P on the projection plane 21 (that is, a point of intersection of a line P-e and the projection spherical surface 5), G represents the position of projection of the projection subject point S after eye-ball transformation, $\theta$ represents an angle between a line $Z_1$-Q and the Z axis, L represents the length of a circular arc OQ on the projection spherical surface 5, L' represents a line segment (on the line OP) having the same length as L, $\eta$ represents a CRT display address (taken in parallel with the X axis) and $\xi$ represents a CRT display address (taken in parallel with the Y axis).

In the aforementioned definition, the following equations hold.

In the case of h=2·R to simulate an eye ball, $\tan(\theta/2) = \mathrm{sqrt}(X_1^2 + Y_1^2)/2R$ with respect to a triangle eOP and $\tan(\phi) = Y_1/X_1$ with respect to a triangle $X_1$OP are given.

Accordingly, when values of $X_1$ and $Y_1$ are set on the projection plane, corresponding values of $\eta_1$ and $\xi_1$ after eye-ball transformation are given by the equations:

$\eta_1 = L \cdot \cos(\phi)$ $\xi_1 = L \cdot \sin(\phi)$ in which $\phi = \arctan(Y_1/X_1)$,
$\theta = 2 \cdot \arctan[\mathrm{sqrt}(X_1^2 + Y_1^2)/2R]$, and
$L = R \cdot \theta$.

These values of $\eta_1$ and $\xi_1$ form an address of a pixel on the display memory. That is, the point ($X_1$, $Y_1$) on the projection plane 21 is displayed as the point G ($\eta_1$, $\xi_1$) on the CRT screen, so that distortion is corrected by eye-ball transformation.

Further, the image size is reduced because of the eye-ball transformation (the image size is reduced from the point P to the point ($\eta_1$, $\xi_1$)). Accordingly, the image size of the image projected onto the projection plane 21 after distortion correction becomes smaller than the image size of the image directly projected onto the plane. Accordingly, a wider region can be projected as long as the memory used in this embodiment has the same capacity as the memory used in the conventional case.

The case where h is not equal to 2R will be described below with reference to FIGS. 15A and 15B. Like numerals in each of FIGS. 14, 15A and 15B refer to like or equivalent parts. FIG. 15B is a side view of the projection of FIG. 15A.

Figure 15A:
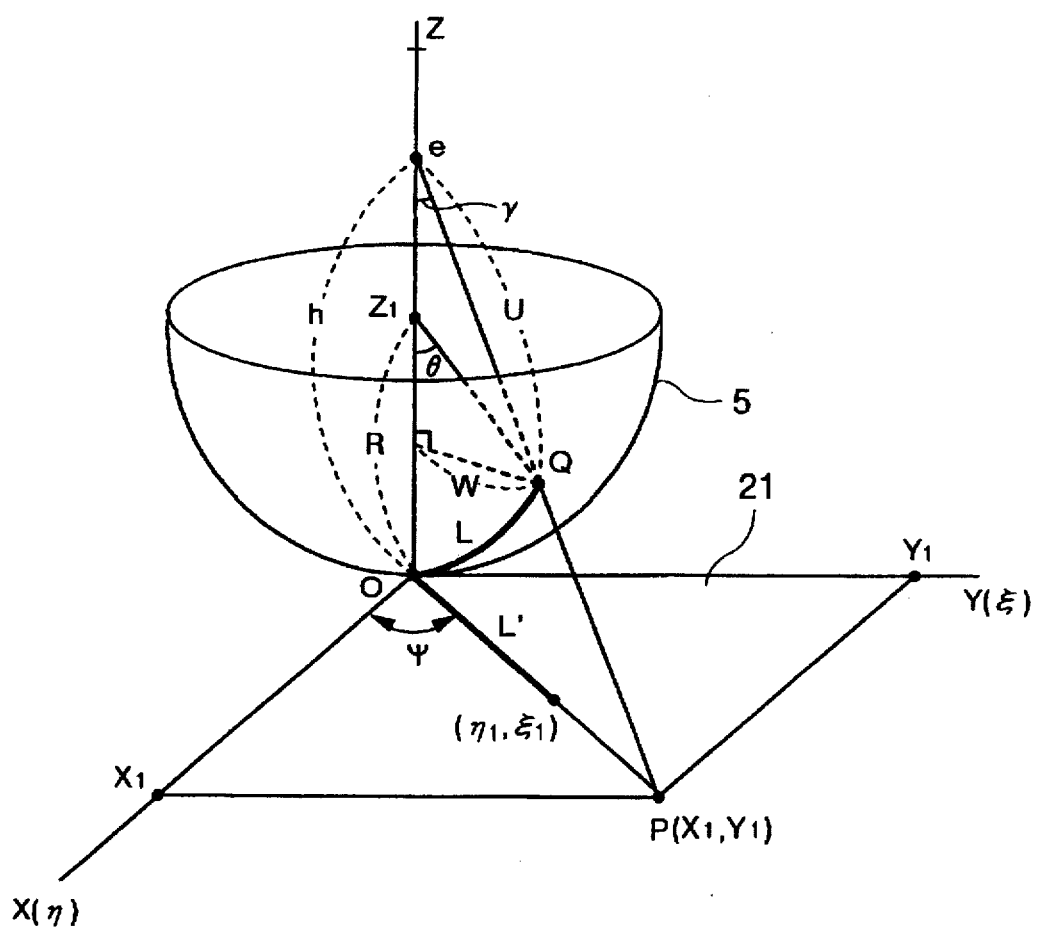
FIG. 15A is a graph for explaining the theory of eye-ball transformation in the present invention in the case where the distance between the origin and the view point is not twice as large as the radius of the spherical surface.
Figure 15B:
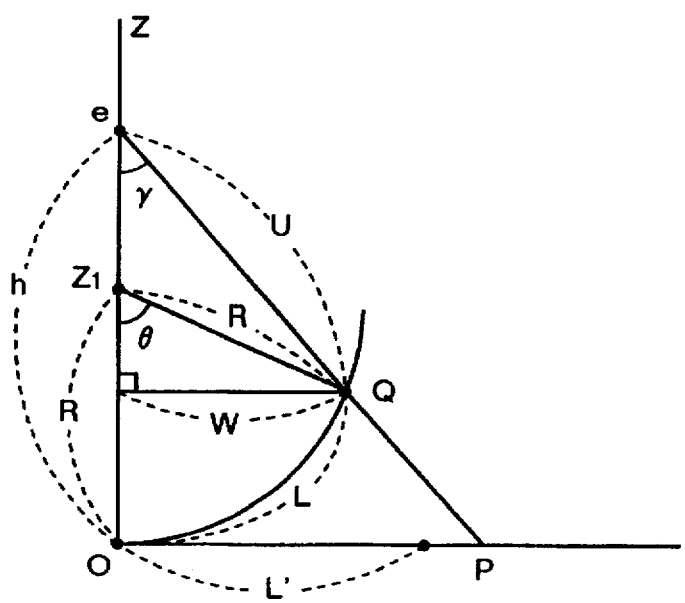
FIG. 15B is a side view of projection of FIG. 15A.

In FIGS. 15A and 15B, U represents the length of a line segment eQ, $\gamma$ represents an angle between a line segment eP and the Z axis, and w represents the length of a perpendicular drawn from a point Q to the Z axis.

In the aforementioned definition, the following equation holds.

$U = \mathrm{sqrt}[(h-R)^2 + R^2 - 2 \cdot (h-R) \cdot R \cdot \cos(\pi - \theta)]$ Then, the following equation is given.

$U \cdot \sin \gamma = R \cdot \sin \theta$

Further, y is given by the following equation.

$\tan \gamma = \mathrm{sqrt}(X_1^2 + Y_1^2)/h$

Accordingly, $\theta$ is obtained by setting $X_1$ and $Y_1$ on the projection plane.

Further, when $\phi$ is obtained on the basis of $\tan\phi = Y_1/X_1$, the following equations are obtained because of $L = R \cdot \theta$.

$\eta_1 = L \cdot \cos \phi$ $\xi_1 = L \cdot \sin \phi$

These values of $\eta_1$ and $\xi_1$ form an address of a pixel on the display memory. That is, the point ($X_1$, $Y_1$) on the projection plane 21 is displayed as the point G ($\eta_1$, $\xi_1$) on the CRT screen, so that distortion is corrected by eye-ball transformation.

The subject of projection may be data inputted by an input device such as a mouse, or the like, or may be data obtained by processing tomographic images (including tomographic images obtained by decomposing volume images obtained by three-dimensional measurement) by an arithmetic operation unit.

The point S ($x_0$, $y_0$) on the tomographic image is obtained in accordance with the equations (13) and (14).

Although the above description has been made upon the case where the projection plane is given as a spherical surface, the present invention can also be applied to the case where the projection plane is given as an elliptic surface or another curved surface.

In FIG. 6, R represents the distance from the view point e to the point S. In the case where a depth image is to be obtained, this value R serves as a parameter for obtaining the pixel value (luminance) of the point P. The pixel value of the point P is proportional to a value obtained by subtracting the value R from the maximum set pixel value $R_{max}$ (luminance). Because this point P corresponds to the point ($\eta$, $\xi$) on the display memory, the pixel value is stored in the point ($\eta$, $\xi$).

The aforementioned coordinate transformation is performed with respect to all points on the projection plane 21 equivalent to the display screen. Further, the aforementioned coordinate transformation is performed with respect to all tomographic images 23. Further, the aforementioned coordinate transformation may be performed with respect to the three-dimensional image which is a resulting image after construction or may be performed successively one by one with respect to tomographic images before construction.

In FIG. 11, a spherical surface is determined upon the assumption that one view point is located in the middle between the two view points $e_L$ and $e_R$, so that eye-ball transformation is performed with respect to each view point.

The hardware structure for performing eye-ball transformation is the same as in FIG. 9.

A plurality of tomographic images, arithmetic operation programs for executing the method according to the present invention, and so on, are stored in the magnetic disk 10.

The CPU 8 reads the plurality of tomographic images and the arithmetic operation programs for executing the method according to the present invention, carries out an arithmetic operation for eye-ball transformation or the like by using the main memory 9 and feeds results of the arithmetic operation to the display memory 11 to display the results on the CRT monitor 12. The mouse 14 connected to the mouse controller 13 is used to set the position of the view point or the like for carrying out the arithmetic operation for eye-ball transformation or the like. The image subjected to distortion correction by eye-ball transformation is stored in the magnetic disk 10 as occasion demands.

Figure 16:
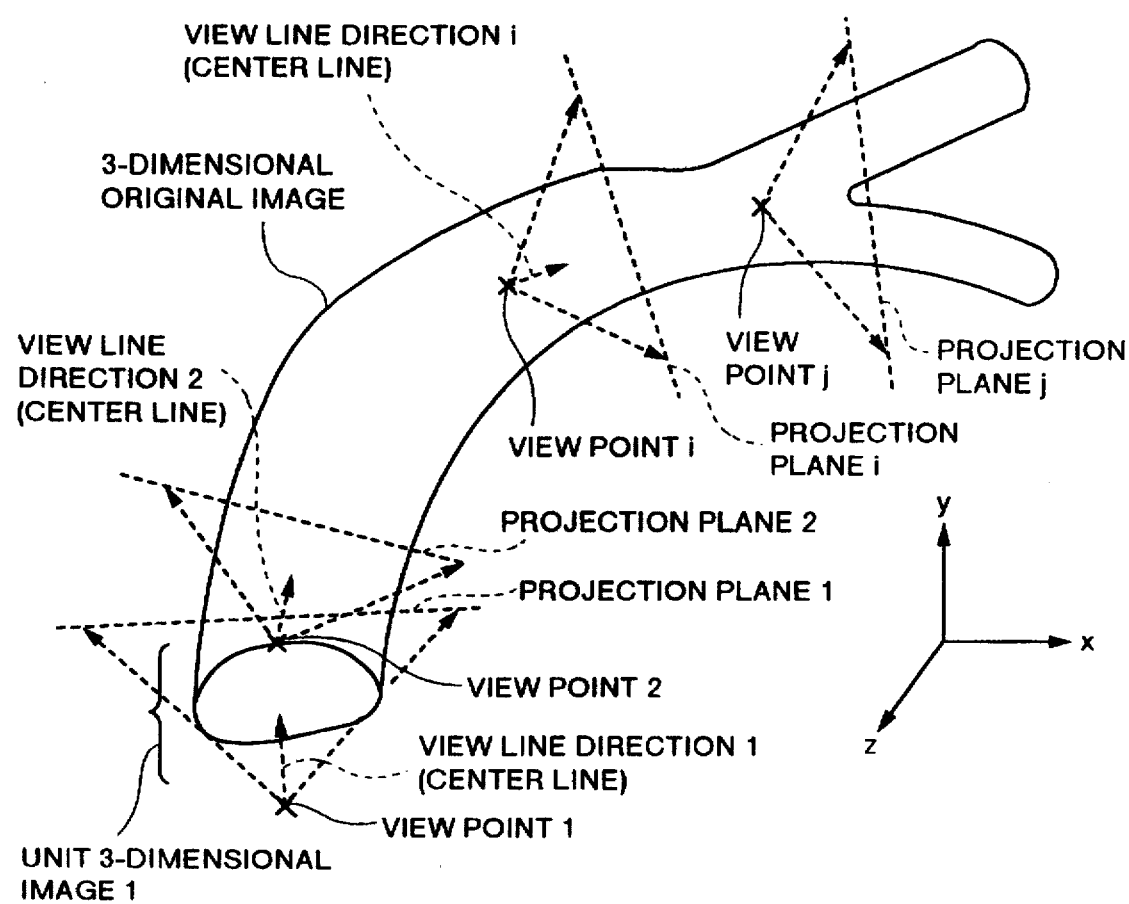
FIG. 16 is a view for explaining the operation of an embodiment of the invention in which the view point and the projection plane are moved in combination.

FIG. 16 is a typical view showing a further embodiment in which the view point and the projection plane are updated in the direction of the depth of a three-dimensional image having a pipe path. First, a view point 1, a view line direction 1 and a projection plane 1 are given so that a central projection image from the view point 1 is obtained on the projection plane 1. The central projection image is an image obtained by central projection of a unit three-dimensional image 1 between the projection plane 1 and the view point 1. Then, a view point 2 is given to a position deeper than the view point 1 and a view line direction 2 is obtained, so that a central projection image is obtained on a projection plane 2 opposite to the view point 2. Thereafter, the view point, the view line direction and the projection plane are updated in the direction of the depth of the image in the same manner as described above. The view point i shows an arbitrary position to which the view point is updated. Further, the view point j shows the case where the pipe path branches into two. This corresponds to an example shown in FIG. 18.

Terms used in this embodiment will be explained below.

Unit three-dimensional image—This is a three-dimensional original image (stacked three-dimensional image) interposed between the view point and the projection plane which are determined whenever updating is performed. This is constituted by a plurality of tomographic images. Specifically, the unit three-dimensional image is a part of the three-dimensional original image, so that the unit three-dimensional image is updated or changed whenever updating is performed.

The view point, the view line direction from the view point and the projection plane are updated in combination—This means that updating is performed while the view point is moved as a point in the direction of the depth of the three-dimensional original image. For example, in the case where a three-dimensional original image having a pipe path (such as an intestine or a trachea) formed in the direction of the depth thereof is to be inspected as if the deep side of the pipe path thereof was observed under an endoscope, it is a good convenience that the image can be observed while tracked in the direction of the depth thereof. In order to track the image in the direction of the depth thereof, the view point, the view line direction and the projection plane are updated in combination. It is preferable that the projection plane is determined to be perpendicular to the view line direction. Determining the projection plane to be perpendicular to the view line direction means determining the projection plane so that the center line of the view line direction becomes a line perpendicular to the projection plane. As the updating pitch distance increases, the image moves more roughly. As the updating pitch distance decreases, the image moves more finely. These are determined in accordance with the purpose of observation. The shorter the updating pitch time is, the better the image quality is. There is however required the time enough to perform predetermined data processing (such as updating of the view point, the view line direction and the projection plane, shading, hidden-surface processing, and so on) whenever updating is made.

Figures 17A, 17B:
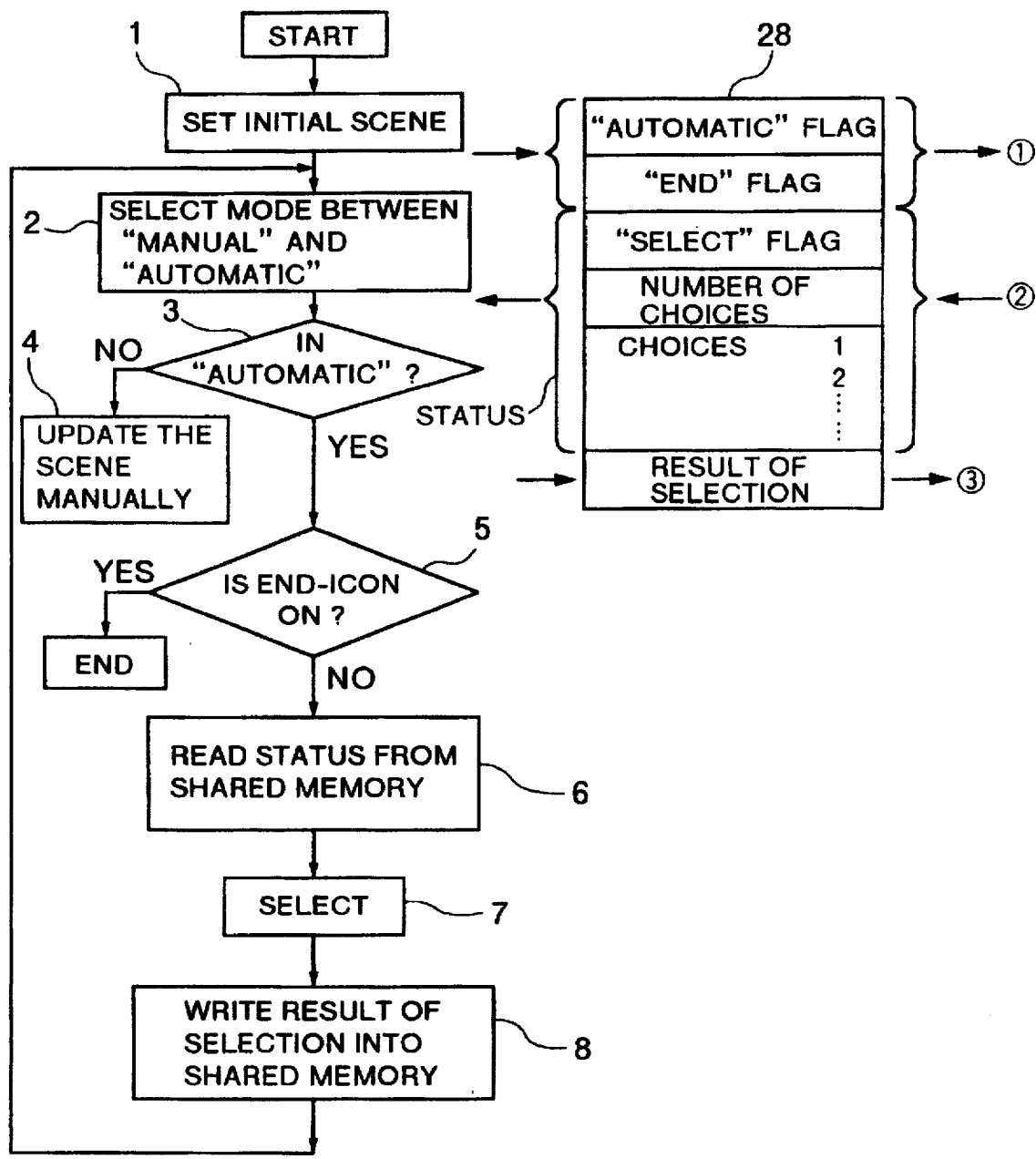
FIGS. 17A, 17B and 17C are flow charts for realizing the embodiment of FIG. 16.
Figure 17C:
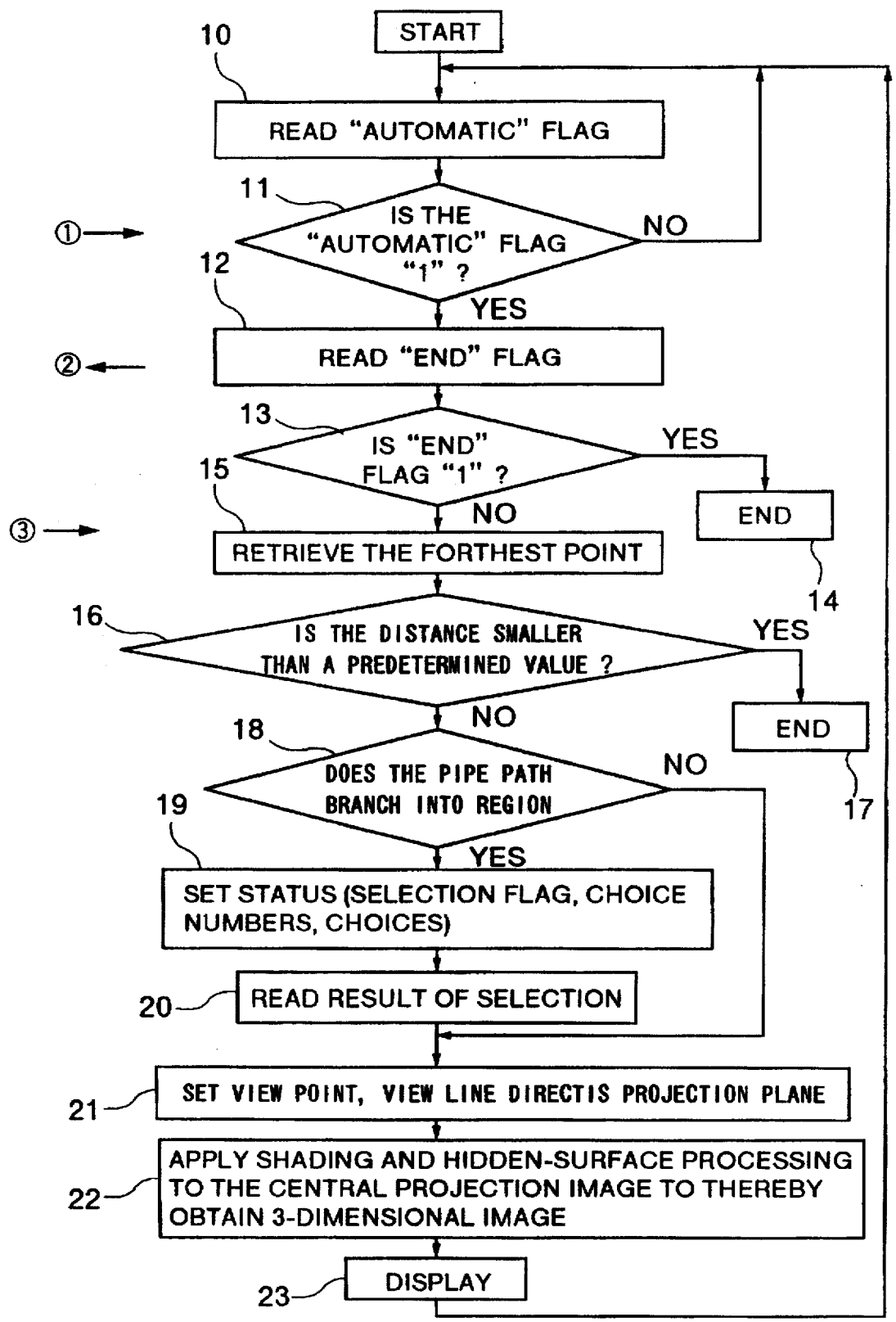

FIGS. 17A, 17B and 17C are flow charts showing the routine for carrying out the operation shown in FIG. 16. FIG. 17A shows a program procedure which serves as an interface for communicating with an operator. FIG. 17C shows a program procedure for obtaining a unit three-dimensional image and a three-dimensional image. FIG. 17B shows a shared memory 28 for relaying processing of the programs shown in FIGS. 17A and 17C. The shared memory 28 is included in the main memory 9.

First, respective steps in FIG. 17A will be described.

Figure 18:
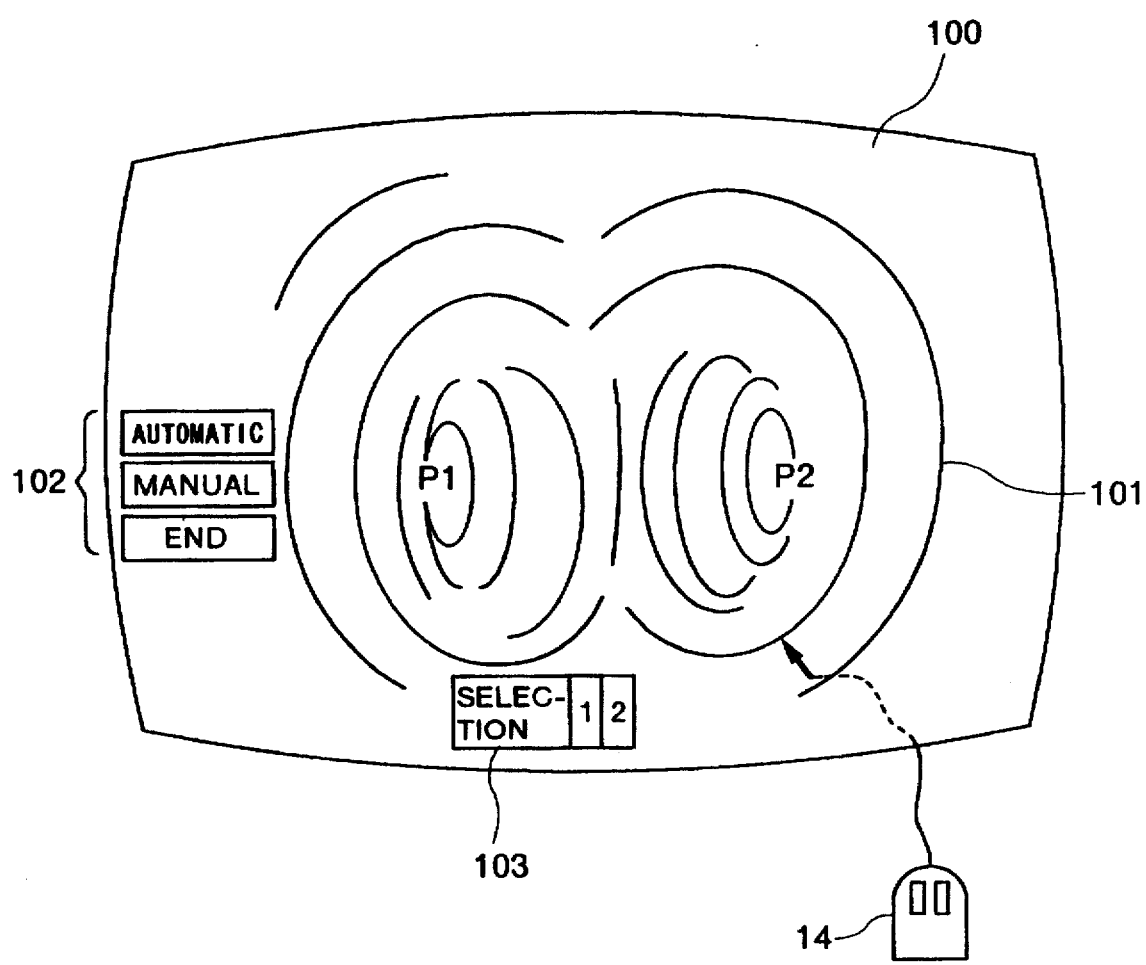
FIG. 18 is a view for explaining the case where there are two directions of the depth.

Step 1—This is a step of displaying an initial three-dimensional image obtained by the depth method. For the display of the initial image, the view point, the view line direction and the projection plane are initialized. Icon modes "automatic", "manual" and "end" and multipoint selection icons (the concept "point" used herein may include not only a point but an area) are displayed in the initial scene. The icon mode "manual" serves as a display switch by which the view point, the view line direction and the projection plane are enabled to be updated in combination manually when the icon mode "manual" is switched on. The icon mode "automatic" serves as a display switch by which the view point, the view line direction and the projection plane are enabled to be updated in combination automatically when the icon mode "automatic" is switched on. The icon mode "end" serves as a display switch by which the termination of the program shown in FIG. 17A is indicated when the icon mode "end" is switched on. The multipoint selection icons are icons in which point numbers, for example, "1" and "2", are displayed so that any one of the point numbers can be selected when the path branches into a plurality of points (for example, $P_1$ and $P_2$) in the direction of the depth. If the path branches into a plurality of points of the same level in pixel value, automatic updating cannot be performed. Therefore, the multipoint selection icons are provided so that any one of the points is selected. This selection is made by the operator. FIG. 18 shows an example of the selection.

In FIG. 18, a three-dimensional image 101 is displayed on a display screen 100. FIG. 18 shows the case where two points $P_1$ and $P_2$ different from each other in the direction of the depth of the image are present in the image 101. For example, the image 101 is adapted to an image of a place where a bronchial tube branches into two or to an image of a place where two blood vessels run closely. With the display of such an image, icons 102 and 103 are displayed. With respect to the icons 102, when any one of the three icons "automatic", "manual" and "end" is switched on, a corresponding flag is set to "1". With respect to the icons 103, "1" is switched on if $P_1$ is to be selected, whereas "2" is switched on if $P_2$ is to be selected. By switching on these icons, corresponding flags are set to "1" in the inside of a computer. Incidentally, the reference numeral 14 designates a mouse.

Step 2—This is a step of making the operator give an instruction as to whether the updating of the view point, the view line direction and the projection plane is to be performed automatically or manually. An automatic flag of one bit is given. If the flag is "1", automatic updating is selected. If the flag is "0", manual updating is selected. The instruction as to whether automatic updating is selected or whether manual updating is selected is performed by switching on either "manual" or "automatic" in the icons 102.

Step 3—From the automatic flag "1" or "0", a judgment is made as to whether "automatic" or "manual". If "manual" selected, the situation of the routine goes to step 4. If "automatic" is selected, the situation of the routine goes to step 5.

Step 4—Updating of the view point, the view line direction and the projection plane is performed manually to obtain a three-dimensional image. This manual processing means interactive updating using a mouse.

Step 5—When "automatic" is selected, a judgment is made as to whether the "end" icon is switched on or not. This judgment is made from the "end" flag "1" or "0". If the flag is "1", the routine is terminated. It is a matter of course that a judgment is made in the step 4 as to whether the "end" icon is switched on or not.

Step 6—Status is read from the shared memory 28. Status means data set by the program shown in FIG. 17C and for indicating whether there are a plurality of directions of depth or not and for indicating the state in the case where a plurality of directions of depth are present. Specifically, status is constituted by a selection flag (which takes "1" when a plurality of directions of depth are present and takes "0" when only one direction of depth is present), the number of choices, and choices 1, 2, . . . The choices 1, 2, . . . correspond to $P_1, P_2, \ldots$ in FIG. 18. The number of choices is the total number of choices. In FIG. 18, the number of choices is 2.

Step 7—Status is displayed on the screen so that the direction of depth to be selected is selected by the operator.

Step 8—A result of the selection is written in the shared memory 28 shown in FIG. 17B.

Steps in the program shown in FIG. 17C will be described.

Step 10—The "automatic" flag on the shared memory 28 is read.

Step 11—A judgment is made as to whether the "automatic" flag is "1" or not. If the flag is "1", the whole of the program shown in FIG. 17C runs. Incidentally, the condition that the "automatic" flag is "1" may be added to the condition for starting the program shown in FIG. 17C.

Step 12—The "end" flag on the shared memory 28 is read.

Steps 13 and 14—When the "end" flag is "1", the running of the program shown in FIG. 17C is stopped in step 14.

Step 15—The position of a pixel farthest from the current view point is retrieved automatically by searching the three-dimensional image generated by the depth method. This three-dimensional image is an image set on the scene in the step 1 at the initial time and a three-dimensional image obtained whenever updating is performed after that. Because the pixel value I of the three-dimensional image, that is, the pixel value I of the image obtained by hidden-surface processing is expressed by the distance R from the view point as represented by the equation (15) (exactly, the pixel value deceases as the distance from the view point increases), this means that the position of a pixel (on the hidden-surface-processed image) at the largest distance R, that is, the darkest point is selected. The contents of processing in the step 15 are as shown in the later-described FIG. 19.

Step 16—A judgment is made automatically as to whether the largest distance (from the view point) obtained in the step 15 is smaller than a predetermined value or not. In the case where updating up to the deepest position of the three-dimensional original image is completed as a result of updating, images are not present in any deeper position. Therefore, this is checked on the basis of the judgment as to whether the distance is smaller than a predetermined value or not. Further, in the case where a target pipe path ends at a certain pixel position so that the pipe path is not present any more, this fact is found by the processing of the step 16. When the distance is smaller than the predetermined value, this routine is terminated.

Step 18—Whether the pipe path branches into a plurality of regions or not is found automatically. An example of branching into a plurality of regions is as represented by $P_1$ and $P_2$ in FIG. 18. In order to find automatically such an example as represented by $P_1$ and $P_2$, distances from the view point to all pixels in the three-dimensional image are obtained in the step 15 in advance so that a decision is made that a plurality of regions are present when two or more pixels at the largest distance are present. Here, the largest distance is preferably within a range of a threshold value. If the threshold value is taken into account, the largest distance may be a local maximum value. If the pipe path branches into a plurality of regions, the situation of the routine goes to step 19. If the pipe path does not branch into a plurality of regions (that is, only one pipe path is present), the situation of the routine goes to step 20.

Steps 19, 20—When a plurality of regions are present, status for transmitting discrimination between manual updating or automatic updating is set in the shared memory 28. As for the status, when manual updating is to be selected, the selection flag is set to "1" and the number of choices is set in accordance with the number of regions. Through reading of the status in the step 6, respective choice numbers are displayed as shown in FIG. 18 so that a desired choice number can be designated by the user. Selection with respect to the status is performed by the operator in the step 7 in FIG. 17A. In step 20, results of the selection are read.

Figure 19:
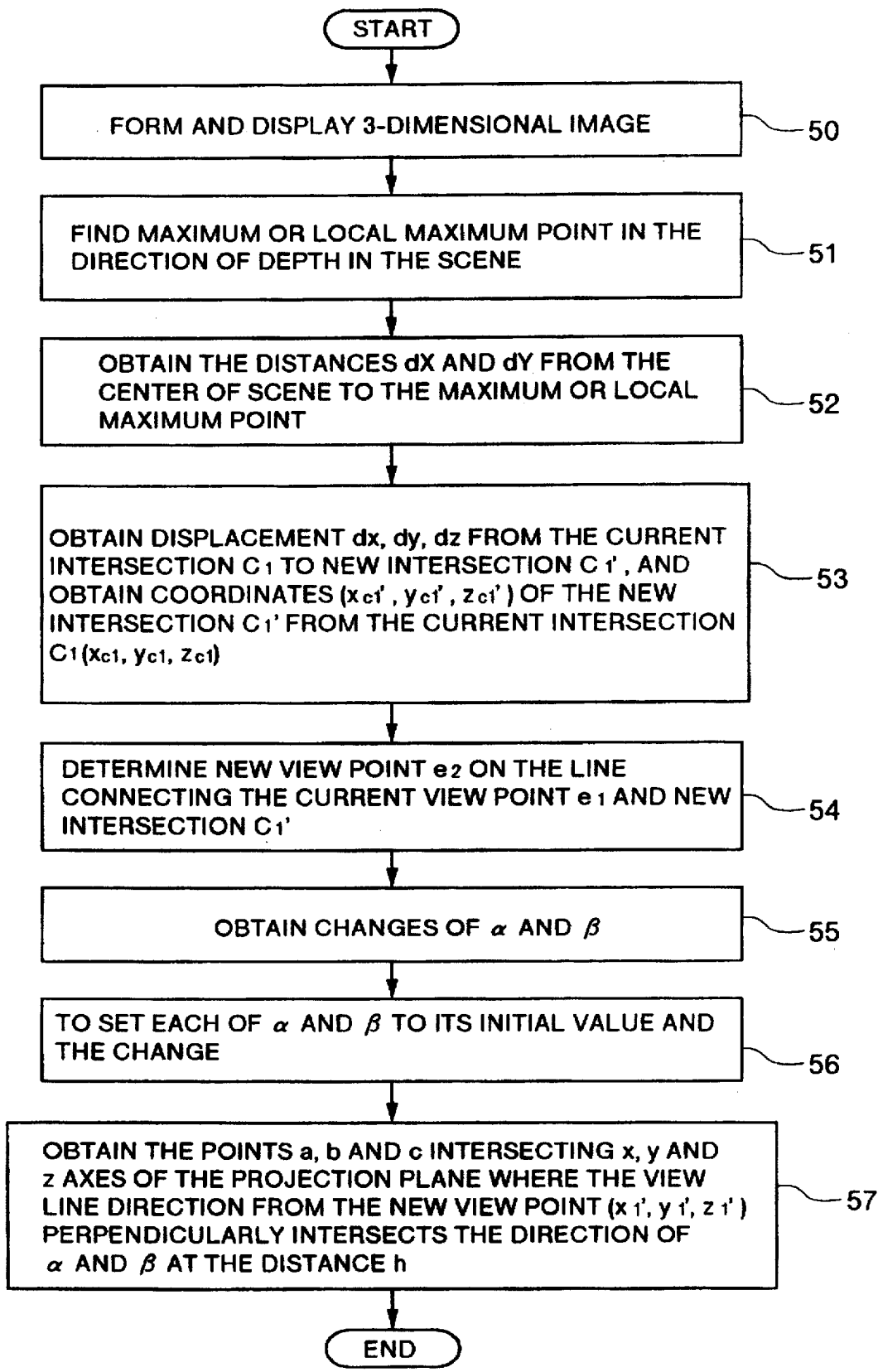
FIG. 19 is a flow chart showing the routine of changing the projection plane with the change of the view point.

Step 21—The view point, the view line direction and the projection plane are updated automatically so as to approach the largest-distance pixel position on one region or a single region selected as a result of selection with respect to the status selected in the step 7 of FIG. 17A. FIG. 19 is a detailed flow chart of this step.

Figure 22:
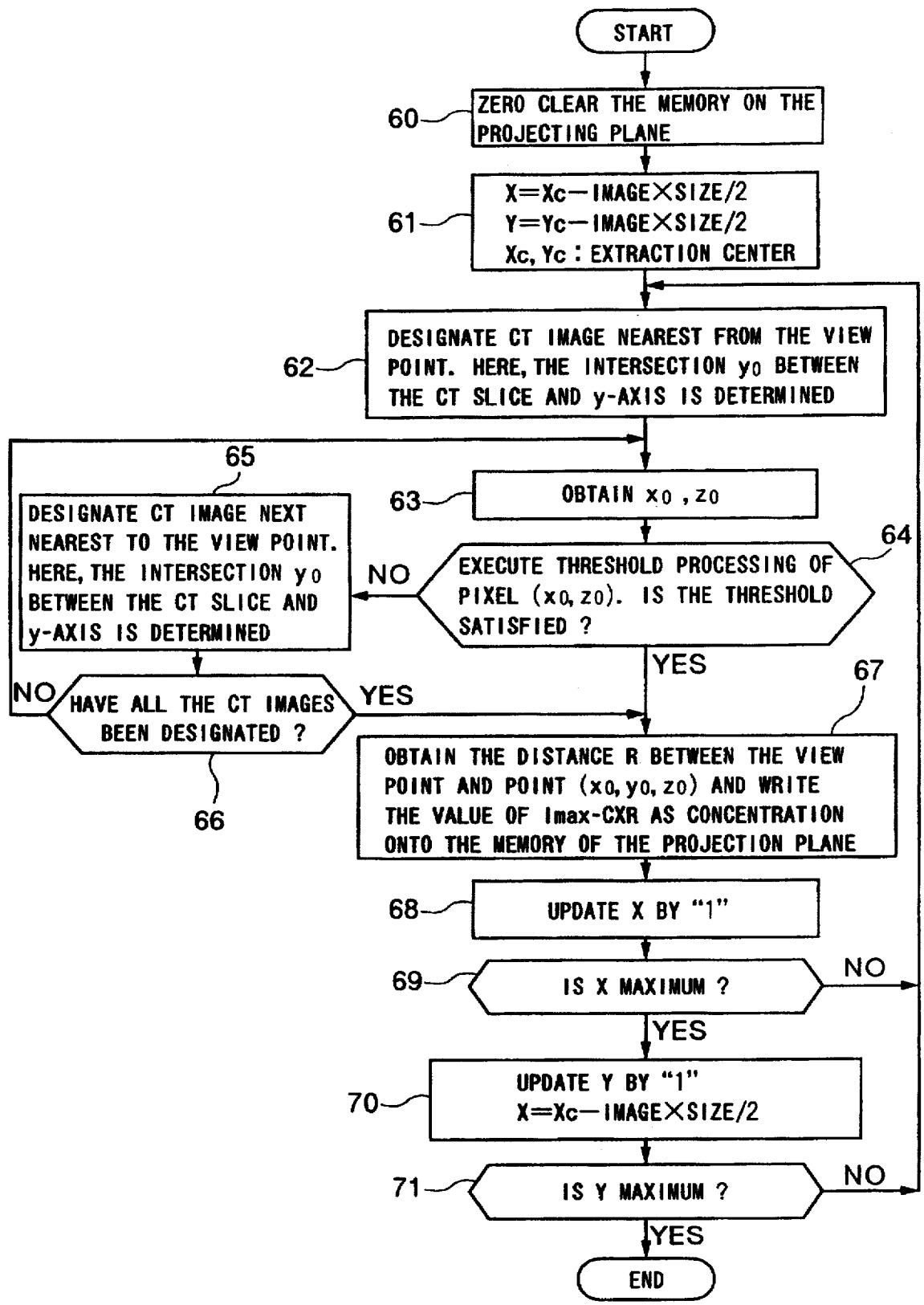
FIG. 22 is a flow chart showing the routine of constructing a new three-dimensional image with the movement of the view point.

Step 22—Central projection processing is applied to a unit three-dimensional image newly interposed between the view point and the projection plane in accordance with the view point, the view line direction and the projection plane updated in the step 21 to thereby obtain a central projection image. Further, shading and hidden-surface processing are applied to the central projection image to obtain a three-dimensional image. FIG. 22 is a detailed flow chart of this step.

Step 23—The three-dimensional image calculated in the step 22 is displayed on the display screen in accordance with gradation window level. The gradation window level is provided to determine the relation between the display gradation of the display device and the pixel gradation of the three-dimensional image. When the number of display gradations is 64, the pixel gradation of the three-dimensional image is transformed so that the three-dimensional image can be displayed with the 64 gradations. When the abscissa shows three-dimensional gradation and the ordinate shows display gradation, the equation of the transformation may be a linear function, a diode function or a quadratic function, that is, various functions may be used as the transformation equation.

Updating is performed by repeating the aforementioned routine shown in FIG. 17C. Whenever updating is performed, a three-dimensional image is obtained and displayed on the display screen. Further, when the updating pitch time is very short, animation display is realized if the updated three-dimensional images are displayed successively. Alternatively, the updated three-dimensional images may be stored in an auxiliary memory in advance so that the updated three-dimensional images are read and displayed successively to realize animation display.

FIG. 19 is a detailed flow chart of the steps 15 and 21 in FIG. 17C. Although there is omission in FIG. 19 for simplification, the steps 16 to 20 in FIG. 17C are practically preferably put between steps 51 and 52 in FIG. 19. Respective steps in FIG. 19 will be described.

Step 50—This is a step of forming a three-dimensional image by the depth method and displaying the image on the display screen. At the time of the starting of the routine, this image is an image on the initial screen in the step 1 in FIG. 17A. At the time of updating, this image is an image obtained by the processing of the step 22 in FIG. 17C.

Step 51—All pixels in the image displayed in the step 50 are checked so that the maximum value or local maximum value $R_{max}$ of the distance R from the current view point in the direction of the depth is obtained. Because the currently displayed image is an image subjected to shading and hidden-surface processing, the distance R in accordance with the equation $I=I_{max}-C\cdot R$ is preserved in each pixel value I. Accordingly, the maximum value or local maximum value is obtained by calculating the distance R in accordance with the equation $R=(I_{max}-I)/C$. The maximum value is used in the case where a single pixel is continued in the direction of the depth. The local maximum value is used in the case where a plurality of pixels are continued in the direction of the depth or in the case where a plurality of regions (step 18 in FIG. 17C) are present separately.

Step 52—When a plurality of regions are present, this step is started in the state of selection (step 7 in FIG. 17A). In the step 52, the distance dX and dY from the center of the screen to the maximum or local maximum point is calculated. The reason why the center of the screen is used as the reference position for calculating the distance dX and dY is in that the projection plane is set to be perpendicular to the view line direction from the view point when the three-dimensional image is calculated. Setting the projection plane to be perpendicular to the view line direction means setting the projection plane to be perpendicular to the center line located in the middle of the central projection line because the view line is equivalent to the central projection line from the view point. Further, the center line is set to intersect the projection plane at the center position thereof. If the current projection plane is made to correspond to the display screen per se, the center of the display screen coincides with the center line of central projection from the view point. Accordingly, difference of the maximum or local maximum point from the center of the view line is found by calculating the distance dX and dY from the center of the screen. The value of the difference is used for calculating a new view point and a new view line direction. Incidentally, X and Y in dX and dY form a coordinate system for the projection plane.

Figure 20:
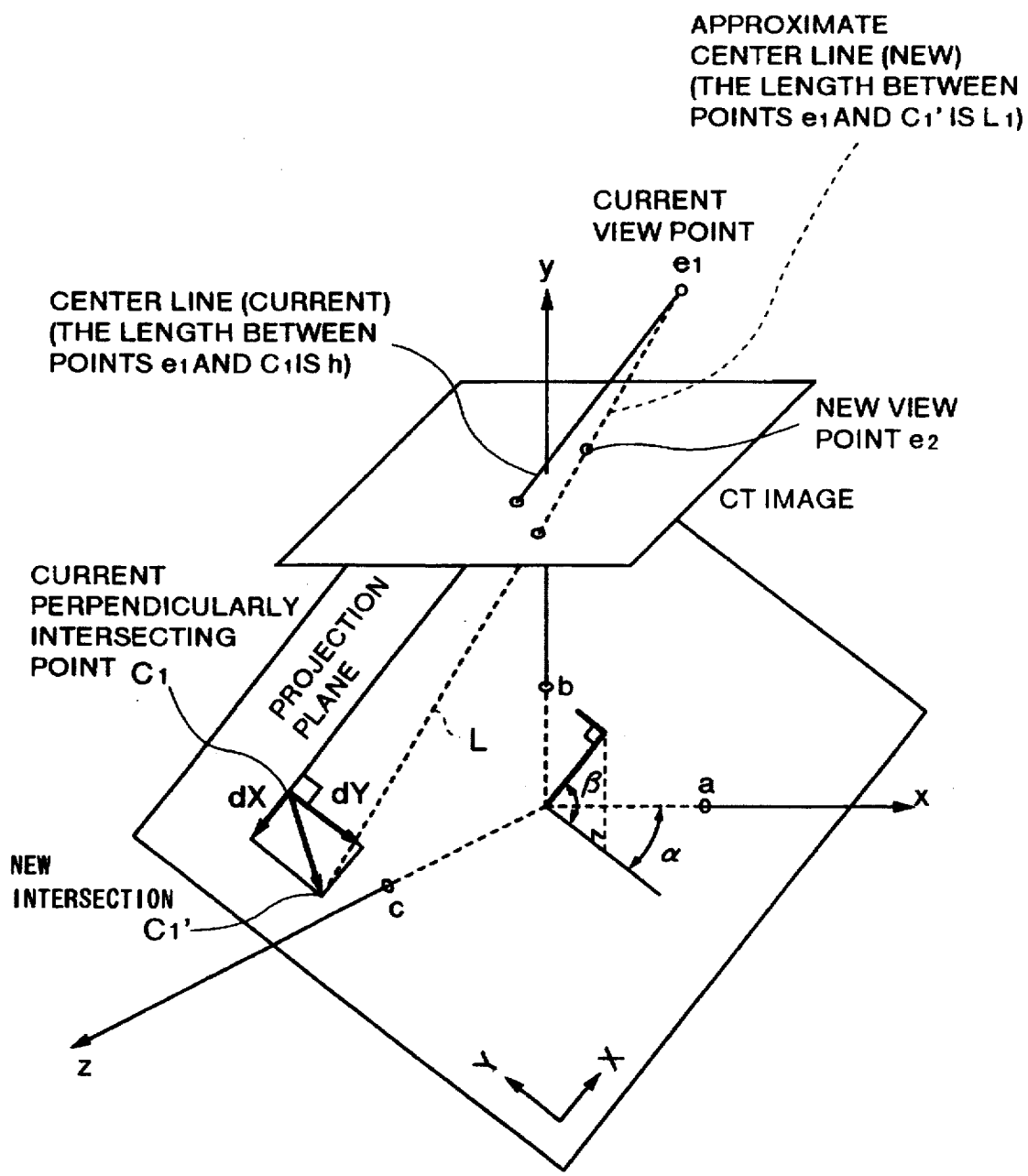
FIG. 20 is a graph for explaining a process of changing the view point and the projection plane.

FIG. 20 is a view showing the coordinate relation between the view point $e_1$ and the projection plane. FIG. 20 is a view for obtaining the real position of a new view point particularly in the case where view point displacements dX and dY on the screen are designated on the projection plane before eye-ball transformation.

The CT image shows a part of the unit three-dimensional image interposed between the current view point $e_1$ and the projection plane. An x-y-z coordinate system is used as an absolute coordinate system, and the projection plane is expressed in an X-Y coordinate system. The projection plane is selected so that the center line located in the middle of a large number of projection lines radially spread from the current view point $e_1$ intersects the projection plane at the center position thereof so as to be perpendicular to the projection plane. Although the perpendicular from the view point $e_1$ is shown in FIG. 20 as if it was not drawn to the center of the projection plane, the perpendicular is really drawn to the center of the projection plane. The center line is a perpendicular from the view point $e_1$ and the length of the perpendicular is made $\underline{h}$. Assume now that the projection plane is made to coincide with the display surface. In the aforementioned condition, the maximum or local maximum point which is the darkest point on the screen is obtained in the steps 51 and 52 to thereby calculate $d_X$ and $d_Y$, so that the view point, the view line direction and the projection plane are updated in accordance with dX and dY. That is, the view point is moved in the direction of the depth. The flow of this updating is shown in steps 53 to 57 which will be described later. In FIG. 20, a new view point after updating is represented by $e_2$. Although the current view point $e_1$ may be seen as if it was not located in the center position of the projection plane, the current view point $e_1$ is really located in the center position of the projection plane.

Referring to FIG. 20, the way of thinking about updating will be described. The current projection plane is as shown in FIG. 20. On the other hand, the maximum or local maximum point $C_1'$ from the current view point $e_1$ is out of the center position of the projection plane. Therefore, a new view point $e_2$ is determined so as to approach the maximum or local maximum point $C_1'$ closer than the current view point $e_1$. That is, a new view point $e_2$ is set so that the view point moves to a darker place. Further, a new view line direction is determined on the basis of the view point $e_2$. The new view line direction is set so that the center line of the central projection line from the new view point $e_2$ to the maximum or local maximum point $C_1'$ passes through the point $C_1'$. Further, a new projection plane is set so as to intersect perpendicularly the center line at the point $C_1'$ and so that the center position of the new projection plane coincides with the point $C_1'$.

Incidentally, in FIG. 20, $\underline{a}$, $\underline{b}$ and $\underline{c}$ are numerical values showing the positional relation between the projection plane and the xyz coordinate system in the same manner as in FIG. 6. That is, $\underline{a}$ is the x-axis component of a point of intersection of the projection plane and the $\underline{x}$ axis, $\underline{b}$ is the y-axis component of a point of intersection of the projection plane and the $\underline{y}$ axis, and $\underline{c}$ is the z-axis component of a point of intersection of the projection plane and the $\underline{z}$ axis. Further, in FIG. 20, it is necessary that an angle α between a line obtained by projecting the perpendicular drawn from the origin in the xyz coordinate system to the projection plane onto the z-x plane and the x axis and an angle β between the perpendicular and the x-z plane are obtained in the same manner as in FIG. 6. As a result, the relation between the projection plane and the xyz coordinate system can be determined on the basis of α and β different in dimension from $\underline{a}$, $\underline{b}$ and $\underline{c}$. The equations obtained in FIG. 6 can be used as equations for obtaining coordinates of respective points.

Step 53—The position of the new intersection $C_1'$ in the xyz coordinate system is obtained. First, in FIG. 20, the displacement from the old intersection $C_1$ to the new intersection $C_1'$ is obtained by using the equations (7), (8) and (9) as follows.

$$d_x = \text{(the value of } x \text{ in the point } C_l' \text{ expressed in } X \text{ and } Y) - \quad (16)$$

(the value of $x$ in the point $C_l$ expressed in $X$ and $Y$)

$$d_y = \text{(the value of } y \text{ in the point } C_l' \text{ expressed in } X \text{ and } Y) -$$

(the value of $y$ in the point $C_l$ expressed in $X$ and $Y$)

$$d_z = \text{(the value of } z \text{ in the point } C_l' \text{ expressed in } X \text{ and } Y) -$$

(the value of $z$ in the point $C_l$ expressed in $X$ and $Y$)

The equations (16) show displacements $d_x$, $d_y$ and $d_z$ in the xyz coordinate system in the case where displacements dX and dY from the center of the screen are present in the XY coordinate system on the projection plane. When the coordinates of the old intersection $C_1$ are represented by $(x_{c1}, y_{c1}, z_{c1})$, the coordinates $(x_{c1}', y_{c1}', z_{c1}')$ of the new intersection $C_1'$ are given approximately by the following equations.

$$x_{c1}' = x_{c1} + d_x$$
$$y_{c1}' = y_{c1} + d_y$$
$$z_{c1}' = z_{c1} + d_z$$

Step 54—The position of the new view point $e_2$ is determined. The new view point $e_2$ is set so as to be located on a line L connecting the current view point $e_1$ and the new intersection $C_1'$ and so as to approach the new intersection $C_1'$. The distance of the movement of the view point is determined in advance. The position $(x_1', y_1', z_1')$ of the new view point $e_2$ is obtained as follows.

$$x_1' = x_1 + d_x \cdot (Q/L_1)$$

$$y_1' = y_1 + d_y \cdot (Q/L_1)$$

$$z_1' = z_1 + d_z \cdot (Q/L_1)$$

In the equations, $x_1$, $y_1$ and $z_1$ represent the coordinates of the current view point $e_1$, and $L_1$ represents the length of the thee segment L. Because the length is not $h$, the new intersection $C_1'$ is an approximate point for temporary use. As will be described later, the accurate coordinates of the new intersection are values obtained by using new $\underline{a}$, $\underline{b}$ and $\underline{c}$. In the equations, Q represents a value obtained by multiplying the maximum or local maximum value $R_{max}$ of the intersection $C_1'$ by a certain rate $\underline{m}$.

$$Q = R_{max} \cdot m$$

The rate $\underline{m}$ is a value key-inputted in advance so as to be selected in a range $1 > m > 0$. As a result, the new view point $e_2$ is set to a position which is deeper than the position of the view point $e_1$ and determined on the basis of $\underline{m}$.

Step 55—This is a step of determining the view line direction from the new view point. First, displacements of the angles α and β described above with reference to FIG. 20 are obtained as follows.

Figure 21A:
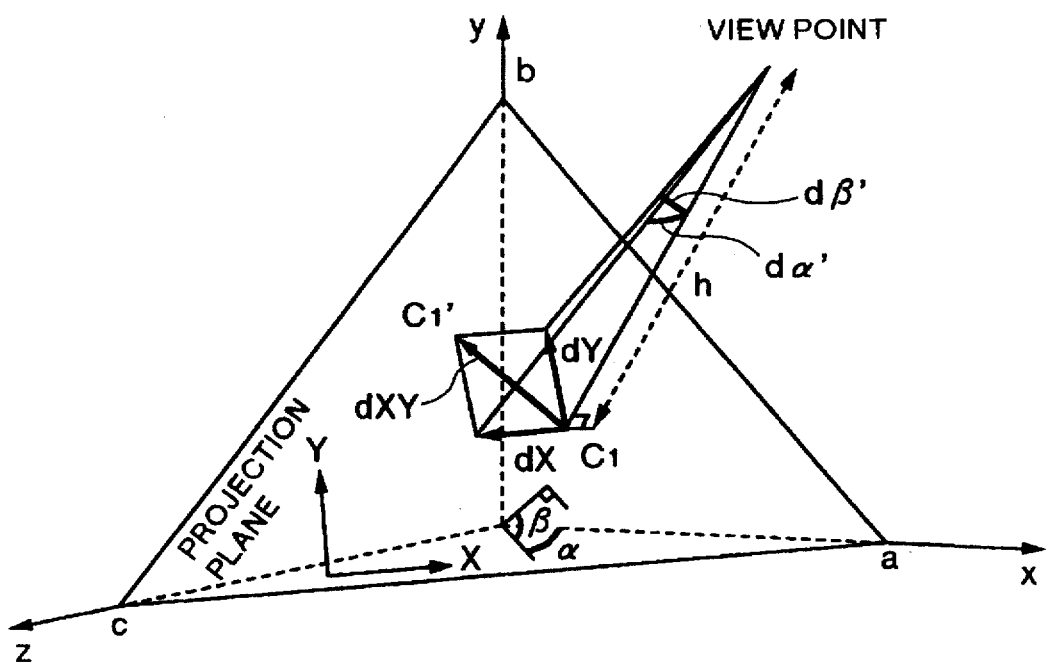
FIGS. 21A and 21B are explanatory graphs for obtaining the change of the angle of the projection plane with the change of the view point.

FIG. 21A is an explanatory view for obtaining the displacements dα' and dβ' of the angles α and β.

$$d\alpha' = \arctan(dX/h)$$

$$d\beta' = \arctan(dY/h)$$

dα and dβ are approximated as follows.

$$d\alpha = (90° - |\beta|) \cdot d\alpha'/90°$$

$$d\beta = d\beta'$$

In the equations, dβ is made positive and the others are made negative when the following relations are valid because β is measured from the xz plane.

a<0 and b>0 and $d_x$>0 and $d_y$<0 or a>0 and b<0 and $d_x$<0 and $d_y$<0 or a>0 and b>0 and $d_x$>0 and $d_y$<0 or a<0 and b<0 and $d_x$<0 and $d_y$>0

Further, $d_\alpha$ is made positive and the others are made negative when the following relations are valid because α is measured from the $\underline{x}$ axis.

a>0 and c<0 and $d_x$>0 and $d_z$>0 or a<0 and c>0 and $d_x$>0 and $d_z$>0 or a>0 and c>0 and $d_x$>0 and $d_z$<0 or a<0 and c<0 and $d_x$<0 and $d_z$>0

Figure 21B:
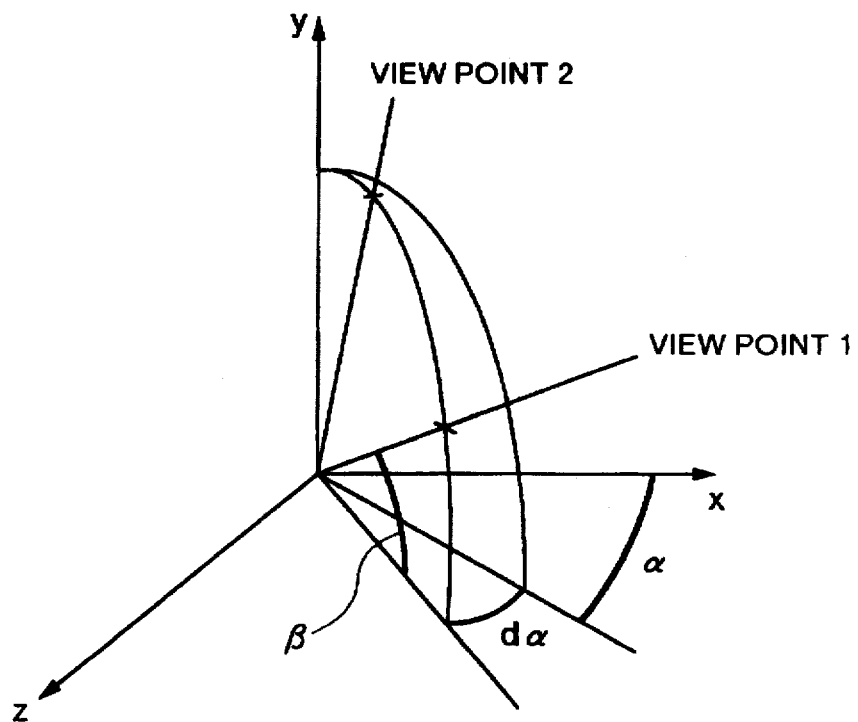

In the equations, $d_x$, $d_y$ and $d_z$ are values obtained in accordance with the equations (16). The reason why $d_\alpha$ is reduced when $|\beta|$ approaches 90° is in that influence given to α is reduced though $d_x$ changes as the view point 1 in FIG. 21B approaches the view point 2.

Step 56—When the previous values of the angles α and β are represented by $\alpha_1$ and $\beta_1$ respectively, the angles α and β based on the current displacements are given as follows.

$$\alpha = \alpha_1 + d_\alpha$$

$$\beta = \beta_1 + d_\beta$$

Accordingly, the view line direction from the new view point is determined on the basis of these angles.

Step 57—In this step, a projection plane perpendicular to the center line in the new view line direction is obtained. Because the projection plane is expressed in $\underline{a}$, $\underline{b}$ and $\underline{c}$ as shown in FIG. 20, the step of obtaining $\underline{a}$, $\underline{b}$ and $\underline{c}$ is step 57. That is, points $\underline{a}$, $\underline{b}$ and $\underline{c}$ of intersection of the projection plane on which the view line direction from the new view point $(x_1', y_1', z_1')$ intersects perpendicularly lines α and β at the distance $\underline{h}$ and the x, y and z axes are given as follows:

$$a = [t1 \pm h \cdot \sqrt{1 + \tan^2\beta}]/\cos\alpha$$

$$b = a/\tan\alpha$$

$$c = a \cdot \cos\alpha/\tan\beta$$

in which in the case of $0 < \beta \leq 180°$, the sign is plus.

$$t1 = x_1' \cdot \cos\alpha + z_1' \cdot \sin\alpha + y_1' \cdot \tan\beta$$

By determining new $\underline{a}$, $\underline{b}$ and $\underline{c}$, the accurate coordinates of the new intersection are obtained in accordance with the equations (10), (11) and (12). As described above, $C_1'$ obtained preliminarily is the new intersection for temporary use. If $\underline{a}$, $\underline{b}$ and $\underline{c}$ are not updated, the projection plane is not perpendicular to the view line direction but oblique with respect to the view point.

FIG. 22 is a detailed flow chart of the step 22 in FIG. 17C. That is, when the view point, the view line direction and the projection plane are determined, a new unit three-dimensional image interposed between the view point and the projection plane is obtained. The new unit three-dimensional image is subjected to central projection from the view point to the view line direction, so that the resulting central projection image is subjected to shading and hidden-surface processing to obtain a new three-dimensional image. FIG. 22 is a flow chart for realizing this. Referring to FIG. 20, the flow chart of FIG. 22 will be described.

Step 60—The density of all pixels in the memory for the projection plane is cleared (initialized).

Step 61—The display screen is extracted from the projection plane. If the size of the projection plane is equal to the size of the display screen, the projection plane coincides with the display screen. In most cases, the size of the projection plane is however set to larger than the size of the display screen. In such cases, it is necessary to extract a part corresponding to the display screen from the projection plane. Even in the case where the two sizes are equal to each other, there is some case where only a part region of the projection plane is intended to be displayed on the display screen. Also in this case, it is necessary to extract a part from the projection plane. Therefore, in this step 61, an extraction center position $(X_c, Y_c)$ is given so that a part corresponding to the extraction size of the display screen (for example, the screen size if a part corresponding to the size of the display screen is to be extracted) is extracted. If the extraction center position coincides with the intersection $C_1'$, the intersection $C_1'$ preferably becomes the center of the display screen. By providing this step 61, the address (X, Y) in the display memory can be designated. The address (X, Y) designated first is the left upper of the projection plane region corresponding to the extraction size. The address is updated in accordance with raster scanning from left to right and from upper to lower (steps 68 and 70).

Step 62—This is a step of starting scanning for projecting the unit three-dimensional image. An example in which the unit three-dimensional image is a part of the stacked three-dimensional image constituted by CT images will be described below. This example is shown in FIG. 6. A projection plane 21 is given in accordance with the new view point e, so that a unit three-dimensional image is interposed between the view point e and the projection plane 21. The unit three-dimensional image is a part of the three-dimensional original image obtained by stacking CT images. That is, the unit three-dimensional image is obtained by stacking a plurality of CT images. First, a CT image 23(#1) nearest to the view point is selected from the plurality of CT images. In this case, the CT images are stacked in parallel with the y axis in the absolute coordinate system x, y and z. Because the CT image number of the CT image nearest to the view point is found, the y component of the nearest CT image is found automatically on the basis of the CT image number. This y component is made $y_0$.

Step 63—Among pixels of the CT image nearest to the view point, the coordinates $(x_0, y_0, z_0)$ of the position S of a corresponding pixel of the tomographic image to be projected onto the address (X, Y) of the display memory are calculated. Incidentally, $y_0$ is known in advance because sliced images are stacked on the y axis (a relative value is known as "slice interval" at the time of measurement). Accordingly, in practice, $x_0$ and $z_0$ are calculated. This calculation is performed by the central projection transformation equations (13) and (14). The coordinates $(x_0, y_0, z_0)$ of the positions S of pixels corresponding to all addresses (X, Y) of the display memory are calculated. In FIG. 6, the point P on the projection plane 21 corresponds to the address (X, Y) of the display memory and the point S on the tomographic image 23 corresponds to the position of a corresponding pixel of the tomographic image.

The central projection transformation equations are roughly classified into two. The first is equations for transforming the XY coordinate system to the xyz coordinate system. The second is equations for determining the coordinates of the point S. The equations (7), (8) and (9) are equations for transforming the XY coordinate system to the xyz coordinate system.

In the manual mode, the coordinates $(x_1, y_1, z_1)$ of the view point e are given freely by key inputting or the like, so that the coordinates $x_0$ and $z_0$ the pixel point S on the tomographic image $y_0=d_0$ are determined in accordance with the equations (13) and (14).

Although the above description has been made upon the case where one tomographic image #1 is used, a plurality of tomographic images (#1, #2, ...) are used in practice and $d_0$ takes a plurality of values. Accordingly, a plurality of points $(x_0, z_0)$ to be projected are determined correspondingly to a combination of X and Y. A point $(x_0, z_0)$ on a tomographic image to be projected is selected from the plurality of points. The Z buffer method (using the distance R instead of the Z component) may be used for the selection but, in this embodiment, another method is used. Therefore, steps 64, 65 and 66 are provided.

Steps 64, 65 and 66—In the step 64, threshold processing is applied to a pixel point $(x_0, z_0)$. This is for the purpose of extracting a concerned place. The threshold value is provided for the extraction. For example, the concerned place is an internal organ (such as an intestine or a bronchial tube). By providing a threshold value for extracting an internal organ, the concerned internal organ is extracted automatically. If the pixel point $(x_0, z_0)$ is out of range of the threshold value, the next CT image (that is, the second nearest CT image to the view point) #2 is designated in the step 65 and a pixel point $(x_0, z_0)$ on $y=y_0$ corresponding to the address (X, Y) designated in the step 61 is found in the step 63 ($y_0$ is calculated automatically from the set CT image) and a judgment is made again in the step 64 as to whether the pixel value satisfies the range of the threshold value or not. With the updating of the CT image, $y_0$ is updated. If the pixel value is out of the range of the threshold value, the next nearest CT image (#3) is designated again in the step 65. Thereafter, if there is no pixel value satisfying the range of the threshold value in all CT images to be projected to the address (X, Y) designated in the step 61, the situation of the routine goes to step 67 via the step 66. If the pixel value satisfying the range of the threshold value is present in the pixel point $(x_0, z_0)$ on $y=y_0$ of the CT image #i, searching of CT images #(i+1), #(i+2), ... on the deeper side is stopped. Then, the situation of the routine goes to step 67.

Step 67—The distance R between the new view point $(x_1', y_1', z_1')$ generated in the step 54 and the pixel point $(x_0, z_0)$ on $y=y_0$ is obtained as follows.

$$R = \sqrt{(x_1'-x_0)^2 + (y_1'-y_0)^2 + (z_1'-z_0)^2}$$

The density I is obtained in accordance with the equation (15) on the basis of R thus calculated.

This density I (which is different in meaning from I in FIG. 14) is density obtained by the depth method and, at the same time, density after hidden-surface processing as processed by a kind of Z buffer. Thus, shading and hidden-surface processing are applied to one point (X, Y), so that the processed point is stored as pixel density of three-dimensional image in the memory address (X, Y).

Step 68—The display extraction address X is updated by +1.

Step 69—A judgment is made as to whether X reaches the maximum value of the display extraction address or not. If X does not reach the maximum value, the situation of the routine goes back to the step 62. If X reaches the maximum value, the situation of the routine goes to step 70.

Step 70—When the display extraction address X reaches the maximum value, the display extraction address Y is updated by 1 to change the address by one line. The address X is returned to the initial value.

Step 71—A judgment is made as to whether the display extraction address Y reaches the maximum value or not. If Y does not reach the maximum value, the situation of the routine goes back to the step 62. If Y reaches the maximum value, the whole routine is terminated.

The projection image as shown in FIG. 5A is used in the initial screen in the step 1 in FIG. 17A. In this embodiment in which the view point and the projection plane are updated in the direction of the depth, the view point, the projection plane and the unit three-dimensional image which are obtained whenever updating is performed after the initial screen substantially have the relations as shown in FIG. 5B.

Figure 23A:
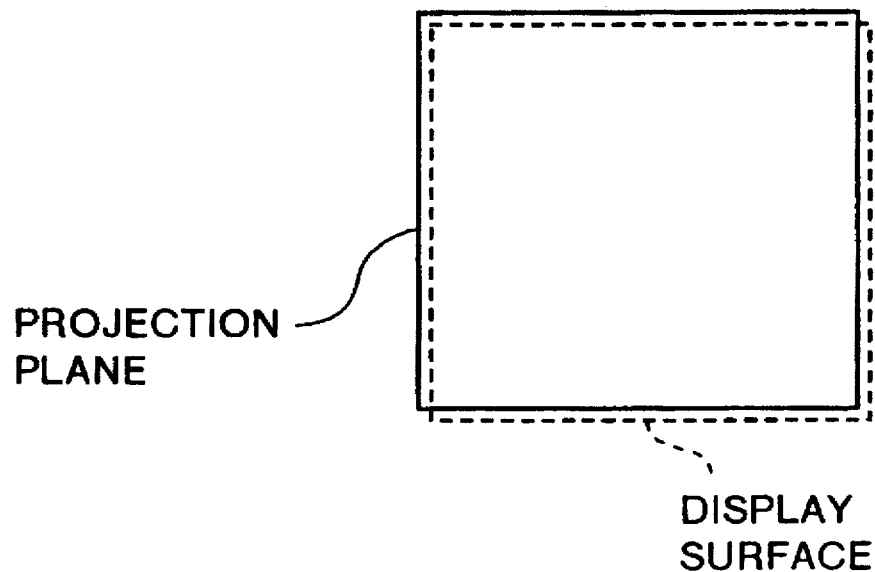
FIGS. 23A and 23B are views showing the relation between the projection plane and the view point.
Figure 23B:
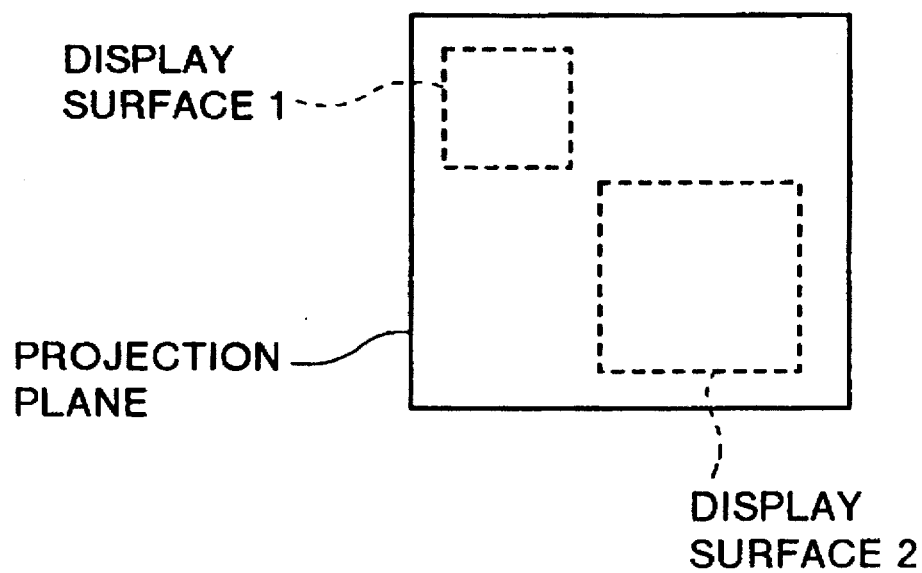

FIGS. 23A and 23B are views showing the relation between the projection plane and the display surface. The projection plane mathematically means a plane onto which an image is to be projected. From the viewpoint of image processing, a buffer memory of two-dimensional arrangement is adapted to the projection plane. On the other hand, the display surface means a display screen of a CRT or the like. Because in practice the contents of the display memory of two-dimensional arrangement are directly scanned and displayed, the display memory of two-dimensional arrangement can be regarded as being adapted to the display surface. The buffer memory of two-dimensional arrangement as the projection plane and the display memory of two-dimensional arrangement may be used by the following methods in accordance with the size (length x width) thereof.

The first method is applied to the case where the size of the buffer memory is equal to the size of the display memory.

This case is shown in FIG. 23A. In FIG. 23A, the projection plane of the solid line and the display surface of the broken line have the relation that they overlap each other perfectly. In FIG. 23A, the display surface and projection plane are drawn as if slight difference was formed between them. In this case, the central projection image obtained on the projection plane is used so as to be entirely displayed on the display surface. Incidentally, even in the case where the sizes of the two surfaces are equal to each other, a part of the buffer memory may be used as the display extraction size to be displayed on a corresponding or not-corresponding part of the display memory.

The second method is applied to the case where the size of the buffer memory is larger than the size of the display memory.

This case is shown in FIG. 23B. In this case, a subject to be displayed is selected. Display surface 1 shows an example in which the left upper side is selected. Display surface 2 shows an example in which the right lower side compared with the center is selected. Alternatively, the center portion may be selected. This election may be performed automatically or manually.

In FIGS. 16, 23A and 23B, the central projection image onto the projection plane is not an image obtained by projecting the unit three-dimensional image directly but a shading-processed image obtained by applying shading to the unit three-dimensional image. The shading is a process in which the distance R from the view point to the position of a pixel which is a subject of projection is obtained and the projection density I of the pixel position is determined so as to be inversely proportional to the distance R. For example, the density I is calculated in accordance with the equation (15).

Further, two or more densities may be projected onto a pixel position of the buffer equivalent to the projection plane in FIGS. 16, 23A and 23B so as to overlap each other. For example, this phenomenon occurs in the case where pixel positions partially overlap each other as represented by $B_3'$ and $D_2'$ in FIG. 5A. In this case, the pixel value of the pixel position nearer to the view point is left whereas the pixel value of the pixel position farther from the view point is erased. This is a kind of Z buffer method. With respect to the overlapping pixel positions in FIG. 5A, $D_2'$ is left because $D_2'$ is nearer to the view point than $B_3'$. An image of two-dimensional arrangement processed by the Z buffer method is finally obtained in the buffer memory equivalent to the projection plane. The image of two-dimensional arrangement thus finally obtained in the buffer memory equivalent to the projection plane is used as a subject of display and displayed as shown in FIGS. 23A and 23B.

The projection plane is determined on the basis of the position and inclination thereof. The form of the projection plane is as follows.

(1) Position of Projection Plane—There is a method of determining a position which is in the xyz coordinate system in FIG. 20 and to which the center position of the projection plane is to be placed. There is another method of determining a position which is in the xyz coordinate system and to which a specific position such as the right upper end position of the projection plane, or the like, is to be placed. In either method, this position is determined so that the distance between the new view point and this position is constant. Thus, a new view point is obtained whenever updating is performed, so that the position of the projection plane is determined automatically.

(2) Inclination of Projection Plane—What position is used as a reference position for defining the inclination is a precondition. The position of the projection plane described in the paragraph (1) is preferably used as the reference position. The inclination of the projection plane can be set to an arbitrary value originally but the inclination is preferably set to a value so as to intersect perpendicularly the view line direction.

The farthest point (or local maximum point) described in the step 15 in FIG. 17 will be described as a postscript.

There is some case where the farthest portion is obtained not as a point but as a region or surface having a predetermined extent. In this case, it is thought of that a plurality of farthest points are present along the region or surface. There is a method in which the center position or center-of-gravity position of the region or surface is obtained by statistical processing so that the center position or center-of-gravity position is determined as the farthest point. For example, in FIG. 18, large local maximum points are present in regions $P_1$ and $P_2$. There is some case where it is found that a plurality of local maximum points ($P_{11}, P_{12}, P_{23}, \ldots$) (not shown) are present in the vicinity of the region $P_1$ when the vicinity of the region $P_1$ is observed more finely and, further, a plurality of local maximum points ($P_{21}, P_{22}, P_{23}, \ldots$) (not shown) are present in the vicinity of the region $P_2$. Smoothening the image is a method for reducing the number of local maximum points. This will be described below.

For example, a smoothened image is obtained by adding up the pixel values of 25 pixels arranged in 5 columns and 5 rows, dividing the resulting value by 25 and setting the resulting average as a new pixel value of the center pixel of the 5×5-pixel region (of course, the memory before smoothening and the memory after smoothening are different). When the number of local maximum points is reduced, the distances between local maximum points are obtained. If, among the distances, there is some distance smaller than a set value (for example, about 1 cm which is the diameter of a bronchial tube to be observed when bronchial tubes are observed), the image is further smoothened. If the all distances are larger than the set value, the number of local maximum points is examined again. If only one local maximum point is present, updating can be performed automatically. If a plurality of local maximum points are present, inquiry is given to the operator. Alternatively, there is a method in which an arbitrary point found first is selected as the farthest point.

The region of interest will be described. The form of the region of interest is as follows.

(1) Case where an internal organ per se is made to be the region of interest.

(2) Case where a lesion is made to be the region of interest.

(3) Case where a subject to be extracted on the display screen is made to be the region of interest.

The manual scene updating in the step 4 in FIG. 17A is performed in accordance with the instruction of the operator by using a mouse or a keyboard while the three-dimensional original image is displayed. For example, $d_x$ and $d_y$ in the step 52 in FIG. 19 are inputted manually. More simply, α, β and h are given by key inputting.

Incidentally, the volume rendering method shown in FIG. 8 may be used as shading algorithm.

Special cases on operation will be described with reference to FIGS. 24A and 24B.

Figure 24A:
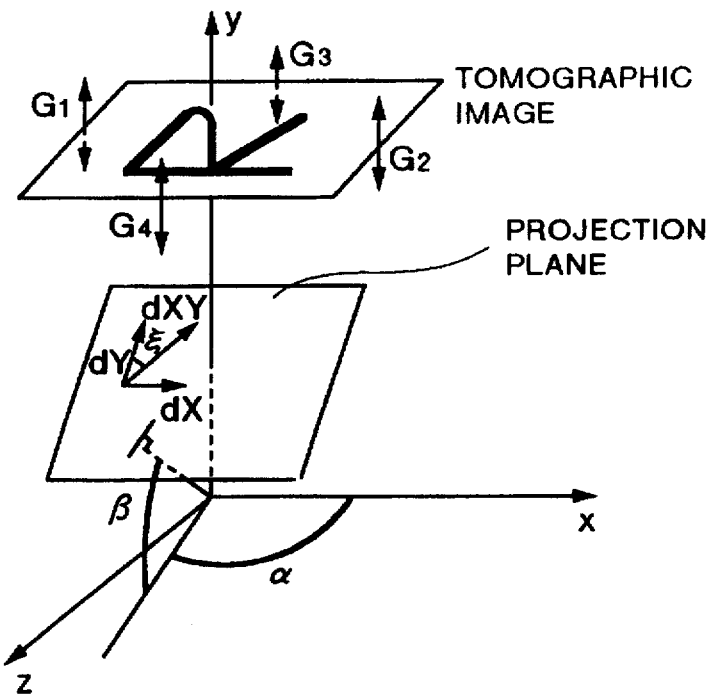
FIGS. 24A and 24B are graphs for explaining the theory of projection with the subject inclined.

In FIG. 24A, when dY is changed in the case where the tomographic image is to be observed obliquely, β is also changed so that the same effect as in the case where the tomographic image (CT image) is inclined in the directions $G_3$ and $G_4$ is obtained (β-change). It is preferable that the same effect is given to dX. When dX is changed, α is however also changed so that the image rotates around the y axis. Therefore, the effect of inclining the image in the directions $G_1$ and $G_2$ may be required to be provided while the image is prevented from rotating around the y axis even in the case where dX is changed. Approximate and convenient means adapted to this case is disclosed as follows.

This is based on the following theory.

The operation of inclining the tomographic image in the transverse directions $G_1$ and $G_2$ in view from the z-axis direction in FIG. 24A is equivalent to the operation of inclining the tomographic image in the longitudinal directions $G_1$ and $G_2$ in view from the x-axis direction.

Figure 24B:
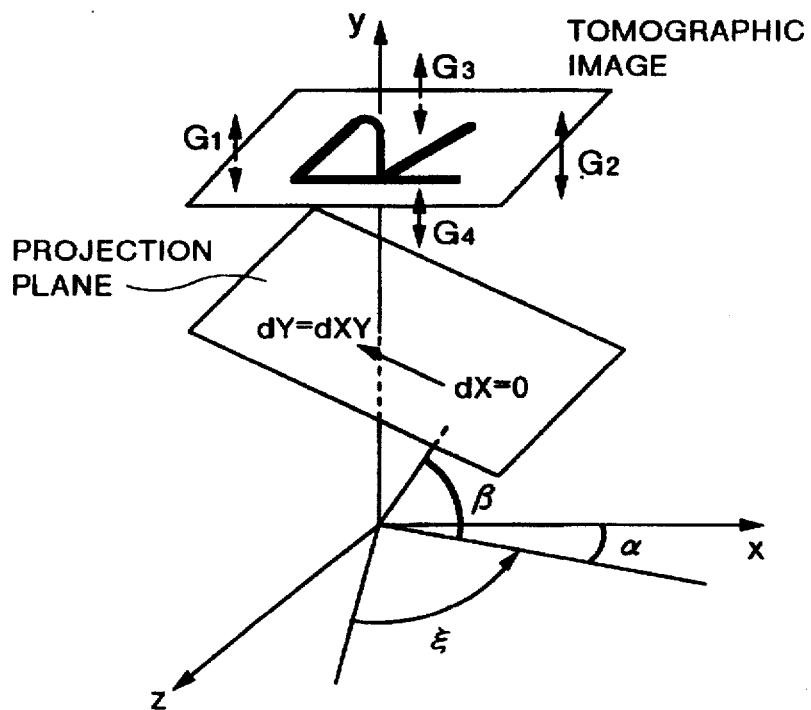

Accordingly, the projection plane is inclined in the directions $G_1$ and $G_2$ in the condition in which the dX component is set to "0" by rotating the projection plane around the y axis once as shown in FIG. 24B, whereafter the projection plane is returned to the original position.

As a result, there is obtained an image in which the angle α is not changed even the case where dX is changed.

Figure 25:
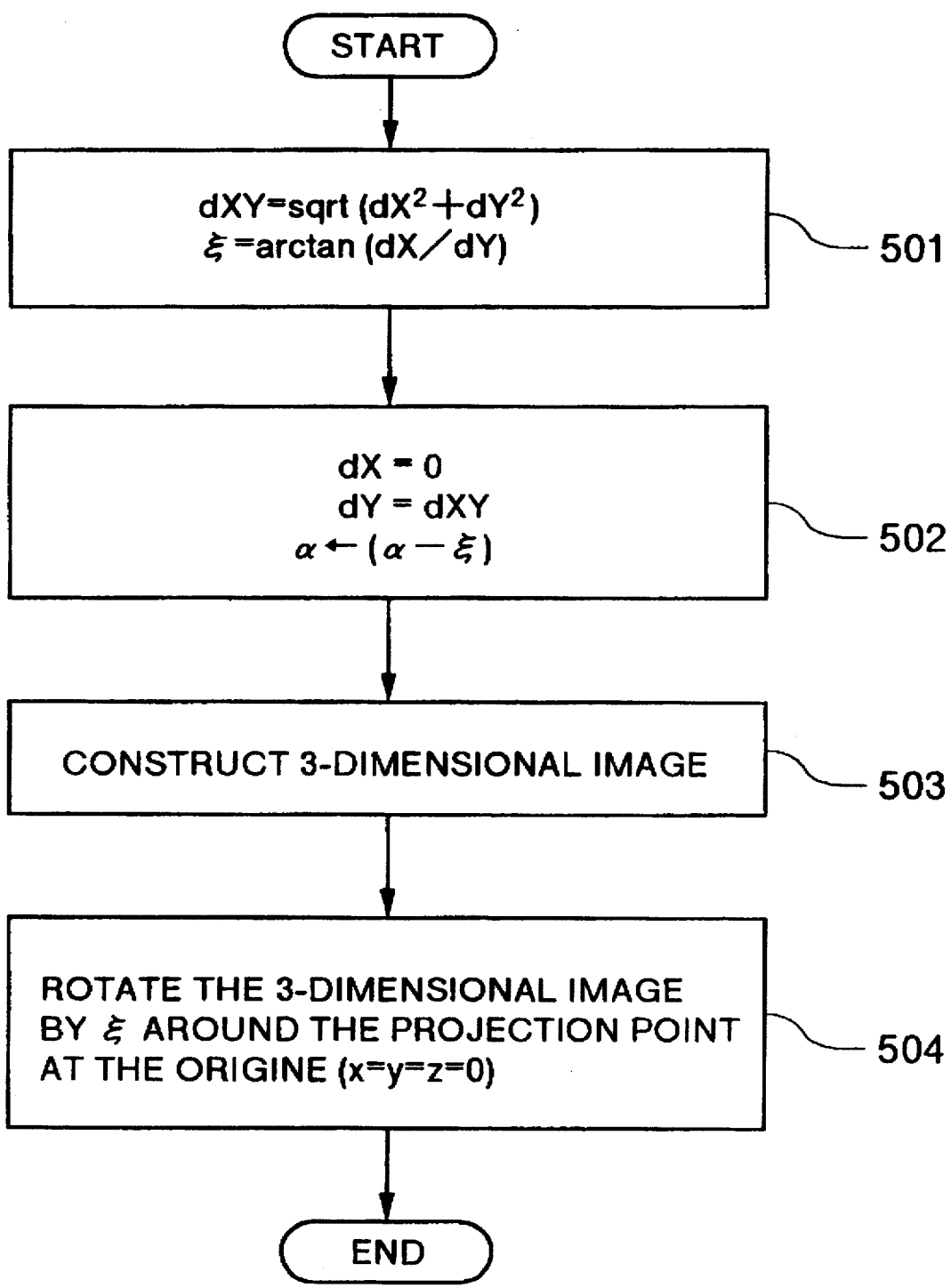
FIG. 25 is a flow chart showing the routine of projecting a subject while inclining the subject.

FIG. 25 is a specific flow chart thereof. In the case of dX≠0 and dy≠0, dY is expressed in sqrt($dX^2+dY^2$) as shown in FIG. 24B in step 501; dX is replaced by zero and, at the same time, α is rotated by −ξ (in which ξ=arctan(dX/dY)) in step 502; and a three-dimensional image is constructed in step 503. As a result, inclination in the directions $G_1$ and $G_2$ is contained in the three-dimensional image. Incidentally, because the angle is rotated by −ξ, the three-dimensional image is rotated by +ξ around the projection point of the origin x=y=z=0 so as to return to the original position in step 504 after the three-dimensional image is constructed.

When α is rotated by −90° (β is not changed) to incline the projection plane in the directions $G_1$ and $G_2$ in the case of dY=0 and dX=$N_1$≠0, the relations dY=N1 and dX=0 are obtained. Accordingly, there is obtained a three-dimensional image which is not rotated around the y axis (α is not changed) because dX is zero and which is inclined in the directions $G_1$ and $G_2$ (β is changed) because the value of dY is equal to N1 and the direction of dY is turned to the directions $G_1$ and $G_2$. The three-dimensional image however must be rotated around the projection point of x=y=z=0 so as to return to the original position after the three-dimensional image is constructed, because the view direction is rotated by 90° by rotating the projection plane as described above.

Although the respective embodiments have been shown the case where the view point is updated in the direction of the depth, it is a matter of course that the view point can be updated from the depth to the front conversely by the nearly same way of thinking.

Figure 26:
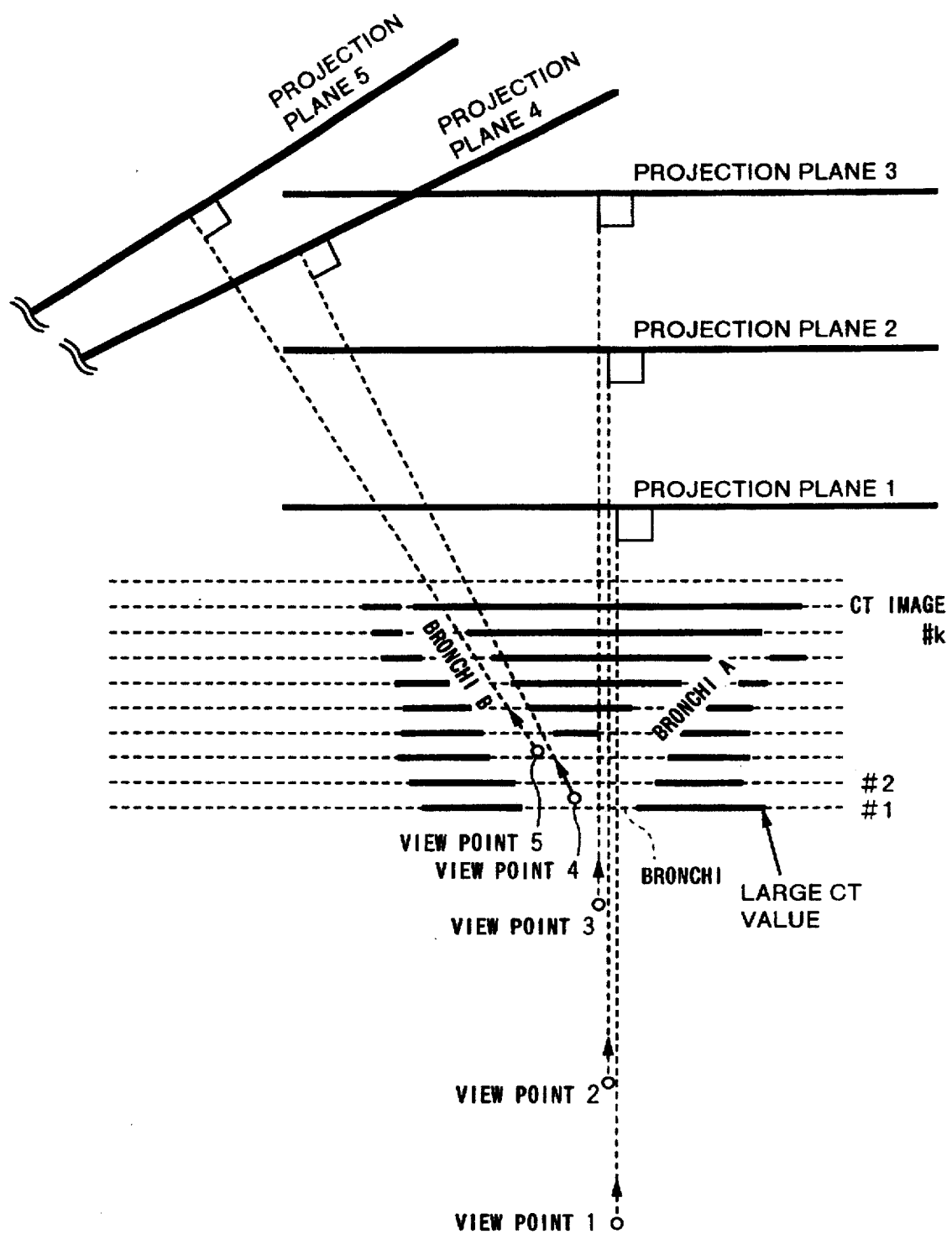
FIG. 26 is a view showing the condition in which the view point and the projection plane are updated in combination.
Figure 27A:
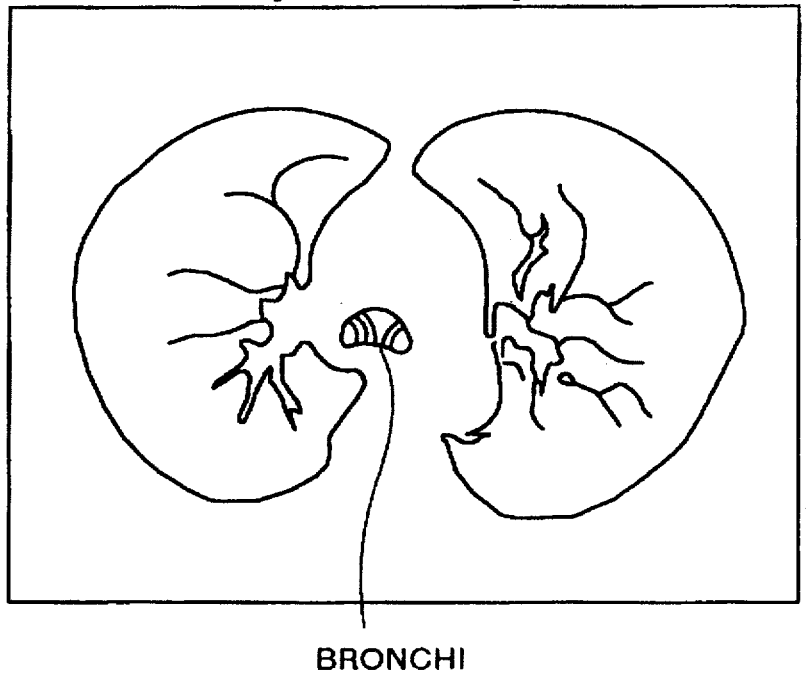
FIGS. 27A to 27E are views showing a practical example of images given in FIG. 26.
Figure 27B:
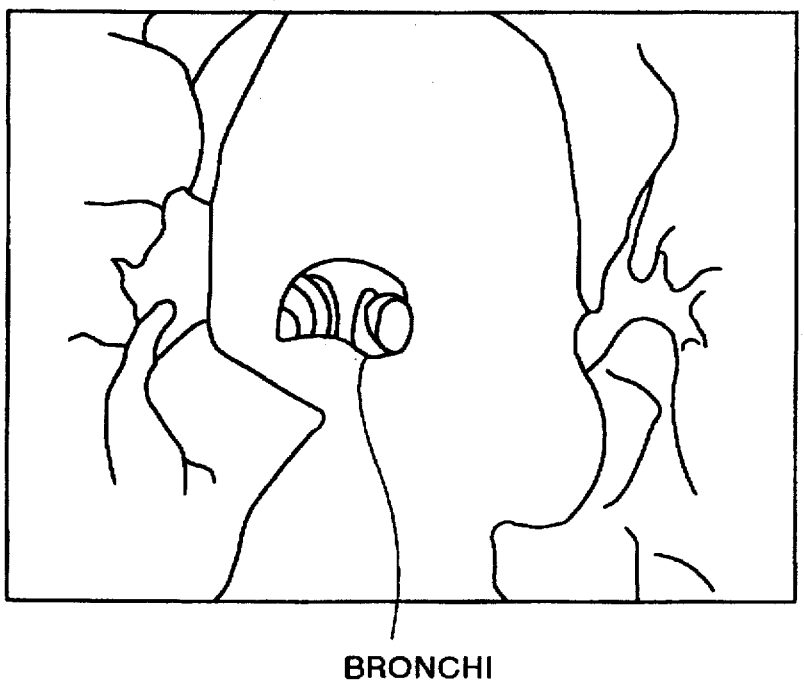
Figure 27C:
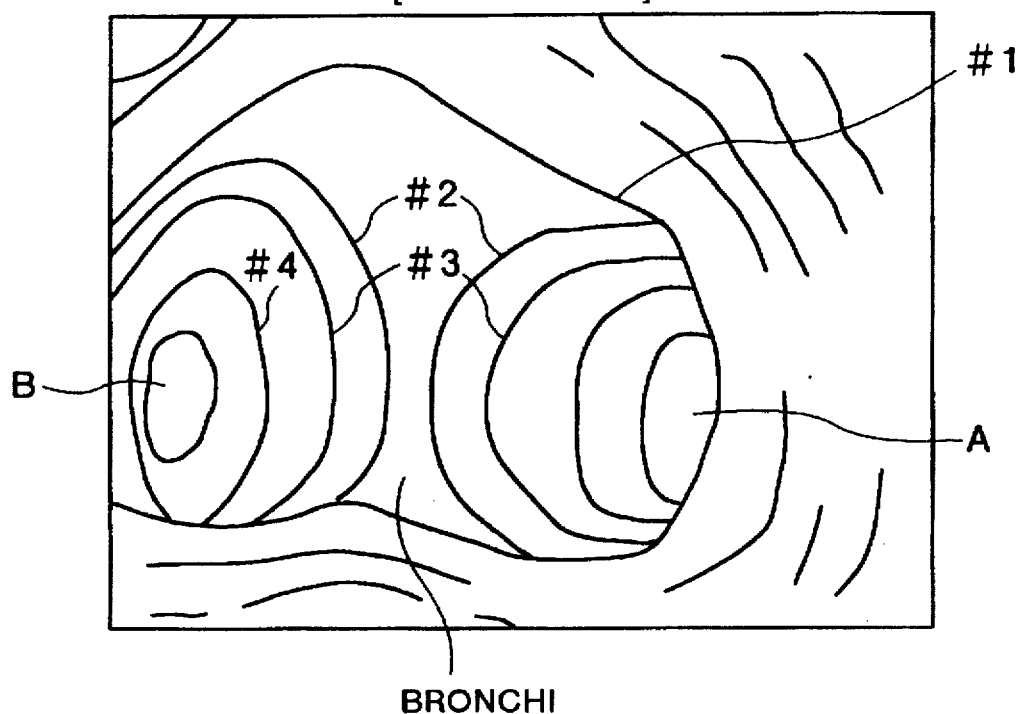
Figure 27D:
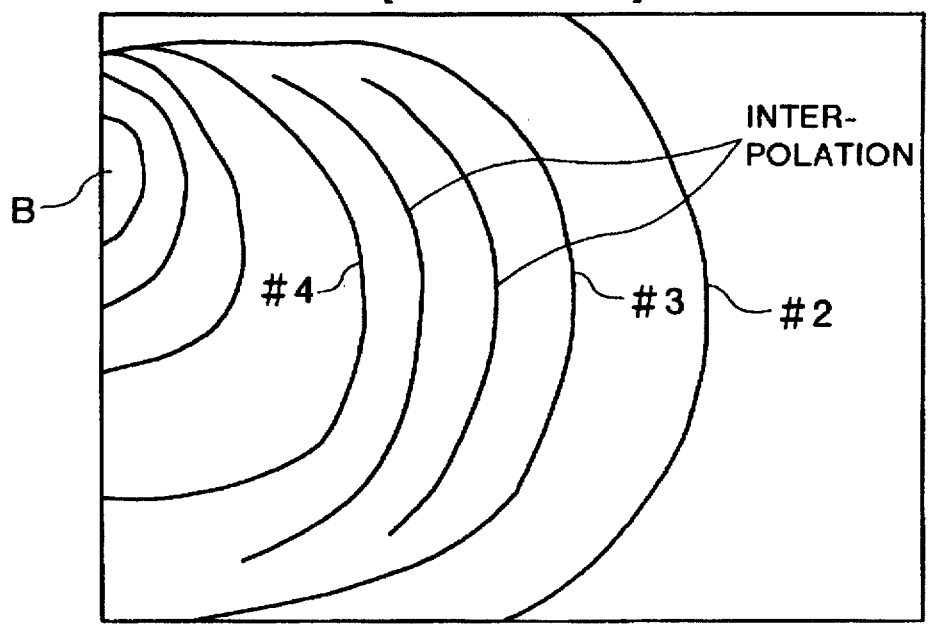
Figure 27E:
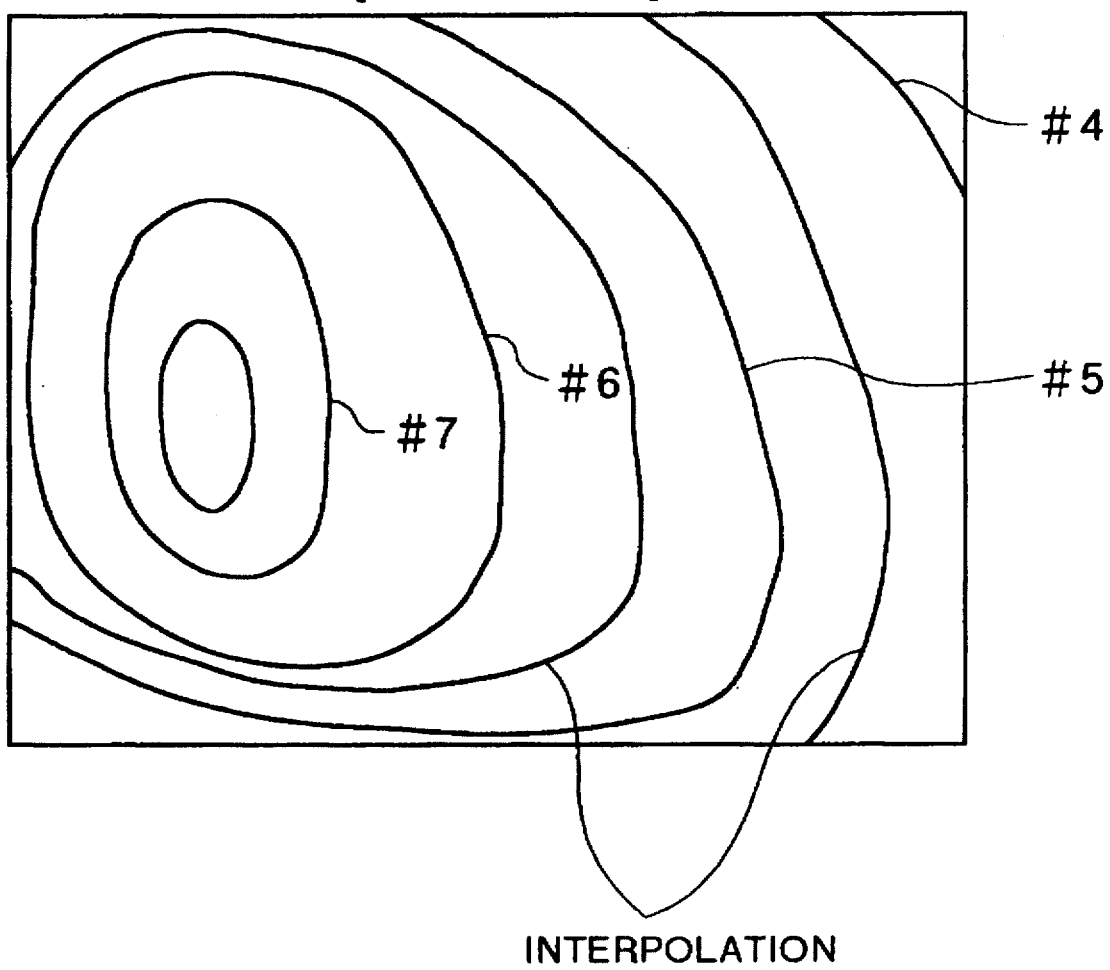

FIG. 26 is an explanatory view showing an example of updating of the view point and the projection plane. In FIG. 26, there is shown the condition in which tomographic images (CT images) #1 to #k of human bronchial tubes are prepared in advance so that the view point approaches the tomographic images endoscopically from the front of the bronchial tubes and further moves endoscopically in one B of branched bronchial tubes A and B. The updating of the view point 1→2→3 shows the case where the view point is updated in a direction perpendicular to tomographic surfaces. The updating of the view point 4→5 shows the case where the view point is updated when the view point moves in the bronchial tube B. The projection planes 1 to 5 are updated in correspondingly to the view points 1 to 5.

FIGS. 27A to 27E show examples of specific display images based on the view points 1 to 5 in FIG. 26. Incidentally, for example, images interposed between tomographic images #3 and #4 are obtained by interpolation. Such images are generated suitably in other places than the places shown in the drawings in accordance with the accuracy of the drawings and are used for display.

Further, eye-ball transformation is performed as occasion demands. In FIG. 17C, this transformation is put between the steps 22 and 23. In FIG. 22, this transformation is carried out after the step 71.

The hardware structure for realizing this embodiment is the same as that in FIG. 9. In the case where stereoscopic display is performed, the structure shown in FIG. 12 is used.

The CPU 8 performs general management and updating (FIGS. 17, 19 and 22). The main memory 9 latches programs necessary for the management and updating and stores various kinds of work data. The shared memory 28 is included in the main memory 9. The magnetic disk 10 stores the three-dimensional original image and feeds the three-dimensional original image to the CPU 8 so that the three-dimensional original image is made to be a subject of updating. Further, the magnetic disk 10 stores various kinds of processed images including three-dimensional images after updating and various kinds of images to be recycled. The mouse 14 performs mouse display on the CRT through the mouse controller 13 so as to be used for automatic updating or manual updating. The display memory 11 latches images and various kinds of icons to be displayed on the CRT 12. The common bus 15 serves as an interface line common to these devices.

What is claimed is:

1. A method of constructing a three-dimensional image according to a central projection method, comprising the steps of:

(a) determining a position of a first point of view and a first plane of projection in an arithmetic unit so that a projection subject image read from a first memory is located between the view point and the projection plane;

(b) obtaining a positional relation between a projection subject point on said projection subject image and a projection point on said first projection plane;

(c) obtaining a distance between said first view point and said projection subject point;

(d) determining a pixel value of said projection point on the basis of said distance;

(e) writing a value corresponding to said pixel value into a second memory corresponding to said first projection plane;

(f) reading data from said second memory in accordance with a display area to construct a three-dimensional image; and (g) displaying said three-dimensional image.

2. A method of constructing a three-dimensional image according to claim 1, wherein the step (d) includes a step of determining the pixel value by a depth method.

3. A method of constructing a three-dimensional image according to claim 1, wherein the step (a) includes a step of determining the position of said first view point by setting a first position on a scanogram image and setting a second position on said projection subject image.

4. A method of constructing a three-dimensional image according to claim 1, wherein the step (d) includes a step of setting the pixel value of said projection subject point so that the displayed image becomes brighter as said projection subject point becomes nearer to said first view point.

5. A method of constructing a three-dimensional image according to claim 1, wherein the step (d) includes a step of selecting a projection subject point nearest to said first view point to obtain said pixel value when there are a plurality of projection subject points to be projected onto one and the same projection point.

6. A method of constructing a three-dimensional image according to claim 1, further comprising the steps of:
moving the position of said first view point by a predetermined distance so that said first view point approaches a pixel position having a largest valve in said distance, and defining the view point after the movement as a second view point;
setting a new projection plane in accordance with the movement of the view point and defining the new projection plane as a second projection plane; and
carrying out the steps (b) to (g) after replacing said first view point and said first projection plane by said second view point and said second projection plane, respectively.

7. A method of constructing a three-dimensional image according to claim 6, wherein the step of setting said second projection plane includes a step of moving said first projection plane in the same direction as the direction of the movement of said first view point.

8. A method of constructing a three-dimensional image according to claim 7, wherein the step of setting said second projection plane includes a step of setting said second projection plane so that a perpendicular drawn from said second view point to said second projection plane passes through the center of said second projection plane.

9. A method of constructing a three-dimensional image according to claim 6, wherein the step of moving the view point includes a step of displaying pixel area choices so that a user can select a pixel area to which the view point will be moved, when there are a plurality of pixel areas with said distance not smaller than a predetermined value.

10. A method of constructing a three-dimensional image according to claim 6, wherein the step of moving the view point includes a step of obtaining a representative position in a region by statistical processing when pixels with said distance not smaller than a predetermined value form said region.

11. A method of constructing a three-dimensional image according to claim 10, wherein the step of moving the view point includes a step of obtaining the position of the center of said region as said representative position.

12. A method of constructing a three-dimensional image according to claim 10, wherein the step of moving the view point includes a step of obtaining the position of the center of gravity of said region as said representative position.

13. A method of constructing a three-dimensional image according to claim 10, wherein the step of moving the view point includes a step of obtaining the average of pixel values in said region and setting said average as the pixel value of the center position of said region.

14. A method of constructing a three-dimensional image according to claim 1, wherein the step (b) includes the steps of:

setting a curved surface touching said first projection plane at the origin of a rectangular three-dimensional coordinate system containing said first projection plane as an X-Y plane so that said first view point is located on a line connecting the center of said curved surface and said origin and said projection subject image is located between said first view point and said curved surface;
projecting said projection subject point onto said curved surface to obtain a projection point Q on said curved surface;
obtaining the length L along said curved surface between said projection point Q and said origin; and
projecting said projection point Q onto said first projection plane with said length L to obtain the position of the projection point.

15. A method of constructing a three-dimensional image according to claim 14, wherein said curved surface is a spherical surface.

16. A method of constructing a three-dimensional image according to claim 14, further comprising the steps of:
moving the position of said first view point by a predetermined distance so that said first view point approaches a pixel position having a largest valve in said distance, and defining the view point after the movement as a second view point;
setting a new projection plane in accordance with the movement of the view point and defining the new projection plane as a second projection plane; and
carrying out the steps (b) to (g) after replacing said first view point and said first projection plane by said second view point and said second projection plane, respectively.

17. A method of constructing a three-dimensional image according to claim 1, wherein the step (e) includes the steps of:

setting a curved surface touching said first projection plane at the origin of a rectangular three-dimensional coordinate system containing said first projection plane as an X-Y plane so that said first view point is located on a line connecting the center of said curved surface and said origin and said projection subject image is located between said first view point and said curved surface;
projecting said projection subject point onto said curved surface to obtain a projection point Q on said curved surface;
obtaining the length L along said curved surface between said projection point Q and said origin; and
projecting said projection point Q onto said first projection plane with said length L to obtain the position of the projection point.

18. A method of constructing a three-dimensional image according to claim 17, further comprising the steps of:
moving the position of said first view point by a predetermined distance so that said first view point approaches a pixel position having a largest valve in said distance, and defining the view point after the movement as a second view point;
setting a new projection plane in accordance with the movement of the view point and defining the new projection plane as a second projection plane; and
carrying out the steps (b) to (g) after replacing said first view point and said first projection plane by said second view point and said second projection plane, respectively.

19. A method of constructing a three-dimensional image according to claim 18, wherein the step of setting said second projection plane includes a step of moving said first projection plane in the same direction as the direction of the movement of said first view point.

20. A method of constructing a three-dimensional image according to claim 19, wherein the step of setting said second projection plane includes a step of setting said second projection plane so that a perpendicular drawn from said second view point to said second projection plane passes through the center of said second projection plane.

21. A method of constructing a three-dimensional image according to claim 17, wherein said curved surface is a spherical surface.

22. A method of constructing a three-dimensional image according to claim 1, wherein the step (b) includes the steps of:

processing said projection subject image in accordance with a threshold value; and setting points within a range of said threshold value as projection subject points.

23. A method of constructing a three-dimensional image according to claim 1, wherein the step (f) includes a step of setting as said display area a predetermined range having as its center a point of intersection of a perpendicular drawn from said view point to said projection plane and said projection plane.

24. A method of constructing a three-dimensional image according to a central projection method, comprising the steps of:

(a) determining first and second view points slightly shifted left and right and a first projection plane in an arithmetic unit so that a projection subject image read from a first memory is located between said first and second view points and said projection plane;

(b) obtaining the first positional relation between a projection subject point on said projection subject image and a first projection point on said first projection plane;

(c) obtaining the first distance between said first view point and said projection subject point;

(d) determining the first pixel value of said first projection point on the basis of said first distance;

(e) writing a value corresponding to said first pixel value into a second memory corresponding to said first projection plane;

(f) obtaining the second positional relation between said projection subject point on said projection subject image and a second projection point on said first projection plane;

(g) obtaining the second distance between said second view point and said projection subject point;

(h) determining the second pixel value of said second projection point on the basis of said second distance;

(i) writing a value corresponding to said second pixel value into a third memory corresponding to said first projection plane;

(j) reading data from said second and third memories in accordance with a display area to construct two-in-a-set three-dimensional images which can be observed stereoscopically as a three-dimensional image; and (k) displaying said three-dimensional images.

25. A method of constructing a three-dimensional image according to claim 24, wherein each of the steps (d) and (h) includes a step of determining the pixel value by a depth method.

26. A method of constructing a three-dimensional image according to claim 24, wherein each of the steps (d) and (h) includes a step of determining the pixel value by a volume rendering method.

27. A method of constructing a three-dimensional image according to claim 24, wherein the step (a) includes a step of determining the positions of said first and second view points by setting first and second positions on a scanogram image and on said projection subject image for said first and second view points, respectively.

28. A method of constructing a three-dimensional image according to claim 24, wherein each of the steps (d) and (h) includes a step of setting the pixel value of said projection subject point so that the displayed image becomes brighter as said projection subject point becomes nearer to the view point.

29. A method of constructing a three-dimensional image according to claim 24, wherein each of the steps (d) and (h) includes a step of selecting a projection subject point nearest to the view point to obtain the pixel value when there are a plurality of projection subject points to be projected onto one and the same projection point.

30. A method of constructing a three-dimensional image according to claim 24, further comprising the steps of:

moving the middle point between said first and second view points by a predetermined distance so that the middle point approaches a pixel position having a largest valve in said distance, and defining the first view point after the movement as a third view point and the second view point after the movement as a fourth view point;

setting a new projection plane in accordance with the movement of the view point and defining the new projection plane as a second projection plane; and carrying out the steps (b) to (k) after replacing said first and second view points and said first projection plane by said third and fourth view points and said second projection plane, respectively.

31. A method of constructing a three-dimensional image according to claim 30, wherein the step of setting said second projection plane includes the steps of:

moving said first projection plane in the same direction as the direction of the movement of said middle point; and setting said second projection plane so that a perpendicular drawn from said middle point to said second projection plane passes through the center of said second projection plane.

32. A method of constructing a three-dimensional image according to claim 24, wherein the step (b) includes the steps of:

setting a curved surface touching said first projection plane at the origin of a rectangular three-dimensional coordinate system containing said first projection plane as an X-Y plane so that said middle point between said first and second view points is located on a line connecting the center of said curved surface and said origin and said projection subject image is located between said first and second view points and said curved surface;

projecting said projection subject point onto said curved surface from said first view point to obtain a projection point $Q_1$ on said curved surface;

obtaining the length $L_1$ along said curved surface between said projection point $Q_1$ and said origin; and projecting said projection point $Q_1$ onto said first projection plane with said length $L_1$ to obtain the position of said first projection point, and wherein the step (f) includes the steps of:

projecting said projection subject point onto said curved surface from said second view point to obtain a projection point $Q_2$ on said curved surface;

obtaining the length $L_2$ along said curved surface between said projection point $Q_2$ and said origin; and projecting said projection point $Q_2$ onto said first projection plane with said length $L_2$ to obtain the position of said second projection point.

33. A method of constructing a three-dimensional image according to claim 32, further comprising the steps of:

moving the middle point between said first and second view points by a predetermined distance so that the middle point approaches a pixel position having a largest valve in said distance, and defining the first view point after the movement as a third view point and the second view point after the movement as a fourth view point;

setting a new projection plane in accordance with the movement of the view point and defining the new projection plane as a second projection plane; and carrying out the steps (b) to (k) after replacing said first and second view points and said first projection plane by said third and fourth view points and said second projection plane, respectively.

34. A method of constructing a three-dimensional image according to claim 24, wherein the step (e) includes the steps of:

setting a curved surface touching said first projection plane at the origin of a rectangular three-dimensional coordinate system containing said first projection plane as an X-Y plane so that said middle point between said first and second view points is located on a line connecting the center of said curved surface and said origin and said projection subject image is located between said first and second view points and said curved surface;

projecting said projection subject point onto said curved surface from said first view point to obtain a projection point $Q_1$ on said curved surface;

obtaining the length $L_1$ along said curved surface between said projection point $Q_1$ and said origin; and projecting said projection point $Q_1$ onto said first projection plane with said length $L_1$ to obtain the position of said first projection point, and wherein the step (i) includes the steps of:

projecting said projection subject point onto said curved surface from said second view point to obtain a projection point $Q_2$ on said curved surface;

obtaining the length $L_2$ along said curved surface between said projection point $Q_2$ and said origin; and projecting said projection point $Q_2$ onto said first projection plane with said length $L_2$ to obtain the position of said second projection point.

35. A method of constructing a three-dimensional image according to claim 34, further comprising the steps of:

moving the middle point between said first and second view points by a predetermined distance so that the middle point approaches a pixel position having a largest valve in said distance, and defining the first view point after the movement as a third view point and the second view point after the movement as a fourth view point;

setting a new projection plane in accordance with the movement of the view point and defining the new projection plane as a second projection plane; and carrying out the steps (b) to (k) after replacing said first and second view points and said first projection plane by said third and fourth view points and said second projection plane, respectively.

36. A method of constructing a three-dimensional image according to claim 34, wherein the step of setting said second projection plane includes the steps of:

moving said first projection plane in the same direction as the direction of the movement of said middle point; and setting said second projection plane so that a perpendicular drawn from said middle point to said second projection plane passes through the center of said second projection plane.

37. A method of constructing a three-dimensional image according to claim 34, wherein said curved surface is a spherical surface.

38. An apparatus for constructing a three-dimensional image according to a central projection method, comprising:

a storage means for storing a projection subject image;

an arithmetic processing means including means for reading said projection subject image from said storage means and determining the position of a first view point and a first projection plane so that said projection subject image is located between the view point and the projection plane, means for obtaining the positional relation between a projection subject point on said projection subject image and a projection point on said first projection plane, means for obtaining the distance between said first view point and said projection subject point, and means for determining the pixel value of said projection point on the basis of said distance;

a display memory means corresponding to said projection plane;

means for writing a value corresponding to said pixel value into said display memory means;

means for reading data from said display memory means in accordance with a display area to construct a three-dimensional image; and means for displaying said three-dimensional image.

39. An apparatus for constructing a three-dimensional image according to claim 38, wherein said arithmetic processing means further includes:

means for moving said view point and said projection plane in combination so that the position of said view point is moved by a predetermined distance toward a portion having a farthest valve in said distance; and means for setting said projection plane so that a perpendicular drawn from said view point to said projection plane passes through the center of said projection plane.

40. An apparatus for constructing a three-dimensional image according to claim 38, wherein said arithmetic processing means further includes:

means for setting a curved surface touching said first projection plane at the origin of a rectangular three-dimensional coordinate system containing said first projection plane as an X-Y plane so that said first view point is located on a line connecting the center of said curved surface and said origin and said projection subject image is located between said first view point and said curved surface;

means for projecting said projection subject point onto said curved surface to obtain a projection point Q on said curved surface;

means for obtaining the length L along said curved surface between said projection point Q and said origin; and means for projecting said projection point Q onto said first projection plane with said length L to obtain the position of the projection point.

41. An apparatus for constructing a three-dimensional image according to claim 40, further including:

means for moving said view point and said projection plane in combination so that the position of said view point is moved by a predetermined distance toward a portion having a farthest valve in said distance; and means for setting said projection plane so that a perpendicular drawn from said view point to said projection plane passes through the center of said projection plane.

42. An apparatus for constructing a three-dimensional image according to claim 40, wherein said curved surface is a spherical surface.

43. A method of constructing a three-dimensional image according to a central projection method, comprising the steps of:

(a) determining a position of a view point and a projection plane in an arithmetic unit so that an image to be projected read from a first memory is located between said view point and said projection plane;

(b) assuming that an imaginary light source is located at said view point and projection lines are radially emitted from said view point and pass through said image to be projected, and determining a point to be projected on a projection line;

(c) determining a quantity of light of said point to be projected on said projection plane;

(d) determining a pixel value of a projected point projected on said projection plane on the basis of said quantity of light;

(e) writing a value corresponding to said pixel value into a second memory corresponding to said projection plane;

(f) performing said steps (b) through (e) for each point to be projected of said image to be projected;

(g) reading data from said second memory in accordance with a display area to construct a three-dimensional image; and (h) displaying said three-dimensional image.

44. A method of constructing a three-dimensional image according to claim 1, wherein the step (d) includes a step of determining the pixel value by a volume rendering method.

45. A method of constructing a three-dimensional image according to claim 43, wherein said step of determining a quantity of light comprises the steps of:

successively selecting said point to be projected in a direction from a point nearest to said view point to a farther point; and determining a quantity of light of said point to be projected at every selection.

46. A central projection method comprising the steps of:

(a) determining a position of a view point and a projection plane in an arithmetic unit so that an image to be projected read from a first memory is located between said view point and said projection plane;

(b) setting a curved surface touching said projection plane at an origin of a rectangular three-dimensional coordinate system containing said projection plane as an X-Y plane so that said view point is located on a line connecting a center of said curved surface and said origin, and said image to be projected is located between said view point and said curved surface;

(c) projecting a point to be projected onto said curved surface to obtain a first projected point Q on said curved surface;

(d) obtaining a length L along said curved surface between said first projected point Q and said origin; and (e) projecting said projected point Q onto said projection plane with said length L to obtain a second projected point on said projection plane.

47. A method of constructing a three-dimensional image according to a central projection method, comprising the steps of:

setting a view point, one or more images to be projected, and a projection plane in a memory space so that the one or more images to be projected are located between the view point and the projection plane;

obtaining an enlarged projected image on the projection plane viewed from the view point by a central projection method and determining pixel values of the projection plane; and constructing a three-dimensional image on the basis of the pixel values and displaying the three-dimensional image.

48. A method of constructing a three-dimensional image according to claim 47, wherein the step of setting a view point, one or more images to be projected, and a projection plane includes the step of setting the projection plane in accordance with a direction of a view line.

49. A method of constructing a three-dimensional image according to claim 48, wherein the step of setting a view point, one or more images to be projected, and a projection plane includes the step of setting the projection plane so that the view line crosses the projection plane at an angle of 90°.

50. A method of constructing a three-dimensional image according to claim 47, wherein the step of setting a view point, one or more images to be projected, and a projection plane includes the step of changing at least a position of the view point and a position of the projection plane while maintaining a constant distance between the view point and projection plane.

51. A method of constructing a three-dimensional image according to claim 50, wherein the step of constructing a three-dimensional image and displaying the three-dimensional image includes the steps of:

constructing three-dimensional images on the basis of pixel data obtained each time the position of the view point and the position of the projection plane are changed; and displaying the three-dimensional images as a moving image.

52. A method of constructing a three-dimensional image according to claim 50, wherein the step of constructing a three-dimensional image and displaying the three-dimensional image includes the steps of:

successively storing in a memory pixel data obtained each time the position of the view point and the position of the projection plane are changed;

successively reading out at predetermined intervals the pixel data stored in the memory and constructing three-dimensional images; and displaying the three-dimensional images as a moving image.

53. A method of constructing a three-dimensional image according to claim 47, wherein the step of setting a view point, one or more images to be projected, and a projection plane includes the step of changing a distance between the view point and the projection plane to enable a desired enlarged image to be obtained.

54. A method of constructing a three-dimensional image according to claim 53, wherein the step of constructing a three-dimensional image and displaying the three-dimensional image includes the steps of:
  successively storing in a memory pixel data obtained each time the distance between the view point and the projection plane is changed;
  successively reading out at predetermined intervals the pixel data stored in the memory and constructing three-dimensional images; and
  displaying the three-dimensional images as a moving image.

55. A method of constructing a three-dimensional image according to claim 47, wherein the step of constructing a three-dimensional image and displaying the three-dimensional image includes the steps of:
  storing the pixel values in a memory corresponding to the projection plane;
  reading out the pixel values stored in the memory in accordance with an area of the projection plane to be displayed and constructing a three-dimensional image; and
  displaying the three-dimensional image.

56. A method of constructing a three-dimensional image according to claim 47, wherein the step of setting a view point, one or more images to be projected, and a projection plane includes the step of tilting the projection plane with respect to an axis passing through a center of the projection plane.

57. A method of constructing a three-dimensional image according to claim 47, wherein the step of setting a view point, one or more images to be projected, and a projection plane includes the step of tilting the one or more images to be projected with respect to an axis passing through a center of the one or more images to be projected.

58. A method of constructing a three-dimensional image according to claim 57, wherein the step of tilting the one or more images to be projected includes the step of interpolating the one or more images to be projected to obtain one or more tilted images.

59. A method of constructing a three-dimensional image according to claim 47, wherein the step of obtaining an enlarged projected image and determining pixel values is performed based on an assumption that light rays coincident with projection lines are radially emitted from an imaginary light source located at the view point and pass through the one or more images to be projected onto the projection plane and includes the step of obtaining the pixel values for each of the projection lines.

60. A method of constructing a three-dimensional image according to claim 47, wherein the step of obtaining an enlarged projected image and determining pixel values is performed based on an assumption that light rays coincident with projection lines are radially emitted from an imaginary light source located at the view point and pass through the one or more images to be projected onto the projection plane and includes the steps of:
  obtaining values to be projected on each of the projection lines for each of the one or more images to be projected; and
  obtaining the pixel values by adding the values to be projected on each of the projection lines.

61. A method of constructing a three-dimensional image according to claim 47, wherein the step of obtaining an enlarged projected image includes the steps of:
  representing the enlarged projected image by pixels having coordinates (X, Y) in a first coordinate system in the projection plane;
  transforming the coordinates (X, Y) of the pixels to coordinates ($\eta$, $\xi$) in a second coordinate system in the projection plane based on parameters h and R by performing the following calculations:
  calculating an angle $\phi=\arctan(X/Y)$,
  calculating an angle $\theta=2\cdot\arctan(\sqrt{X^2+Y^2}/h)$,
  calculating an arc length $L=R\cdot\theta$,
  calculating $\eta=L\cdot\cos(\phi)$, and
  calculating $\xi=L\cdot\sin(\phi)$; and
  representing the enlarged projected image by pixels having the coordinates ($\eta$, $\xi$).

62. A method of constructing a three-dimensional image according to a central projection method, comprising the steps of:
  setting a view point, one or more images to be projected, and a projection plane in a memory space so that a perpendicular from the view point to the projection plane is longer than a distance between the view point and a pixel point of the one or more images to be projected;
  setting a curved surface having a center on a straight line defining a view line extending from the view point to the one or more images to be projected, the curved surface passing through the view point;
  projecting the pixel point of the one or more images to be projected onto the curved surface and the projection plane, and obtaining a projected point Q on the curved surface and a projected point P on the projection plane;
  measuring a distance L along the curved surface between the projected point Q and a point, other than the view point, at which the view line intersects the curved surface; and
  obtaining a projected point G on the projection plane, the projected point G corresponding to the projected point Q and being located on a line extending from a point at which the view line intersects the projection plane to the projected point P at a distance equal to L from the point at which the view line intersects the projection plane.

63. A method of constructing a three-dimensional image according to a central projection method, comprising the steps of:
  setting a view point, one or more images to be projected, and a projection plane in a memory space so that the one or more images to be projected are located between the view point and the projection plane;
  setting a curved surface having a center on a straight line defining a view line extending from the view point to the one or more images to be projected, the curved surface passing through the view point;
  projecting a pixel point of the one or more images to be projected onto the curved surface and the projection plane, and obtaining a projected point Q on the curved surface and a projected point P on the projection plane;
  measuring a distance L along the curved surface between the projected point Q and a point, other than the view point, at which the view line intersects the curved surface; and obtaining a projected point G on the projection plane, the projected point G corresponding to the projected point Q and being located on a line extending from a point at which the view line intersects the projection plane to the projected point P at a distance equal to L from the point at which the view line intersects the projection plane.

* * * * *